US011532206B2

(12) United States Patent
Nguyen

(10) Patent No.: US 11,532,206 B2
(45) Date of Patent: *Dec. 20, 2022

(54) GAMING MACHINES HAVING PORTABLE DEVICE DOCKING STATION

(71) Applicant: Aristocrat Technologies, Inc. (ATI), Las Vegas, NV (US)

(72) Inventor: Binh T. Nguyen, Reno, NV (US)

(73) Assignee: Aristocrat Technologies, Inc. (ATI), Las Vegas, NV (US)

( * ) Notice: Subject to any disclaimer, the term of this patent is extended or adjusted under 35 U.S.C. 154(b) by 145 days.

This patent is subject to a terminal disclaimer.

(21) Appl. No.: 16/886,617

(22) Filed: May 28, 2020

(65) Prior Publication Data
US 2020/0294355 A1    Sep. 17, 2020

Related U.S. Application Data

(63) Continuation of application No. 16/214,123, filed on Dec. 9, 2018, now Pat. No. 10,706,678, which is a
(Continued)

(51) Int. Cl.
*G07F 17/32* (2006.01)
*H04L 67/00* (2022.01)
(Continued)

(52) U.S. Cl.
CPC ...... *G07F 17/3241* (2013.01); *G07F 17/3202* (2013.01); *G07F 17/3209* (2013.01);
(Continued)

(58) Field of Classification Search
CPC ............. G07F 17/3241; G07F 17/3225; G07F 17/3218; G07F 17/3202; G07F 17/3209;
(Continued)

(56) References Cited

U.S. PATENT DOCUMENTS 2,033,638 A    3/1936 Koppl
2,062,923 A   12/1936 Nagy
(Continued)

FOREIGN PATENT DOCUMENTS

GB    2033638    5/1980
GB    2062923    5/1981
(Continued)

OTHER PUBLICATIONS

Benston, Liz, "Harrahs Launches iPhone App; Caesars Bypasses Check-in," Las Vegas Sun, Las Vegas, NV. Jan. 8, 2010.
(Continued)

*Primary Examiner* — Michael A Cuff
(74) *Attorney, Agent, or Firm* — McAndrews, Held & Malloy, Ltd.

(57) ABSTRACT

In one embodiment, an intermediary gaming trusted electronic device for use with an untrusted PED may operate to securely communicate with a gaming apparatus and securely communicate with the associated untrusted PED. The intermediary gaming trusted device is able to support interaction between the gaming apparatus and the associated untrusted PED. In another embodiment, a system to authorize a mobile electronic device to play games of chance may include a gaming system manager and a docking station. The docking station can be configured to: detect whether the mobile electronic device is connected to the docking station; and determine whether the mobile electronic device, or its user, is authorized to play a game of chance on the mobile electronic device.

20 Claims, 30 Drawing Sheets

Related U.S. Application Data continuation of application No. 15/876,095, filed on Jan. 19, 2018, now Pat. No. 10,186,113, which is a continuation of application No. 15/400,840, filed on Jan. 6, 2017, now Pat. No. 9,875,609, which is a continuation of application No. 13/833,116, filed on Mar. 15, 2013, now Pat. No. 9,576,425.

(51) Int. Cl.
*H04W 12/06* (2021.01)
*G07F 17/34* (2006.01)

(52) U.S. Cl.
CPC ...... *G07F 17/3218* (2013.01); *G07F 17/3223* (2013.01); *G07F 17/3225* (2013.01); *G07F 17/3227* (2013.01); *G07F 17/3251* (2013.01); *G07F 17/34* (2013.01); *H04L 67/34* (2013.01); *H04W 12/06* (2013.01)

(58) Field of Classification Search
CPC ............. G07F 17/3223; G07F 17/3227; G07F 17/3251; G07F 17/3234; H04W 12/06; H04W 4/02
USPC .......................................................... 463/29
See application file for complete search history.

(56) References Cited

U.S. PATENT DOCUMENTS

| | | |
|---|---|---|
| 4,741,539 A | 5/1988 | Sutton et al. |
| 4,948,138 A | 8/1990 | Pease et al. |
| 5,067,712 A | 11/1991 | Georgilas |
| 5,275,400 A | 1/1994 | Weingardt |
| 5,429,361 A | 7/1995 | Raven et al. |
| 5,489,103 A | 2/1996 | Okamoto |
| 5,630,757 A | 5/1997 | Gagin |
| 5,655,961 A | 8/1997 | Acres et al. |
| 5,704,835 A | 1/1998 | Dietz, II |
| 5,727,786 A | 3/1998 | Weingardt |
| 5,833,537 A | 11/1998 | Barrie |
| 5,842,921 A | 12/1998 | Mindes |
| 5,919,091 A | 7/1999 | Bell et al. |
| 5,947,820 A | 9/1999 | Morro et al. |
| 5,997,401 A | 12/1999 | Crawford |
| 6,001,016 A | 12/1999 | Walker et al. |
| 6,039,648 A | 3/2000 | Guinn et al. |
| 6,059,289 A | 5/2000 | Vancura |
| 6,089,977 A | 7/2000 | Bennett |
| 6,095,920 A | 8/2000 | Sudahiro |
| 6,110,041 A | 8/2000 | Walker et al. |
| 6,142,872 A | 11/2000 | Walker et al. |
| 6,146,271 A | 11/2000 | Kadici |
| 6,146,273 A | 11/2000 | Olsen |
| 6,165,071 A | 12/2000 | Weiss |
| 6,231,445 B1 | 5/2001 | Acres |
| 6,244,958 B1 | 6/2001 | Acres |
| 6,270,412 B1 | 8/2001 | Crawford et al. |
| 6,290,600 B1 | 9/2001 | Glasson |
| 6,293,866 B1 | 9/2001 | Walker et al. |
| 6,353,390 B1 | 3/2002 | Beri et al. |
| 6,364,768 B1 | 4/2002 | Acres et al. |
| 6,404,884 B1 | 6/2002 | Marwell et al. |
| 6,416,406 B1 | 7/2002 | Duhamel |
| 6,416,409 B1 | 7/2002 | Jordan |
| 6,443,452 B1 | 9/2002 | Brune |
| 6,491,584 B2 | 12/2002 | Graham et al. |
| 6,505,095 B1 | 1/2003 | Kolls |
| 6,508,710 B1 | 1/2003 | Paravia et al. |
| 6,561,900 B1 | 5/2003 | Baerlocker et al. |
| 6,592,457 B1 | 7/2003 | Frohm et al. |
| 6,612,574 B1 | 9/2003 | Cole et al. |
| 6,620,046 B2 | 9/2003 | Rowe |
| 6,641,477 B1 | 11/2003 | Dietz, II |
| 6,645,078 B1 | 11/2003 | Mattice |
| 6,699,128 B1 | 3/2004 | Beadell |
| 6,719,630 B1 | 4/2004 | Seelig et al. |
| 6,749,510 B2 | 6/2004 | Globbi |
| 6,758,757 B2 | 7/2004 | Luciano, Jr. et al. |
| 6,773,345 B2 | 8/2004 | Walker et al. |
| 6,778,820 B2 | 8/2004 | Tendler |
| 6,780,111 B2 | 8/2004 | Cannon et al. |
| 6,799,032 B2 | 9/2004 | McDonnell et al. |
| 6,800,027 B2 | 10/2004 | Giobbi et al. |
| 6,804,763 B1 | 10/2004 | Stockdale et al. |
| 6,811,486 B1 | 11/2004 | Luciano, Jr. |
| 6,843,725 B2 | 1/2005 | Nelson |
| 6,846,238 B2 | 1/2005 | Wells |
| 6,848,995 B1 | 2/2005 | Walker et al. |
| 6,852,029 B2 | 2/2005 | Baltz et al. |
| 6,869,361 B2 | 3/2005 | Sharpless et al. |
| 6,875,106 B2 | 4/2005 | Weiss et al. |
| 6,884,170 B2 | 4/2005 | Rowe |
| 6,884,172 B1 | 4/2005 | Lloyd et al. |
| 6,902,484 B2 | 6/2005 | Idaka |
| 6,908,390 B2 | 6/2005 | Nguyen et al. |
| 6,913,532 B2 | 7/2005 | Bearlocher et al. |
| 6,923,721 B2 | 8/2005 | Luciano et al. |
| 6,935,958 B2 | 8/2005 | Nelson |
| 6,949,022 B1 | 9/2005 | Showers et al. |
| 6,955,600 B2 | 10/2005 | Glavich et al. |
| 6,971,956 B2 | 12/2005 | Rowe et al. |
| 6,984,174 B2 | 1/2006 | Cannon et al. |
| 6,997,803 B2 | 2/2006 | LeMay et al. |
| 7,018,292 B2 | 3/2006 | Tracy et al. |
| 7,032,115 B2 | 4/2006 | Kashani |
| 7,033,276 B2 | 4/2006 | Walker et al. |
| 7,035,626 B1 | 4/2006 | Luciano |
| 7,037,195 B2 | 5/2006 | Schneider et al. |
| 7,048,628 B2 | 5/2006 | Schneider |
| 7,048,630 B2 | 5/2006 | Berg et al. |
| 7,063,617 B2 | 6/2006 | Brosnan et al. |
| 7,076,329 B1 | 7/2006 | Kolls |
| 7,089,264 B1 | 8/2006 | Guido et al. |
| 7,094,148 B2 | 8/2006 | Bearlocher et al. |
| 7,105,736 B2 | 9/2006 | Laakso |
| 7,111,141 B2 | 9/2006 | Nelson |
| 7,144,321 B2 | 12/2006 | Mayeroff |
| 7,152,783 B2 | 12/2006 | Charrin |
| 7,169,041 B2 | 1/2007 | Tessmer et al. |
| 7,169,052 B2 | 1/2007 | Beaulieu et al. |
| 7,175,523 B2 | 2/2007 | Gilmore et al. |
| 7,181,228 B2 | 2/2007 | Boesch |
| 7,182,690 B2 | 2/2007 | Giobbi et al. |
| 7,198,571 B2 | 4/2007 | LeMay |
| RE39,644 E | 5/2007 | Alcorn et al. |
| 7,217,191 B2 | 5/2007 | Allen et al. |
| 7,243,104 B2 | 7/2007 | Bill |
| 7,247,098 B1 | 7/2007 | Bradford et al. |
| 7,259,718 B2 | 8/2007 | Patterson et al. |
| 7,275,989 B2 | 10/2007 | Moody |
| 7,285,047 B2 | 10/2007 | Gielb et al. |
| 7,311,608 B1 | 12/2007 | Danieli |
| 7,314,408 B2 | 1/2008 | Cannon et al. |
| 7,316,615 B2 | 1/2008 | Soltys et al. |
| 7,316,619 B2 | 1/2008 | Nelson |
| 7,318,775 B2 | 1/2008 | Brosnan et al. |
| 7,326,116 B2 | 2/2008 | O'Donovan et al. |
| 7,330,108 B2 | 2/2008 | Thomas |
| 7,346,358 B2 | 3/2008 | Wood et al. |
| 7,355,112 B2 | 4/2008 | Laakso |
| 7,384,338 B2 | 6/2008 | Rothschild et al. |
| 7,387,571 B2 | 6/2008 | Walker et al. |
| 7,393,278 B2 | 7/2008 | Gerson et al. |
| 7,396,990 B2 | 7/2008 | Lu et al. |
| 7,415,426 B2 | 8/2008 | Williams et al. |
| 7,425,177 B2 | 9/2008 | Rodgers et al. |
| 7,427,234 B2 | 9/2008 | Soltys et al. |
| 7,427,236 B2 | 9/2008 | Kaminkow et al. |
| 7,427,708 B2 | 9/2008 | Ohmura |
| 7,431,650 B2 | 10/2008 | Kessman |
| 7,448,949 B2 | 11/2008 | Kaminkow et al. |
| 7,500,913 B2 | 3/2009 | Baerlocher |
| 7,510,474 B2 | 3/2009 | Carter |

(56) References Cited

U.S. PATENT DOCUMENTS

| | | |
|---|---|---|
| 7,513,828 B2 | 4/2009 | Nguyen et al. |
| 7,519,838 B1 | 4/2009 | Suurballe |
| 7,559,838 B2 | 7/2009 | Walker et al. |
| 7,563,167 B2 | 7/2009 | Walker et al. |
| 7,572,183 B2 | 8/2009 | Olivas et al. |
| 7,585,222 B2 | 9/2009 | Muir |
| 7,602,298 B2 | 10/2009 | Thomas |
| 7,607,174 B1 | 10/2009 | Kashchenko et al. |
| 7,611,409 B2 | 11/2009 | Muir et al. |
| 7,637,810 B2 | 12/2009 | Amaitis et al. |
| 7,644,861 B2 | 1/2010 | Alderucci et al. |
| 7,653,757 B1 | 1/2010 | Fernald et al. |
| 7,693,306 B2 | 4/2010 | Huber |
| 7,699,703 B2 | 4/2010 | Muir et al. |
| 7,722,453 B2 | 5/2010 | Lark et al. |
| 7,758,423 B2 | 7/2010 | Foster et al. |
| 7,771,271 B2 | 8/2010 | Walker et al. |
| 7,780,529 B2 | 8/2010 | Rowe et al. |
| 7,780,531 B2 | 8/2010 | Englman et al. |
| 7,785,192 B2 | 8/2010 | Canterbury et al. |
| 7,811,172 B2 | 10/2010 | Asher et al. |
| 7,819,749 B1 | 10/2010 | Fish |
| 7,822,688 B2 | 10/2010 | Labron |
| 7,828,652 B2 | 11/2010 | Nguyen et al. |
| 7,828,654 B2 | 11/2010 | Carter |
| 7,828,661 B1 | 11/2010 | Fish |
| 7,850,528 B2 | 12/2010 | Wells |
| 7,874,919 B2 | 1/2011 | Paulsen et al. |
| 7,877,798 B2 | 1/2011 | Saunders et al. |
| 7,883,413 B2 | 2/2011 | Paulsen |
| 7,892,097 B2 | 2/2011 | Muir et al. |
| 7,909,692 B2 | 3/2011 | Nguyen et al. |
| 7,909,699 B2 | 3/2011 | Parrott et al. |
| 7,918,728 B2 | 4/2011 | Nguyen et al. |
| 7,927,211 B2 | 4/2011 | Rowe et al. |
| 7,927,212 B2 | 4/2011 | Hedrick et al. |
| 7,951,008 B2 | 5/2011 | Wolf et al. |
| 8,057,298 B2 | 11/2011 | Nguyen et al. |
| 8,057,303 B2 | 11/2011 | Rasmussen |
| 8,087,988 B2 | 1/2012 | Nguyen et al. |
| 8,117,608 B1 | 2/2012 | Slettehaugh et al. |
| 8,133,113 B2 | 3/2012 | Nguyen |
| 8,182,326 B2 | 5/2012 | Speers et al. |
| 8,210,927 B2 | 7/2012 | Hedrick |
| 8,221,245 B2 | 7/2012 | Walker |
| 8,226,459 B2 | 7/2012 | Barrett |
| 8,226,474 B2 | 7/2012 | Nguyen et al. |
| 8,231,456 B2 | 7/2012 | Zielinski |
| 8,235,803 B2 | 8/2012 | Loose et al. |
| 8,282,475 B2 | 10/2012 | Nguyen et al. |
| 8,323,099 B2 | 12/2012 | Durham et al. |
| 8,337,290 B2 | 12/2012 | Nguyen et al. |
| 8,342,946 B2 | 1/2013 | Amaitis |
| 8,393,948 B2 | 3/2013 | Allen et al. |
| 8,403,758 B2 | 3/2013 | Homik |
| 8,430,745 B2 | 4/2013 | Agarwal et al. |
| 8,461,958 B2 | 6/2013 | Saenz |
| 8,469,813 B2 | 6/2013 | Joshi |
| 8,529,345 B2 | 9/2013 | Nguyen |
| 8,597,108 B2 | 12/2013 | Nguyen |
| 8,602,875 B2 | 12/2013 | Nguyen |
| 8,613,655 B2 | 12/2013 | Kisenwether |
| 8,613,659 B2 | 12/2013 | Nelson et al. |
| 8,696,470 B2 | 4/2014 | Nguyen |
| 8,745,417 B2 | 6/2014 | Huang et al. |
| 8,834,254 B2 | 9/2014 | Buchholz et al. |
| 8,858,323 B2 | 10/2014 | Nguyen et al. |
| 8,864,586 B2 | 10/2014 | Nguyen |
| 8,942,995 B1 | 1/2015 | Kerr |
| 9,039,507 B2 | 5/2015 | Allen et al. |
| 9,235,952 B2 | 1/2016 | Nguyen |
| 9,292,996 B2 | 3/2016 | Davis et al. |
| 9,325,203 B2 | 4/2016 | Nguyen |
| 9,466,171 B2 | 10/2016 | Hornik |
| 9,483,901 B2 | 11/2016 | Nguyen |
| 9,486,697 B2 | 11/2016 | Nguyen |
| 9,486,704 B2 | 11/2016 | Nguyen |
| 9,530,277 B2 | 12/2016 | Nelson et al. |
| 9,576,425 B2 | 2/2017 | Nguyen |
| 9,595,161 B2 * | 3/2017 | Nguyen ............... A63F 13/335 |
| 9,607,474 B2 | 3/2017 | Nguyen |
| 9,626,826 B2 | 4/2017 | Nguyen |
| 9,666,021 B2 | 5/2017 | Nguyen |
| 9,672,686 B2 | 6/2017 | Nguyen |
| 9,741,205 B2 | 8/2017 | Nguyen |
| 9,811,973 B2 | 11/2017 | Nguyen |
| 9,814,970 B2 | 11/2017 | Nguyen |
| 9,842,462 B2 | 12/2017 | Nguyen |
| 9,875,606 B2 | 1/2018 | Nguyen |
| 9,875,609 B2 | 1/2018 | Nguyen |
| 9,981,180 B2 | 5/2018 | Koyanagi et al. |
| 10,068,429 B2 | 9/2018 | Gagner et al. |
| 10,115,270 B2 | 10/2018 | Gagner et al. |
| 10,140,816 B2 | 11/2018 | Nguyen |
| 10,325,447 B2 | 6/2019 | Malek |
| 10,421,010 B2 | 9/2019 | Nguyen |
| 10,438,446 B2 | 10/2019 | Nguyen |
| 10,445,978 B2 | 10/2019 | Nguyen |
| 2001/0004607 A1 | 6/2001 | Olsen |
| 2001/0016516 A1 | 8/2001 | Takatsuka |
| 2001/0024971 A1 | 9/2001 | Brossard |
| 2001/0031659 A1 | 10/2001 | Perrie |
| 2001/0047291 A1 | 11/2001 | Garahi |
| 2002/0006822 A1 | 1/2002 | Krintzman |
| 2002/0042295 A1 | 4/2002 | Walker et al. |
| 2002/0043759 A1 | 4/2002 | Vancura |
| 2002/0045474 A1 | 4/2002 | Singer |
| 2002/0107065 A1 | 8/2002 | Rowe |
| 2002/0111210 A1 | 8/2002 | Luciano, Jr. et al. |
| 2002/0111213 A1 | 8/2002 | McEntee et al. |
| 2002/0113369 A1 | 8/2002 | Weingardt |
| 2002/0116615 A1 | 8/2002 | Nguyen et al. |
| 2002/0133418 A1 | 9/2002 | Hammond et al. |
| 2002/0137217 A1 | 9/2002 | Rowe et al. |
| 2002/0142825 A1 | 10/2002 | Lark et al. |
| 2002/0145051 A1 | 10/2002 | Charrin |
| 2002/0147047 A1 | 10/2002 | Letovsky et al. |
| 2002/0147049 A1 | 10/2002 | Carter, Sr. |
| 2002/0151366 A1 | 10/2002 | Walker et al. |
| 2002/0152120 A1 | 10/2002 | Howington |
| 2002/0167536 A1 | 11/2002 | Valdes et al. |
| 2002/0177483 A1 | 11/2002 | Cannon |
| 2002/0183105 A1 | 12/2002 | Cannon et al. |
| 2003/0001338 A1 | 1/2003 | Bennett et al. |
| 2003/0003996 A1 | 1/2003 | Nguyen |
| 2003/0004871 A1 | 1/2003 | Rowe et al. |
| 2003/0008696 A1 | 1/2003 | Abecassis et al. |
| 2003/0027635 A1 | 2/2003 | Walker et al. |
| 2003/0064805 A1 | 4/2003 | Wells |
| 2003/0064807 A1 | 4/2003 | Walker et al. |
| 2003/0092480 A1 | 5/2003 | White et al. |
| 2003/0100361 A1 | 5/2003 | Sharpless et al. |
| 2003/0104860 A1 | 6/2003 | Cannon et al. |
| 2003/0104865 A1 | 6/2003 | Itkis et al. |
| 2003/0148809 A1 | 8/2003 | Nelson |
| 2003/0162588 A1 | 8/2003 | Brosnan et al. |
| 2003/0195024 A1 | 10/2003 | Slattery |
| 2003/0199295 A1 | 10/2003 | Vancura |
| 2003/0224852 A1 | 12/2003 | Walker et al. |
| 2003/0224854 A1 | 12/2003 | Joao |
| 2004/0002386 A1 | 1/2004 | Wolfe et al. |
| 2004/0005919 A1 | 1/2004 | Walker et al. |
| 2004/0023709 A1 | 2/2004 | Beaulieu et al. |
| 2004/0023716 A1 | 2/2004 | Gauselmann |
| 2004/0038736 A1 | 2/2004 | Bryant |
| 2004/0048650 A1 | 3/2004 | Mierau et al. |
| 2004/0068460 A1 | 4/2004 | Feeley |
| 2004/0082384 A1 | 4/2004 | Walker |
| 2004/0082385 A1 | 4/2004 | Silva et al. |
| 2004/0106449 A1 | 6/2004 | Walker et al. |
| 2004/0127277 A1 | 7/2004 | Walker |
| 2004/0127290 A1 | 7/2004 | Walker et al. |
| 2004/0137987 A1 | 7/2004 | Nguyen et al. |
| 2004/0147308 A1 | 7/2004 | Walker et al. |

(56) References Cited

U.S. PATENT DOCUMENTS

| | | |
|---|---|---|
| 2004/0152508 A1 | 8/2004 | Lind |
| 2004/0199631 A1 | 10/2004 | Natsume |
| 2004/0214622 A1 | 10/2004 | Atkinson |
| 2004/0224753 A1 | 11/2004 | Odonovan et al. |
| 2004/0229671 A1 | 11/2004 | Stronach |
| 2004/0256803 A1 | 12/2004 | Ko |
| 2004/0259633 A1 | 12/2004 | Gentles et al. |
| 2005/0003890 A1 | 1/2005 | Hedrick et al. |
| 2005/0004980 A1 | 1/2005 | Vadjinia |
| 2005/0026696 A1 | 2/2005 | Hashimoto et al. |
| 2005/0054446 A1 | 3/2005 | Kammler |
| 2005/0101376 A1 | 5/2005 | Walker et al. |
| 2005/0101383 A1 | 5/2005 | Wells |
| 2005/0130728 A1 | 6/2005 | Nguyen et al. |
| 2005/0130731 A1 | 6/2005 | Englman |
| 2005/0137014 A1 | 6/2005 | Vetelaninen |
| 2005/0170883 A1 | 8/2005 | Muskin et al. |
| 2005/0181865 A1 | 8/2005 | Luciano |
| 2005/0181870 A1 | 8/2005 | Nguyen et al. |
| 2005/0181875 A1 | 8/2005 | Hoehne |
| 2005/0187020 A1 | 8/2005 | Amaitis et al. |
| 2005/0202875 A1 | 9/2005 | Murphy et al. |
| 2005/0209002 A1 | 9/2005 | Blythe et al. |
| 2005/0221881 A1 | 10/2005 | Lannert |
| 2005/0223219 A1 | 10/2005 | Gatto et al. |
| 2005/0239546 A1 | 10/2005 | Hedrick |
| 2005/0255919 A1 | 11/2005 | Nelson |
| 2005/0273635 A1 | 12/2005 | Wilcox et al. |
| 2005/0277471 A1 | 12/2005 | Russell et al. |
| 2005/0282637 A1 | 12/2005 | Gatto et al. |
| 2006/0009283 A1 | 1/2006 | Englman et al. |
| 2006/0036874 A1 | 2/2006 | Cockerille |
| 2006/0046822 A1 | 3/2006 | Kaminkow et al. |
| 2006/0046830 A1 | 3/2006 | Webb |
| 2006/0046849 A1 | 3/2006 | Kovacs |
| 2006/0068893 A1 | 3/2006 | Jaffe et al. |
| 2006/0073869 A1 | 4/2006 | LeMay et al. |
| 2006/0073897 A1 | 4/2006 | Englman et al. |
| 2006/0079317 A1 | 4/2006 | Flemming et al. |
| 2006/0121972 A1 | 6/2006 | Walker |
| 2006/0126529 A1 | 6/2006 | Hardy |
| 2006/0148551 A1 | 7/2006 | Walker et al. |
| 2006/0189382 A1 | 8/2006 | Muir et al. |
| 2006/0217170 A1 | 9/2006 | Roireau |
| 2006/0217193 A1 | 9/2006 | Walker et al. |
| 2006/0247028 A1 | 11/2006 | Brosnan et al. |
| 2006/0247035 A1 | 11/2006 | Rowe et al. |
| 2006/0252530 A1 | 11/2006 | Oberberger et al. |
| 2006/0253481 A1 | 11/2006 | Guido et al. |
| 2006/0256135 A1 | 11/2006 | Aoyama |
| 2006/0281525 A1 | 12/2006 | Borissov |
| 2006/0281541 A1 | 12/2006 | Nguyen et al. |
| 2006/0287106 A1 | 12/2006 | Jensen |
| 2007/0004510 A1 | 1/2007 | Underdahl et al. |
| 2007/0026935 A1 | 2/2007 | Wolf et al. |
| 2007/0026942 A1 | 2/2007 | Kinsley |
| 2007/0054739 A1 | 3/2007 | Amaitis et al. |
| 2007/0060254 A1 | 3/2007 | Muir |
| 2007/0060306 A1 | 3/2007 | Amaitis et al. |
| 2007/0060319 A1 | 3/2007 | Block et al. |
| 2007/0060358 A1 | 3/2007 | Amaitas et al. |
| 2007/0077981 A1 | 4/2007 | Hungate et al. |
| 2007/0087833 A1 | 4/2007 | Feeney et al. |
| 2007/0087834 A1 | 4/2007 | Moser et al. |
| 2007/0093299 A1 | 4/2007 | Bergeron |
| 2007/0129123 A1 | 6/2007 | Eryou et al. |
| 2007/0129148 A1 | 6/2007 | Van Luchene |
| 2007/0149279 A1 | 6/2007 | Norden et al. |
| 2007/0149286 A1 | 6/2007 | Bemmel |
| 2007/0159301 A1 | 7/2007 | Hirt et al. |
| 2007/0161402 A1 | 7/2007 | Ng et al. |
| 2007/0184896 A1 | 8/2007 | Dickerson |
| 2007/0184904 A1 | 8/2007 | Lee |
| 2007/0191109 A1 | 8/2007 | Crowder et al. |
| 2007/0207852 A1 | 9/2007 | Nelson et al. |
| 2007/0207854 A1 | 9/2007 | Wolf et al. |
| 2007/0238505 A1 | 10/2007 | Okada |
| 2007/0241187 A1 | 10/2007 | Alderucci et al. |
| 2007/0248036 A1 | 10/2007 | Nevalainen |
| 2007/0257430 A1 | 11/2007 | Hardy et al. |
| 2007/0259713 A1 | 11/2007 | Fiden et al. |
| 2007/0259717 A1 | 11/2007 | Mattice et al. |
| 2007/0270213 A1 | 11/2007 | Nguyen et al. |
| 2007/0275777 A1 | 11/2007 | Walker et al. |
| 2007/0275779 A1 | 11/2007 | Amaitis et al. |
| 2007/0281782 A1 | 12/2007 | Amaitis et al. |
| 2007/0281785 A1 | 12/2007 | Amaitas et al. |
| 2007/0298873 A1 | 12/2007 | Nguyen et al. |
| 2008/0015032 A1 | 1/2008 | Bradford et al. |
| 2008/0020824 A1 | 1/2008 | Cuddy et al. |
| 2008/0020845 A1 | 1/2008 | Low |
| 2008/0032787 A1 | 2/2008 | Low et al. |
| 2008/0070652 A1 | 3/2008 | Nguyen et al. |
| 2008/0070681 A1 | 3/2008 | Marks et al. |
| 2008/0076505 A1 | 3/2008 | Nguyen |
| 2008/0076506 A1 | 3/2008 | Nguyen et al. |
| 2008/0076548 A1 | 3/2008 | Paulsen |
| 2008/0076572 A1 | 3/2008 | Nguyen et al. |
| 2008/0096650 A1 | 4/2008 | Baerlocher |
| 2008/0102916 A1 | 5/2008 | Kovacs |
| 2008/0102956 A1 | 5/2008 | Burman et al. |
| 2008/0102957 A1 | 5/2008 | Burnman et al. |
| 2008/0113772 A1 | 5/2008 | Burrill et al. |
| 2008/0119267 A1 | 5/2008 | Denlay |
| 2008/0013906 A1 | 6/2008 | Lutnick |
| 2008/0139306 A1 | 6/2008 | Lutnick |
| 2008/0146321 A1 | 6/2008 | Parente |
| 2008/0146344 A1 | 6/2008 | Rowe et al. |
| 2008/0150902 A1 | 6/2008 | Edpalm et al. |
| 2008/0153583 A1 | 6/2008 | Huntley et al. |
| 2008/0161110 A1 | 7/2008 | Campbell |
| 2008/0167106 A1 | 7/2008 | Lutnick et al. |
| 2008/0182667 A1 | 7/2008 | Davis et al. |
| 2008/0200251 A1 | 8/2008 | Alderucci |
| 2008/0207307 A1 | 8/2008 | Cunningham, II et al. |
| 2008/0214258 A1 | 9/2008 | Brosnan et al. |
| 2008/0215319 A1 | 9/2008 | Lu |
| 2008/0234047 A1 | 9/2008 | Nguyen |
| 2008/0238610 A1 | 10/2008 | Rosenbereg |
| 2008/0248849 A1 | 10/2008 | Lutnick |
| 2008/0248865 A1 | 10/2008 | Cole |
| 2008/0252419 A1 | 10/2008 | Batchelor |
| 2008/0254878 A1 | 10/2008 | Sauders et al. |
| 2008/0254881 A1 | 10/2008 | Lutnick et al. |
| 2008/0254883 A1 | 10/2008 | Patel et al. |
| 2008/0254891 A1 | 10/2008 | Sauders et al. |
| 2008/0254892 A1 | 10/2008 | Sauders et al. |
| 2008/0254897 A1 | 10/2008 | Sauders et al. |
| 2008/0263173 A1 | 10/2008 | Weber et al. |
| 2008/0300058 A1 | 12/2008 | Sum et al. |
| 2008/0305864 A1 | 12/2008 | Kelly et al. |
| 2008/0305865 A1 | 12/2008 | Kelly et al. |
| 2008/0305866 A1 | 12/2008 | Kelly et al. |
| 2008/0311994 A1 | 12/2008 | Amaitas et al. |
| 2008/0318669 A1 | 12/2008 | Buchholz |
| 2008/0318686 A1 | 12/2008 | Crowder et al. |
| 2009/0005165 A1 | 1/2009 | Arezina et al. |
| 2009/0011822 A1 | 1/2009 | Englman |
| 2009/0017906 A1 | 1/2009 | Jackson |
| 2009/0021381 A1 | 1/2009 | Higuchi |
| 2009/0029766 A1 | 1/2009 | Lutnick et al. |
| 2009/0054149 A1 | 2/2009 | Brosnan et al. |
| 2009/0077396 A1 | 3/2009 | Tsai et al. |
| 2009/0088258 A1 | 4/2009 | Saunders et al. |
| 2009/0098925 A1 | 4/2009 | Gagner et al. |
| 2009/0104977 A1 | 4/2009 | Zielinski |
| 2009/0104983 A1 | 4/2009 | Okada |
| 2009/0118002 A1 | 5/2009 | Lyons |
| 2009/0118013 A1 | 5/2009 | Finnimore et al. |
| 2009/0118022 A1 | 5/2009 | Lyons et al. |
| 2009/0124366 A1 | 5/2009 | Aoki et al. |
| 2009/0124390 A1 | 5/2009 | Seelig et al. |
| 2009/0131146 A1 | 5/2009 | Arezina et al. |
| 2009/0131151 A1 | 5/2009 | Harris et al. |

(56) References Cited

U.S. PATENT DOCUMENTS

| | | |
|---|---|---|
| 2009/0132163 A1 | 5/2009 | Ashley et al. |
| 2009/0137255 A1 | 5/2009 | Ashley et al. |
| 2009/0138133 A1 | 5/2009 | Buchholz et al. |
| 2009/0143141 A1 | 6/2009 | Wells |
| 2009/0149245 A1 | 6/2009 | Fabbri |
| 2009/0149261 A1 | 6/2009 | Chen et al. |
| 2009/0153342 A1 | 6/2009 | Thorn |
| 2009/0156303 A1 | 6/2009 | Kiely et al. |
| 2009/0163272 A1 | 6/2009 | Baker |
| 2009/0176578 A1 | 7/2009 | Herrmann et al. |
| 2009/0191962 A1 | 7/2009 | Hardy et al. |
| 2009/0197684 A1 | 8/2009 | Arezina et al. |
| 2009/0216547 A1 | 8/2009 | Canora et al. |
| 2009/0219901 A1 | 9/2009 | Bull et al. |
| 2009/0221342 A1 | 9/2009 | Katz et al. |
| 2009/0227302 A1 | 9/2009 | Abe |
| 2009/0239666 A1 | 9/2009 | Hall et al. |
| 2009/0264190 A1 | 10/2009 | Davis et al. |
| 2009/0270170 A1 | 10/2009 | Patton |
| 2009/0271287 A1 | 10/2009 | Halpern |
| 2009/0275410 A1 | 11/2009 | Kisenwether et al. |
| 2009/0275411 A1 | 11/2009 | Kisenwether et al. |
| 2009/0280910 A1 | 11/2009 | Gagner et al. |
| 2009/0282469 A1 | 11/2009 | Lynch |
| 2009/0298468 A1 | 12/2009 | Hsu |
| 2010/0002897 A1 | 1/2010 | Keady |
| 2010/0004058 A1 | 1/2010 | Acres |
| 2010/0016069 A1 | 1/2010 | Herrmann |
| 2010/0049738 A1 | 2/2010 | Mathur et al. |
| 2010/0056248 A1 | 3/2010 | Acres |
| 2010/0062833 A1 | 3/2010 | Mattice et al. |
| 2010/0062840 A1 | 3/2010 | Herrmann et al. |
| 2010/0079237 A1 | 4/2010 | Falk |
| 2010/0081501 A1 | 4/2010 | Carpenter et al. |
| 2010/0081509 A1 | 4/2010 | Burke |
| 2010/0099499 A1 | 4/2010 | Amaitis et al. |
| 2010/0105454 A1 | 4/2010 | Weber et al. |
| 2010/0106612 A1 | 4/2010 | Gupta |
| 2010/0115591 A1 | 5/2010 | Kane-Esrig |
| 2010/0120486 A1 | 5/2010 | DeWaal |
| 2010/0124967 A1 | 5/2010 | Lutnick et al. |
| 2010/0130276 A1 | 5/2010 | Fiden |
| 2010/0160035 A1 | 6/2010 | Herrmann |
| 2010/0160043 A1 | 6/2010 | Fujimoto et al. |
| 2010/0178977 A1 | 7/2010 | Kim et al. |
| 2010/0184509 A1 | 7/2010 | Sylla |
| 2010/0197383 A1 | 8/2010 | Rader et al. |
| 2010/0197385 A1 | 8/2010 | Aoki et al. |
| 2010/0203955 A1 | 8/2010 | Sylla |
| 2010/0203963 A1 | 8/2010 | Allen |
| 2010/0227662 A1 | 9/2010 | Speers et al. |
| 2010/0227670 A1 | 9/2010 | Arezina et al. |
| 2010/0227671 A1 | 9/2010 | Laaroussi |
| 2010/0227687 A1 | 9/2010 | Speers et al. |
| 2010/0234091 A1 | 9/2010 | Baerlocher et al. |
| 2010/0279764 A1 | 11/2010 | Allen et al. |
| 2010/0323780 A1 | 12/2010 | Acres |
| 2010/0325703 A1 | 12/2010 | Etchegoyen |
| 2011/0009181 A1 | 1/2011 | Speers et al. |
| 2011/0039615 A1 | 2/2011 | Acres |
| 2011/0053679 A1 | 3/2011 | Canterbury et al. |
| 2011/0065492 A1 | 3/2011 | Acres |
| 2011/0105216 A1 | 5/2011 | Cohen |
| 2011/0111827 A1 | 5/2011 | Nicely et al. |
| 2011/0111843 A1 | 5/2011 | Nicely et al. |
| 2011/0111860 A1 | 5/2011 | Nguyen |
| 2011/0118010 A1 | 5/2011 | Brune |
| 2011/0159966 A1 | 6/2011 | Gura et al. |
| 2011/0183732 A1 | 7/2011 | Block |
| 2011/0183749 A1 | 7/2011 | Allen |
| 2011/0207525 A1 | 8/2011 | Allen |
| 2011/0212711 A1 | 9/2011 | Scott |
| 2011/0212767 A1 | 9/2011 | Barclay et al. |
| 2011/0223993 A1 | 9/2011 | Allen et al. |
| 2011/0244952 A1 | 10/2011 | Schueller |
| 2011/0263318 A1 | 10/2011 | Agarwal et al. |
| 2011/0269548 A1 | 11/2011 | Barclay et al. |
| 2011/0306400 A1 | 12/2011 | Nguyen |
| 2011/0306426 A1 | 12/2011 | Novak et al. |
| 2012/0015709 A1 | 1/2012 | Bennett et al. |
| 2012/0028703 A1 | 2/2012 | Anderson et al. |
| 2012/0028718 A1 | 2/2012 | Barclay et al. |
| 2012/0034968 A1 | 2/2012 | Watkins et al. |
| 2012/0046110 A1 | 2/2012 | Amaitis |
| 2012/0094769 A1 | 4/2012 | Nguyen et al. |
| 2012/0100908 A1 | 4/2012 | Wells |
| 2012/0108319 A1 | 5/2012 | Caputo et al. |
| 2012/0122561 A1 | 5/2012 | Hedrick |
| 2012/0122567 A1 | 5/2012 | Gangadharan et al. |
| 2012/0122584 A1 | 5/2012 | Nguyen |
| 2012/0122590 A1 | 5/2012 | Nguyen |
| 2012/0172130 A1 | 7/2012 | Acres |
| 2012/0184362 A1 | 7/2012 | Barclay et al. |
| 2012/0184363 A1 | 7/2012 | Barclay et al. |
| 2012/0190426 A1 | 7/2012 | Acres |
| 2012/0194448 A1 | 8/2012 | Rothkopf |
| 2012/0208618 A1 | 8/2012 | Frerking |
| 2012/0231885 A1 | 9/2012 | Speer, II |
| 2012/0239566 A1 | 9/2012 | Everett |
| 2012/0322563 A1 | 12/2012 | Nguyen et al. |
| 2012/0330740 A1 | 12/2012 | Pennington et al. |
| 2013/0005433 A1 | 1/2013 | Holch |
| 2013/0005443 A1 | 1/2013 | Kosta |
| 2013/0005453 A1 | 1/2013 | Nguyen et al. |
| 2013/0059650 A1 | 3/2013 | Sylla et al. |
| 2013/0065668 A1 | 3/2013 | LeMay |
| 2013/0281188 A1 | 3/2013 | Guinn |
| 2013/0103965 A1 | 4/2013 | Golembeski |
| 2013/0104193 A1 | 4/2013 | Gatto et al. |
| 2013/0130766 A1 | 5/2013 | Harris et al. |
| 2013/0132745 A1 | 5/2013 | Schoening et al. |
| 2013/0165210 A1 | 6/2013 | Nelson |
| 2013/0185559 A1 | 7/2013 | Morel |
| 2013/0196756 A1 | 8/2013 | Nguyen |
| 2013/0196776 A1 | 8/2013 | Nguyen |
| 2013/0210513 A1 | 8/2013 | Nguyen |
| 2013/0210514 A1 | 8/2013 | Nguyen |
| 2013/0210530 A1 | 8/2013 | Nguyen |
| 2013/0225279 A1 | 8/2013 | Patceg |
| 2013/0225282 A1 | 8/2013 | Williams et al. |
| 2013/0252730 A1 | 9/2013 | Joshi |
| 2013/0316808 A1 | 11/2013 | Nelson |
| 2013/0337878 A1 | 12/2013 | Shepherd |
| 2014/0006129 A1 | 1/2014 | Heath |
| 2014/0057716 A1 | 2/2014 | Massing et al. |
| 2014/0087862 A1 | 3/2014 | Burke |
| 2014/0094295 A1 | 4/2014 | Nguyen |
| 2014/0094316 A1 | 4/2014 | Nguyen |
| 2014/0121005 A1 | 5/2014 | Nelson |
| 2014/0179431 A1 | 6/2014 | Nguyen |
| 2014/0274306 A1 | 9/2014 | Crawford |
| 2014/0274309 A1 | 9/2014 | Nguyen |
| 2014/0274319 A1 | 9/2014 | Nguyen |
| 2014/0274320 A1 | 9/2014 | Nguyen |
| 2014/0274342 A1 | 9/2014 | Nguyen |
| 2014/0274357 A1 | 9/2014 | Nguyen |
| 2014/0274360 A1 | 9/2014 | Nguyen |
| 2014/0274367 A1 | 9/2014 | Nguyen |
| 2014/0274388 A1 | 9/2014 | Nguyen |
| 2015/0089595 A1 | 3/2015 | Telles |
| 2015/0133223 A1 | 5/2015 | Carter |
| 2015/0143543 A1 | 8/2015 | Phegade |
| 2016/0125695 A1 | 5/2016 | Nguyen |
| 2017/0016819 A1 | 4/2017 | Nguyen |
| 2017/0116819 A1 | 4/2017 | Nguyen |
| 2017/0116823 A1 | 4/2017 | Nguyen |
| 2017/0144071 A1 | 5/2017 | Nguyen |
| 2017/0148259 A1 | 5/2017 | Nguyen |
| 2017/0148261 A1 | 5/2017 | Nguyen |
| 2017/0148263 A1 | 5/2017 | Nguyen |
| 2017/0206734 A1 | 7/2017 | Nguyen |
| 2017/0228979 A1 | 8/2017 | Nguyen |
| 2017/0337770 A1 | 11/2017 | Nguyen |
| 2018/0144581 A1 | 5/2018 | Nguyen |

(56) References Cited

U.S. PATENT DOCUMENTS

| | | | |
|---|---|---|---|
| 2019/0005773 | A1 | 1/2019 | Nguyen |
| 2019/0122490 | A1 | 4/2019 | Nguyen |
| 2019/0122492 | A1 | 4/2019 | Nguyen |
| 2019/0213829 | A1 | 7/2019 | Nguyen |

FOREIGN PATENT DOCUMENTS

| | | |
|---|---|---|
| GB | 2096376 | 10/1982 |
| GB | 2097570 | 11/1982 |
| GB | 2335524 | 9/1999 |
| PH | 12005000454 | 5/2007 |
| WO | WO 05073933 | 8/2005 |
| WO | WO 2008/027621 | 3/2008 |
| WO | WO 2009/026309 | 2/2009 |
| WO | WO 2009/062148 | 5/2009 |
| WO | WO 2010/017252 A1 | 2/2010 |

OTHER PUBLICATIONS

Finnegan, Amanda, "Casinos Connecting with Customers via iPhone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian, "Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champaign, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
IAPS, Daily Systems LLC, 2010.
U.S. Appl. No. 12/945,888, filed Nov. 14, 2010.
U.S. Appl. No. 12/945,889, filed Nov. 14, 2010.
U.S. Appl. No. 13/622,702, filed Sep. 19, 2012.
U.S. Appl. No. 13/800,917, filed Mar. 13, 2013.
U.S. Appl. No. 13/296,182, filed Nov. 15, 2011.
U.S. Appl. No. 13/801,234, filed Mar. 13, 2013.
U.S. Appl. No. 13/801,171, filed Mar. 13, 2013.
U.S. Appl. No. 13/843,192, filed Mar. 15, 2013.
U.S. Appl. No. 13/843,087, filed Mar. 15, 2013.
U.S. Appl. No. 13/632,743, filed Oct. 1, 2012.
U.S. Appl. No. 13/632,828, filed Oct. 1, 2012.
U.S. Appl. No. 13/833,953, filed Mar. 15, 2013.
U.S. Appl. No. 12/619,672, filed Nov. 16, 2009.
U.S. Appl. No. 13/801,121, filed Mar. 13, 2013.
U.S. Appl. No. 12/581,115, filed Oct. 17, 2009.
U.S. Appl. No. 13/801,076, filed Mar. 13, 2013.
U.S. Appl. No. 12/617,717, filed Nov. 12, 2009.
U.S. Appl. No. 13/633,118, filed Oct. 1, 2012.
U.S. Appl. No. 12/797,610, filed Jun. 10, 2010.
U.S. Appl. No. 13/801,256, filed Mar. 13, 2013.
U.S. Appl. No. 12/757,968, filed Apr. 9, 2010.
U.S. Appl. No. 12/797,616, filed Jun. 10, 2010.
U.S. Appl. No. 13/557,063, filed Jul. 24, 2012.
U.S. Appl. No. 13/833,116, filed Mar. 15, 2013.
U.S. Appl. No. 13/801,271, filed Mar. 13, 2011.
Office Action for U.S. Appl. No. 12/945,888 dated Apr. 10, 2012.
Final Office Action for U.S. Appl. No. 12/945,888 dated Sep. 21, 2012.
Advisory Action for U.S. Appl. No. 12/945,888 dated Jan. 30, 2013.
Office Action for U.S. Appl. No. 12/581,115 dated Dec. 20, 2011.
Final Office Action for U.S. Appl. No. 12/581,115 dated Sep. 13, 2012.
Notice of Allowance for U.S. Appl. No. 12/581,115 dated May 24, 2013.
Office Action for U.S. Appl. No. 12/619,672 dated Dec. 20, 2011.
Final Office Action for U.S. Appl. No. 12/619,672 dated Nov. 6, 2012.
Office Action for U.S. Appl. No. 12/619,672 dated March, 7, 2013.
Office Action for U.S. Appl. No. 12/617,717 dated Oct. 4, 2011.
Office Action for U.S. Appl. No. 12/617,717 dated Apr. 4, 2012.
Advisory Action for U.S. Appl. No. 12/617,717 dated Jun. 12, 2011.
Office Action for U.S. Appl. No. 12/617,717 dated Jun. 17, 2013.
Office Action for U.S. Appl. No. 12/797,610 dated Dec. 8, 2011.
Final Office Action for U.S. Appl. No. 12/797,610 dated Jun. 6, 2012.
Office Action for U.S. Appl. No. 12/797,610 dated Feb. 26, 2013.
Office Action for U.S. Appl. No. 12/757,968, dated May 9, 2012.
Final Office Action for U.S. Appl. No. 12/757,968, dated Nov. 29, 2012.
Office Action for U.S. Appl. No. 12/757,968, dated Apr. 25, 2013.
Office Action for U.S. Appl. No. 12/797,616 dated Mar. 15, 2012.
Final Office Action for U.S. Appl. No. 12/797,616 dated Oct. 13, 2012.
Office Action for U.S. Appl. No. 12/797,616 dated Feb. 13, 2013.
Final Office Action for U.S. Appl. No. 12/797,616 dated May 8, 2013.
Office Action for U.S. Appl. No. 13/296,182 dated Dec. 5, 2012.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Notice of Allowance of U.S. Appl. No. 12/619,672, dated Aug. 23, 2013.
Office Action for U.S. Appl. No. 13/633,118, dated Sep. 20, 2013.
Office Action for U.S. Appl. No. 13/801,256, dated Jul. 2, 2013.
Notice of Allowance for U.S. Appl. No. 12/619,672, dated Oct. 3, 2013.
Notice of Allowance for U.S. Appl. No. 12/757,968, dated Oct. 11, 2013.
Final Office Action for U.S. Appl. No. 12/797,610, dated Jul. 10, 2013.
Notice of Allowance for U.S. Appl. No. 12/757,968, dated Dec. 18, 2013.
Office Action for U.S. Appl. No. 12/945,889, dated Dec. 18, 2013.
Office Action for U.S. Appl. No. 13/632,828, dated Jul. 30, 2013.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Office Action for U.S. Appl. No. 13/801,271, dated Oct. 31, 2014.
Final Office Action for U.S. Appl. No. 13/843,192, dated Oct. 21, 2014.
Office Action for U.S. Appl. No. 13/632,743, dated Oct. 23, 2014.
Office Action for U.S. Appl. No. 12/945,889, dated Oct. 23, 2014.
Office Action for U.S. Appl. No. 13/632,828, dated Nov. 7, 2014.
Office Action for U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.

(56) References Cited

OTHER PUBLICATIONS

Office Action for U.S. Appl. No. 13/833,116, dated Mar. 27, 2015.
Office Action for U.S. Appl. No. 13/632,828, dated Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 13/843,192, dated Jun. 19, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.
Final Office Action for U.S. Appl. No. 13/801,234, dated Aug. 14, 2015.
Final Office Action for U.S. Appl. No. 13/833,116, dated Sep. 24, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Notice of Allowance for U.S. Appl. No. 13/557,063, dated Dec. 23, 2015.
Office Action for U.S. Appl. No. 13/296,182, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016..
Office Action for U.S. Appl. No. 13/843,087, dated Feb. 25, 2016.
Office Action for U.S. Appl. No. 13/800,917, dated Feb. 25, 2016.
Advisory Action for U.S. Appl. No. 13/632,828, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Office Action for U.S. Appl. No. 13/622,702, dated Mar. 22, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Final Office Action for U.S. Appl. No. 14/017,159, dated Jun. 6, 2016.
Office Action for U.S. Appl. No. 13/801,171, dated Jun. 6, 2016.
Office Action for U.S. Appl. No. 13/843,192, dated Jun. 9, 2016.
Final OA for U.S. Appl. No. 12/945,888, filed Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Restriction Requirement for U.S. Appl. No. 13/296,182, dated Oct. 12, 2012.
Advisory Action for U.S. Appl. No. 13/296,182, dated May 8, 2014.
Advisory Action for U.S. Appl. No. 13/843,192, dated May 8, 2014.
Notice of Allowance for U.S. Appl. No. 13/843,192, dated Aug. 10, 2016.
Office Action for U.S. Appl. No. 14/217,066, dated Dec. 22, 2016.
Final Office Action for U.S. Appl. No. 14/216,986, dated Sep. 23, 2016.
Office Action for U.S. Appl. No. 14/017,159, dated Sep. 23, 2016.
Office Action for U.S. Appl. No. 13/632,743, dated Sep. 23, 2016.
Final Office Action for U.S. Appl. No. 13/801,234, dated Oct. 14, 2016.
Final Office Action for U.S. Appl. No. 13/843,087, dated Oct. 13, 2016.
Final Office Action for U.S. Appl. No. 13/622,702, dated Oct. 13, 2016.
Office Action for U.S. Appl. No. 14/189,948, dated Nov. 7, 2016.
Final Office Action for U.S. Appl. No. 14/211,536, dated Mar. 14, 2014.
Notice of Allowance for U.S. Appl. No. 13/833,116, dated Oct. 11, 2016.
Notice of Allowance for U.S. Appl. No. 13/801,271, dated Dec. 2, 2016.
Notice of Allowance for U.S. Appl. No. 12/797,610, dated Dec. 7, 2016.
Notice of Allowance for U.S. Appl. No. 13/632,828, dated Dec. 16, 2016.
Final Office Action for U.S. Appl. No. 13/801,171, dated Dec. 19, 2016.
Notice of Allowance for U.S. Appl. No. 14/211,536, dated Dec. 28, 2016.
Notice of Allowance for U.S. Appl. No. 13/801,256, dated Jan. 20, 2017.
Office Action for U.S. Appl. No. 13/800,917, dated Feb. 3, 2017.
Final Office Action for U.S. Appl. No. 12/797,616, dated Feb. 10, 2017.
Office Action for U.S. Appl. No. 12/945,888, dated Feb. 28, 2017.
Final Office Action for U.S. Appl. No. 14/189,948, dated Mar. 17, 2017.
Office Action for U.S. Appl. No. 15/400,840, dated Mar. 10, 2017.
Notice of Allowance for U.S. Appl. No. 13/801,121, dated Mar. 29, 2017.
Office Action for U.S. Appl. No. 15/270,333, dated Mar. 30, 2017.
Office Action for U.S. Appl. No. 15/402,945, dated Apr. 5, 2017.
Office Action for U.S. Appl. No. 15/271,488, dated Apr. 19, 2017.
Final Office Action for U.S. Appl. No. 14/217,066, dated Apr. 21, 2017.
Office Action for U.S. Appl. No. 14/216,986 dated Apr. 26, 2017.
Office Action for U.S. Appl. No. 13/801,171, dated Jun. 14, 2017.
Office Action for U.S. Appl. No. 14/017,159, dated Jun. 29, 2017.
Notice of Allowance for U.S. Appl. No. 15/270,333, dated Jul. 5, 2017.
Final Office Action for U.S. Appl. No. 13/800,917, dated Jul. 13, 2017.
Notice of Allowance for U.S. Appl. No. 13/801,234, dated Jul. 5, 2017.
Notice of Allowance for U.S. Appl. No. 14/217,066, dated Jul. 14, 2017.
Final Office Action for U.S. Appl. No. 14/518,909, dated Jul. 19, 2017.
Final Office Action for U.S. Appl. No. 13/801,121, dated Sep. 15, 2016.
Advisory Action for U.S. Appl. No. 13/801,121, dated Jul. 17, 2015.
Advisory Action for U.S. Appl. No. 13/801,121, dated Jul. 19, 2016.
Notice of Allowance for U.S. Appl. No. 15/293,751, dated Aug. 4, 2017.
Advisory Action for U.S. Appl. No. 14/189,948, dated Jul. 28, 2017.
Final OA for U.S. Appl. No. 13/801,256, filed Aug. 15, 2014.
Final OA for U.S. Appl. No. 13/801,256, filed Feb. 18, 2015.
Advisory Action for U.S. Appl. No. 13/801,256, dated Dec. 5, 2014.
Office Action for U.S. Appl. No. 13/801,256, dated Jan. 12, 2016.

(56) References Cited

OTHER PUBLICATIONS

Final Office Action for U.S. Appl. No. 13/801,256, dated Aug. 16, 2016.
Office Action for U.S. Appl. No. 13/622,702, dated Aug. 31, 2017.
Office Action for U.S. Appl. No. 12/945,888, dated Sep. 1, 2017.
Office Action for U.S. Appl. No. 14/017,150, dated Sep. 7, 2017.
Notice of Allowance for U.S. Appl. No. 14/189,948, dated Sep. 13, 2017.
Office Action for U.S. Appl. No. 15/138,086, dated Oct. 19, 2017.
Notice of Allowance for U.S. Appl. No. 15/402,945 dated Nov. 21, 2017.
Final Office Action for U.S. Appl. No. 13/801,171, dated Dec. 13, 2017.
Final Office Action for U.S. Appl. No. 15/271,488, dated Dec. 21, 2017.
Office Action for U.S. Appl. No. 15/671,133, dated Dec. 22, 2017.
Final Office Action for U.S. Appl. No. 14/216,986, dated Dec. 26, 2017.
Restriction Requirement for U.S. Appl. No. 15/427,307, dated Jan. 17, 2018.
Office Action for U.S. Appl. No. 15/798,363, dated Jan. 26, 2018.
Office Action for U.S. Appl. No. 15/427,291, dated Jan. 29, 2018.
Final Office Action for U.S. Appl. No. 14/017,159, dated Feb. 1, 2018.
Final Office Action for U.S. Appl. No. 13/622,702, dated Feb. 22, 2018.
Office Action for U.S. Appl. No. 15/811,654, dated Feb. 22, 2018.
Final Office Action for U.S. Appl. No. 13/622,702, dated Feb. 27, 2018.
Final Office Action for U.S. Appl. No. 15/427,308, dated Mar. 19, 2018.
Office Action for U.S. Appl. No. 15/876,095, dated Apr. 3, 2018.
Office Action for U.S. Appl. No. 15/835,448, dated Apr. 4, 2018.
Office Action for U.S. Appl. No. 15/427,307, dated Apr. 9, 2018.
Office Action for U.S. Appl. No. 14/216,986, dated Apr. 6, 2018.
Office Action for U.S. Appl. No. 15/426,898 dated Apr. 16, 2018.
Notice of Allowance for U.S. Appl. No. 15/402,945, dated May 25, 2018.
Office Action for U.S. Appl. No. 15/495,973, dated Jun. 4, 2018.
Notice of Allowance for U.S. Appl. No. 15/427,291 dated Jun. 18, 2018.
Notice of Allowance for U.S. Appl. No. 15/271,488, dated Jun. 19, 2018.
Notice of Allowance for U.S. Appl. No. 15/480,295, dated Jun. 20, 2018.
Office Action for U.S. Appl. No. 14/963,106, dated Jun. 22, 2018.
Office Action for U.S. Appl. No. 14/993,055, dated Jun. 22, 2018.
Final Office Action for U.S. Appl. No. 15/427,307, dated Jul. 9, 2018.
Notice of Allowance for U.S. Appl. No. 13/633,118, dated Aug. 3, 2018.
Office Action for U.S. Appl. No. 15/671,133, dated Aug. 9, 2018.
Office Action for U.S. Appl. No. 15/427,308, dated Aug. 15, 2018.
Office Action for U.S. Appl. No. 15/798,363, dated Aug. 29, 2018.
Office Action for U.S. Appl. No. 15/428,922 dated Sep. 17, 2018.
Office Action for U.S. Appl. No. 15/495,975, dated Sep. 21, 2018.
Notice of Allowance for U.S. Appl. No. 15/271,488, dated Sep. 24, 2018.
Notice of Allowance for U.S. Appl. No. 15/876,095, dated Sep. 24, 2018.
Office Action for U.S. Appl. No. 13/622,702, dated Oct. 3, 2018.
Office Action for U.S. Appl. No. 15/293,751, dated Apr. 6, 2017.
Notice of Allowance for U.S. Appl. No. 13/801,171, dated Oct. 31, 2018.
Final Office Action for U.S. Appl. No. 15/835,448, dated Nov. 2, 2018.
Final Office Action for U.S. Appl. No. 15/480,295, dated Nov. 7, 2018.
Final Office Action for U.S. Appl. No. 14/963,106, dated Dec. 14, 2018.
Final Office Action for U.S. Appl. No. 14/993,055, dated Dec. 14, 2018.
Office Action for US Patent Application No. 16/162,358, dated Dec. 31, 2018.
Office Action for U.S. Appl. No. 14/017,159, dated Jan. 11, 2019.
Office Action for U.S. Appl. No. 15/426,898, dated Jan. 11, 2019.
Final Office Action for U.S. Appl. No. 15/495,973, dated Jan. 11, 2019.
Office Action for U.S. Appl. No. 14/216,986, dated Jan. 14, 2019.
Office Action for U.S. Appl. No. 15/427,307, dated Jan. 18, 2019.
Final Office Action for U.S. Appl. No. 15/798,363, dated Feb. 4, 2019.
Office Action for U.S. Appl. No. 16/125,614, dated Feb. 25, 2019.
Final Office Action for U.S. Appl. No. 15/495,975, dated Apr. 18, 2019.
Office Action for U.S. Appl. No. 15/671,133, dated May 1, 2019.
Notice of Allowance for U.S. Appl. No. 14/216,986, dated May 17, 2019.
Notice of Allowance for U.S. Appl. No. 14/518,909, dated May 17, 2019.
Office Action for U.S. Appl. No. 12/797,616, dated Jun. 5, 2019.
Office Action for U.S. Appl. No. 15/427,308, dated Jun. 14, 2019.
Office Action for U.S. Appl. No. 15/811,654, dated Jun. 14, 2019.
Office Action for U.S. Appl. No. 15/674,480, dated Jun. 20, 2019.
Notice of Allowance for U.S. Appl. No. 15/835,448, dated Jul. 3, 2019.
Final Office Action for U.S. Appl. No. 16/162,358, dated Jul. 11, 2019.
Office Action for U.S. Appl. No. 16/190,050, dated Sep. 19, 2019.
Office Action for U.S. Appl. No. 14/017,150, dated Oct. 9, 2019.
Final Office Action for U.S. Appl. No. 15/671,133, dated Oct. 18, 2019.
Office Action for U.S. Appl. No. 15/835,448 dated Oct. 12, 2019.
Notice of Allowance for U.S. Appl. No. 15/495,975, dated Oct. 23, 2019.
Notice of Allowance for U.S. Appl. No. 14/993,005, dated Nov. 27, 2019.
Final Office Action for U.S. Appl. No. 15/427,308, dated Nov. 27, 2019.
Office Action for U.S. Appl. No. 15/798,363, dated Jan. 8, 2020.
Office Action for U.S. Appl. No. 15/835,448, dated Mar. 5, 2020.
Office Action for U.S. Appl. No. 15/495,975, dated Mar. 17, 2020.
Office Action for U.S. Appl. No. 16/248,759, dated Apr. 1, 2020.
Final Office Action for U.S. Appl. No. 14/017,150, dated Apr. 17, 2020.
Notice of Allowance for U.S. Appl. No. 15/798,363, dated May 12, 2020.
Office Action for U.S. Appl. No. 16/357,316, dated May 21, 2020.

* cited by examiner

GAMING MACHINES HAVING PORTABLE DEVICE DOCKING STATION

CROSS-REFERENCE TO RELATED APPLICATIONS

This application is continuation of U.S. patent application Ser. No. 16/214,123, filed Dec. 9, 2018, and entitled "PORTABLE INTERMEDIARY TRUSTED DEVICE", which is hereby incorporated herein by reference for all purposes, and which in turn is a continuation of U.S. patent application Ser. No. 15/876,095, filed Jan. 19, 2018, and entitled "PORTABLE INTERMEDIARY TRUSTED DEVICE", which is hereby incorporated herein by reference for all purposes, and which in turn is a continuation of U.S. patent application Ser. No. 15/400,840, filed Jan. 6, 2017, and entitled "PORTABLE INTERMEDIARY TRUSTED DEVICE", which is hereby incorporated herein by reference for all purposes, and which in turn is a continuation of U.S. patent application Ser. No. 13/833,116, filed Mar. 15, 2013, and entitled "PORTABLE INTERMEDIARY TRUSTED DEVICE", which is hereby incorporated herein by reference for all purposes.

This application is also related to U.S. application Ser. No. 13/833,953, filed Mar. 15, 2013, and entitled "GAMING DEVICE DOCKING STATION," which is hereby incorporated by reference herein in its entirety for all purposes.

BACKGROUND OF THE INVENTION

Gaming establishments continually try new methods to keep patrons in its establishment in order to increase profits. With more and more patrons using PEDs, mobile gaming is one way to increase profits. However, games of chance may not be played on unknown and untrusted PEDs.

It is often the case that people go with friends to gaming establishments for the purpose of being social and enjoying playing games of chance in one another's company. However, more than likely, at least one person in the group will disagree in which activities to engage in. In gaming establishments, one person may want to play video poker while another would want to play a game of craps. Several other people in the group may even want to play different slot machines. This can be particularly troublesome when the purpose of the excursion is to be social, yet the people separate in order to engage in their respective preferred activities.

There may be times when at least one person in the group is disappointed with the activity in which the group is engaged in, and it is likely that significant compromises must be made in order to accommodate all members of a group. This can lead to people spending less money in a gaming establishment by reducing the desire to engage in the current activity for at least one person in the group and/or by quickly taxing the overall patience of the group which would otherwise be willing to engage in gaming activities for longer periods of time. It may be preferable to allow at least one or more of the group members to play their preferred game of chance on a mobile or portable gaming device in order to prevent such issues.

OVERVIEW

The present invention relates generally to gaming systems. More particularly, the present disclosure relates to use of a portable electronic device (PED) in a gaming system.

Some embodiments pertain to a network-based gaming system that may support interaction between intermediary gaming trusted devices and PEDs and/or gaming machines so that games of chance are able to be securely presented to the user(s). The intermediary gaming trusted device is able to support a secure and controlled interaction between a gaming apparatus and an associated unknown, untrusted PED so that the associated untrusted PED, when coupled to the intermediary gaming trusted device, becomes a trusted PED and can execute gaming software.

In one embodiment, an intermediary gaming trusted electronic device for use with an associated untrusted PED may include a position sensor configured to acquire position information of the untrusted PED, a memory configured to store at least game session data, a wireless transceiver, and a processor configured to at least: (i) securely communicate with a gaming apparatus via the wireless transceiver; (ii) securely communicate with the associated untrusted PED; (iii) determine whether a gaming session is permitted based on the position information; (iv) receive gaming data from the gaming apparatus if it is determined that the gaming session is permitted; and (v) transmit presentation data to the associated untrusted PED for presentation on a display of the associated PED, the presentation data associated with the received gaming data, wherein the intermediary gaming trusted device is able to support interaction between the gaming apparatus and the associated untrusted PED so that the associated untrusted PED, when coupled to the intermediary gaming trusted device, can execute a gaming software.

In another embodiment, an intermediary gaming trusted device for use with an associated untrusted portable electronic device (PED), the device including a position sensor configured to acquire position information of the PED, a memory configured to store at least game session data, a wireless transceiver, and a processor configured to at least: (i) securely communicate with the gaming apparatus via the wireless transceiver; (ii) securely communicate with the associated untrusted PED; (iii) determine whether a gaming session is permitted based on the position information; (iv) receive gaming data from the gaming apparatus if it is determined that the gaming session is permitted; and (v) transmit presentation data to the associated untrusted PED for presentation on a display of the associated PED, the presentation data being associated with the received gaming data, wherein the associated untrusted PED can be trusted to display presentation data so long as the intermediary gaming trusted device is coupled thereto.

In one embodiment, a system for playing a wagering game includes a portable electronic device (PED) having a display to display presentation data associated with gaming data, an intermediary gaming trusted device configured to securely communicate with the PED via a physical or wireless means, and a gaming apparatus configured to securely communicate with the intermediary gaming trusted device to transmit the gaming data to the intermediary gaming trusted device, wherein the intermediary gaming trusted device is configured to transmit the presentation data to the PED to allow a user of the PED to execute gaming software.

The present invention also relates to docking stations, such as docking stations configured for use in gaming establishments. The docking stations can be configured to create trusted mobile electronic devices which can be used to play games of chance in gaming establishments.

In one embodiment, a docking station configured to authorize a mobile electronic device to play games of chance may have a receiver configured to receive the mobile electronic device, and a processor configured to: (i) detect whether the mobile electronic device has been received by the receiver; (ii) receive device information from the mobile electronic device if it is detected that the mobile electronic device is received by the receiver; (iii) determine whether the games of chance can be played on the mobile electronic device based on the received device information; (iv) authorize the mobile electronic device to play the games of chance; and (v) transmit gaming data to the mobile electronic device if it is determined that the games of chance can be played on the mobile electronic device and if the mobile electronic device is authorized.

In one embodiment, a method for authorizing a mobile electronic device to play games of chance using a docking station may include detecting that the mobile electronic device is coupled to the portable docking station, receiving device information from the mobile electronic device after it is detected that the mobile electronic device has been coupled to the portable docking station, determining whether the games of chance can be played on the mobile electronic device based on the received device information, authorizing the mobile electronic device for playing the games of chance, and transmitting gaming data to the mobile electronic device if it is determined that the games of chance can be played on the mobile electronic device and if the mobile electronic device is authorized.

In another embodiment, a method for converting a mobile electronic device to a trusted mobile electronic device using a portable docking station may include detecting that the mobile electronic device is coupled to the portable docking station, receiving device information from the mobile electronic device after it is detected that the mobile electronic device has been coupled to the portable docking station, determining whether games of chance can be played on the mobile electronic device based on the received device information, authorizing a user to play the games of chance on the mobile electronic device, converting the mobile electronic device to the trusted mobile electronic device if the user is authorized to play the games of chance on the mobile electronic device, and transmitting gaming data to the trusted mobile electronic device if the mobile electronic device is converted to a trusted mobile electronic device.

In one embodiment, a system to authorize a mobile electronic device to play games of chance may include a gaming system manager and a portable docking station configured to communicate with the gaming system manager and the mobile electronic device, the portable docking station further configured to: (i) detect whether the mobile electronic device is connected to a receiver of the portable docking station; (ii) receive device information from the mobile electronic device if it is detected that the mobile electronic device is connected to the receiver; (iii) determine whether the games of chance can be played on the mobile electronic device based on the received device information; (iv) authorize the mobile electronic device to play the games of chance; and (v) transmit gaming data to the mobile electronic device if it is determined that the games of chance can be played on the mobile electronic device and if the mobile electronic device is authorized, wherein once the mobile electronic device is authorized to play the games of chance, the mobile electronic device is deemed a trusted gaming device for use within the gaming system manager of a gaming establishment.

The present invention provides other hardware configured to perform the methods of the invention, as well as software stored in a machine-readable medium (e.g., a tangible storage medium) to control devices to perform these methods.

These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION OF EXAMPLE EMBODIMENTS

The present disclosure relates generally to gaming systems. More particularly, the present disclosure relates to use of a portable electronic device (PED) in a gaming system and even more particularly use of a PED in a gaming system with an intermediary trusted device.

Some embodiments are described herein in the context of a portable intermediary trusted device. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
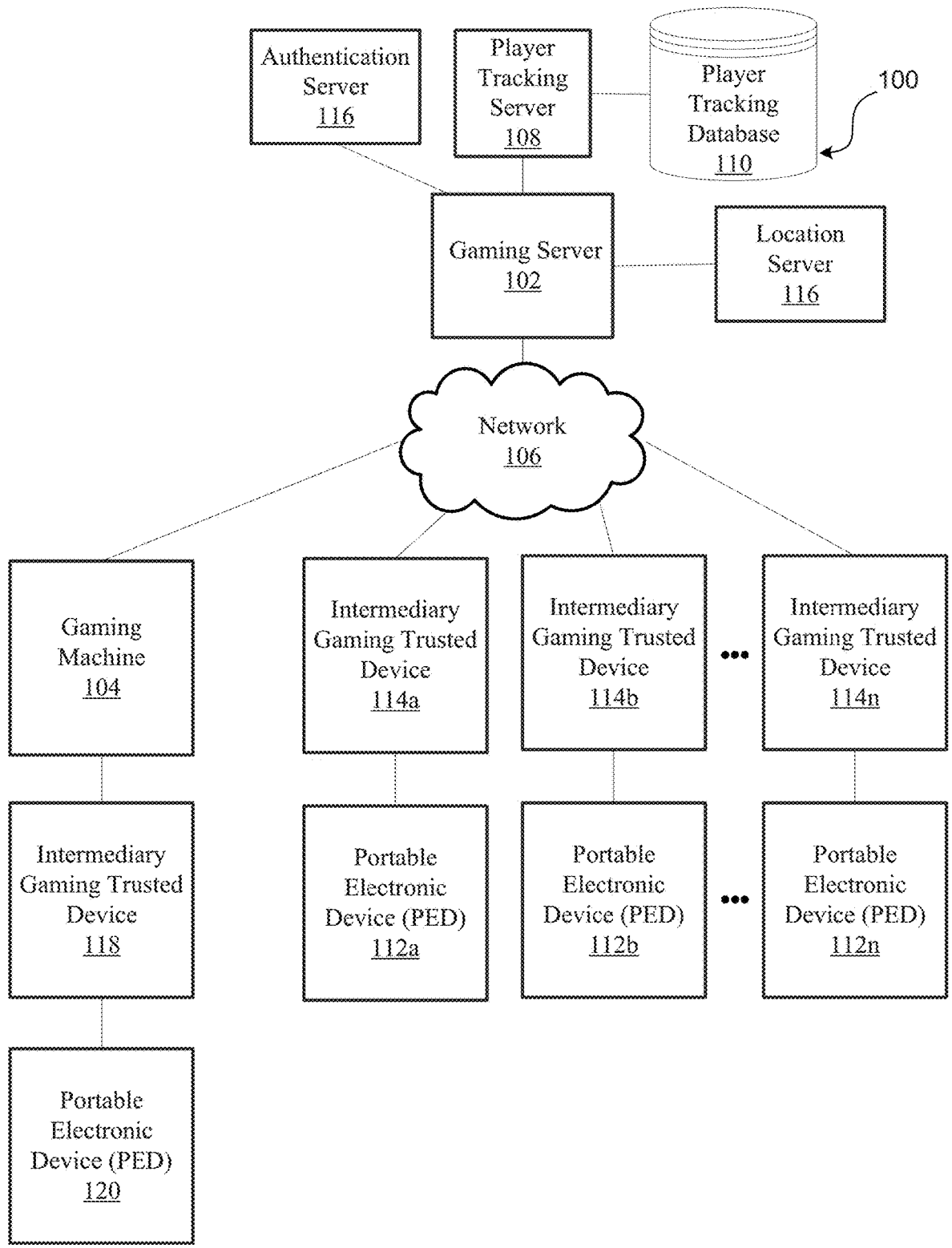
FIG. 1 illustrates an example block diagram of a network-based gaming system.

FIG. 1 illustrates an example block diagram of a network-based gaming system. The network-based gaming system 100 may support interaction between intermediary gaming trusted devices and one or more unknown, untrusted PEDs and/or gaming machines so that games of chance are able to be securely presented to the user(s). Initially, PEDs are untrusted devices and are supported or capable to play games of chance. However, once connected to an intermediary gaming trusted device, a PED becomes or is otherwise transformed into a trusted PED and is able to be used to execute gaming software.

The network-based gaming system 100 may include at least one intermediary gaming trusted device 114a-n (where n is an integer). The intermediary gaming trusted device 114a-n may be associated with a PED 112a-n via a physical or wireless connection. Although each intermediary gaming trusted device is illustrated as connecting to one PED, the intermediary gaming trusted device may connect to more than one PED and thus acts as a trusted connection hub for multiple PED's. The PED 112a-n may be any portable device having a display such as, for example, portable telephones, laptops, computers, notebooks, tablets, media players, and the like. Wireless connections may be any known wireless methods such as a 3G wireless technology, 4G wireless technology, Bluetooth, wireless universal serial bus, near-field magnetic or communication sensor, Fire Wire, WiMax, IEEE 802.11x technology, radio frequency, narrow-beam infrared (IR) sensor, RFID tag, WiFi, vibration sensor or any other known wireless methods. Wired connections may be any known connection using a wire. The connection between the intermediary gaming trusted device and PED creates a secured pairing environment. Once paired, either a short-range (e.g. Bluetooth) or a long-range (e.g. WiFi) wireless communication tether (e.g. wireless leash) may be established and maintained during the wireless communication session.

The intermediary gaming trusted device 114a-n may be configured to communicate with a gaming server 102 via a network 106 through a wired or wireless connection. In the same or another embodiment, the intermediary gaming trusted device 118 associated with the PED 120 may also be configured to communicate with a gaming machine 104 through a wired or wireless connection. The gaming machine 104 may then connect to the gaming server 102 via network 106 also through a wired or wireless connection. Wireless connections may be any known wireless methods such as a 3G wireless technology, 4G wireless technology, Bluetooth, wireless universal serial bus, near-field magnetic, Fire Wire, WiMax, IEEE 802.11 technology, radio frequency, or any other known wireless methods. Wired connections may be any known connection using a wire.

The gaming server 102 may be configured to communicate with a player tracking server 108, location server 120, and an authentication server 116. The player tracking server 108 may communicate with a player tracking database 110 to obtain tracked player information such as player preferences, games of chance the player likes to play, entertainment the player enjoys, accumulated and used points, number of wins and losses, and any other similar player information.

The authentication server 116 may be used to authenticate and/or verify the player, the intermediary gaming trusted device 114a-n, 118, the PED 112a-n, 120, the gaming machine 104, or perform any other authentication or verification functions. Any known authentication method may be used, such as public-private key authentication algorithms, random number generators, authentication keys, location authentication, and the like.

Each intermediary gaming trusted device 114a-n, 120 may be assigned to at least one PED 112a-n, 118. Although each intermediary gaming trusted device 114a-n, 118 is illustrated as being associated with one PED 112a-n, 120, this is not meant to be limiting as the intermediary gaming trusted device 114a-n, 118 may be assigned to more than one PED 112a-n, 120 and acts as a trusted gaming hub. Initially, PEDs are unknown and untrusted devices not capable of playing games of chance. However, once connected to an intermediary gaming trusted device, the PED becomes or is otherwise transformed into a trusted PED and is able to be used to play games of chance. Each intermediary gaming trusted device 114a-n, 118 may have a connector to connect to the PED 112a-n, 120. The connector is further illustrated and described in detail with reference to FIGS. 2A-C and 3, however, example connectors may be a universal serial bus, male connector, wire, or any other connector able to connect the intermediary gaming trusted device 114a-n, 118 with the PED 112a-n, 120 to transmit and receive data.

The intermediary gaming trusted device 114a-n, 118 may be configured to communicate with the authentication server 116. The intermediary gaming trusted device 114a-n, 118 may then, in turn, authenticate or verify the user of PED 112a-n, 120. The user of the PED 112a-n, 120 may be authenticated and/or verified though any known authentication and verification methods such as, for example, biometric verification (i.e. voice recognition, retinal scan, fingerprint verification, and the like), username, password, account number, and the like. Authentication of the user may also include authentication via a web-application associated with the gaming establishment and/or uploading authentication software from the intermediary gaming trusted device 114a-n, 118 to the PED 112a-n, 120. In another embodiment, the user of the PED 112a-n, 120 may also obtain the intermediary gaming trusted device 114a-n, 118 from a gaming establishment personnel. The gaming establishment personnel may then authenticate and/or verify the user as well as associate the intermediary gaming trusted device 114a-n, 118 to the PED 112a-n, 120.

Once authenticated, the intermediary gaming trusted device 114*a-n*, 118 may receive gaming data from the gaming server 102. The gaming data may include gaming information or gaming establishment information. Gaming information may include, for example, player tracking information, gaming options, data to play a game of chance, funding information or options in order to play the games of chance, pay tables, and the like. The gaming establishment information may include, for example, advertisements (e.g. buffet coupons, movie trailers, and the like), tournament information, room booking information, entertainment information, and the like.

The intermediary gaming trusted device 114*a-n*, 118 may control and review the communication between the PED and the gaming server 102. The intermediary gaming trusted device 114*a-n*, 118 may be configured to determine if the communication meets any desired rules or regulations. For example, if the user selects a "Cash Out" option on the PED 112*a-n*, 120 for $100,000.00, but the maximum amount to be cashed out is $2,000, the intermediary gaming trusted device 114*a-n*, 118 may prevent the user from cashing out.

The intermediary gaming trusted device 114*a-n*, 118 may transmit the gaming data to the PED 114*a-n*, 120 or to the gaming machine 104. The intermediary gaming trusted device 114*a-n*, 118 may enable the PED 112*a-n*, 120 or the gaming machine 104 to display the gaming data. For example, if the gaming data is to play a game of chance, the game of chance may be displayed on a display of the PED 112*a-n*, 120 or the gaming machine 104. The game of chance may be, for example, poker, black jack, roulette, bingo, keno, video slot machine games, or any other game of chance. The intermediary gaming trusted device 114*a-n*, 118 may be configured to receive data from the PED 114*a-n*, 120 or the gaming machine 104 that is inputted by the user. The received data may then be transmitted from the intermediary gaming trusted device 114*a-n*, 118 to the gaming server 102 via the network 106 for processing. The received data may be transmitted to the gaming server 102 dynamically or periodically. In other words, the received data may be transmitted to the gaming server 102 dynamically or in real-time as it is received by the intermediary gaming trusted device 114*a-n*, 118. Alternatively, the received data may be buffered and transmitted to the gaming server 102 periodically such as every minute, ten (10) minutes, hour, or any other pre-defined time period.

The gaming server 102 may then process and store the gaming data received from the intermediary gaming trusted device 114*a-n*, 118. The stored gaming data may be used in case of a power outage, weak or lost signals, or any other loss of gaming data. Once the received gaming data is processed, the gaming server 102 may transmit additional gaming data in response to the processed gaming data. The additional gaming data may be transmitted, in real-time on an as needed basis or in a bulk transfer mode for batch operations, to the intermediary gaming trusted device 114*a-n*, 118 for display on the PED 114*a-n*, 120 or the gaming machine 104 so that the player can continue to play the game of chance or receive additional gaming information. For instance, a video poker game on the gaming machine 104 may receive one card at a time, or five cards at a time, or ten cards at a time. In another example, a 5-reel slot game may receive one random number seed at a time, or 100 random number seeds for the next 20 games. Player input may include a selection of one of a plurality of games of chance, player preference options, selection of advertisement information, or the like.

The gaming server 102 may be configured to determine the location of the intermediary gaming trusted device 114*a-n*, 118 using location server 120. Any known position or location methods may be used to determine the location of the intermediary gaming trusted device 114*a-n*, 118 such as cellular positioning, triangulation, global positioning systems, or any other location or positioning determining method. The position or location of the intermediary gaming trusted device 114*a-n*, 118 may be obtained periodically or at any pre-defined time period. For example, the intermediary gaming trusted device 114*a-n*, 118 may be pinged every thirty (30) seconds, minute, ten minutes, hour, or any periodic time interval for its location.

A user may be prevented from playing a game or using the intermediary trusted gaming device 114*a-n*, 118 due to location, time, establishment rules, government rules, or any other restrictions the gaming establishment may have or impose. For example, if the user decides to leave the gaming establishment and the location server 120 determines that the intermediary gaming trusted device 114*a-n*, 118 is outside the gaming establishment, the gaming server 102 may cause to the intermediary gaming trusted device to cease performing any gaming activities. In another embodiment, if the intermediary trusted gaming device 114*a-n*, 118 is in a restricted location such as the kids club, the intermediary trusted gaming device 114*a-n* may cease performing any gaming activities. In still another example, if the player has played or lost a certain amount of money, the intermediary trusted gaming device 114*a-n* may cease performing any gaming activities.

FIGS. 2A-3C illustrate example embodiments of an intermediary trusted gaming device. The intermediary trusted gaming device may be a portable electronic device that a user may carry around. The intermediary trusted gaming device may be any size, but is preferably sized to fit in a pocket, purse, or the like.

Figure 2A:
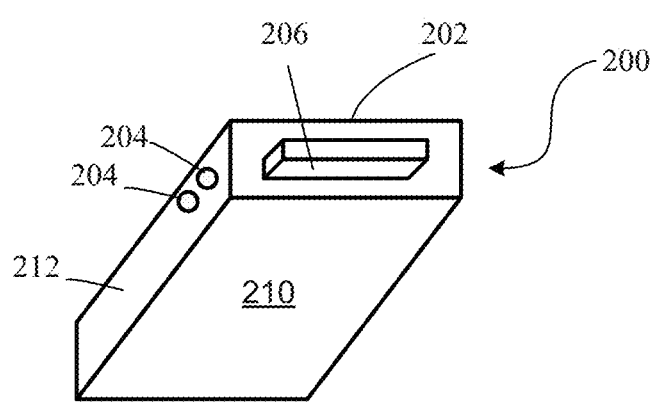
FIGS. 2A-2C illustrate example embodiments of an intermediary trusted gaming device.

FIG. 2A illustrates one example of an intermediary trusted gaming device. The intermediary trusted gaming device 200 may include a housing 210. The housing 210 may have at least a status indicator, such as one light emitting diode (LED) 204. The LED 204 may be any color and any shape. The LED 204 may be configured to turn on or off to inform the user of its activities. For example, a green LED 204 may inform the user that the intermediary trusted gaming device 200 is properly connected to a PED, such as PED 112*a-n*, 118 illustrated in FIG. 1. In another example, a red LED 204 may inform the user that the intermediary trusted gaming device 200 is low on battery or is not properly connected to the PED, such as PED 112*a-n*, 118 illustrated in FIG. 1. In still another example, the LED 204 may flash to inform the user that the intermediary trusted gaming device 200 is receiving information either from the PED and/or gaming server, such as gaming server 102 illustrated in FIG. 1. Although the LED 204 is illustrated as being positioned on side 212 of the intermediary trusted gaming device 200, this is not intended to be limiting as the LED 204 may located anywhere on housing 210. Although the status indicator is described as a simple LED indicator, it may be implemented as a LCD display for user-friendly text or graphical information.

Intermediary trusted gaming device 200 may have connector 206 configured to connect to a PED, such as PED 112*a-n*, 118 illustrated in FIG. 1. Connector 206 may be configured to receive or transmit signals or data from/to the PED. As illustrated, connector 206 may be a USB connector. Although illustrated as being positioned on side 202 of the intermediary trusted gaming device 200, this is not intended to be limiting as the connector 206 may located anywhere on housing 210.

Figure 2B:
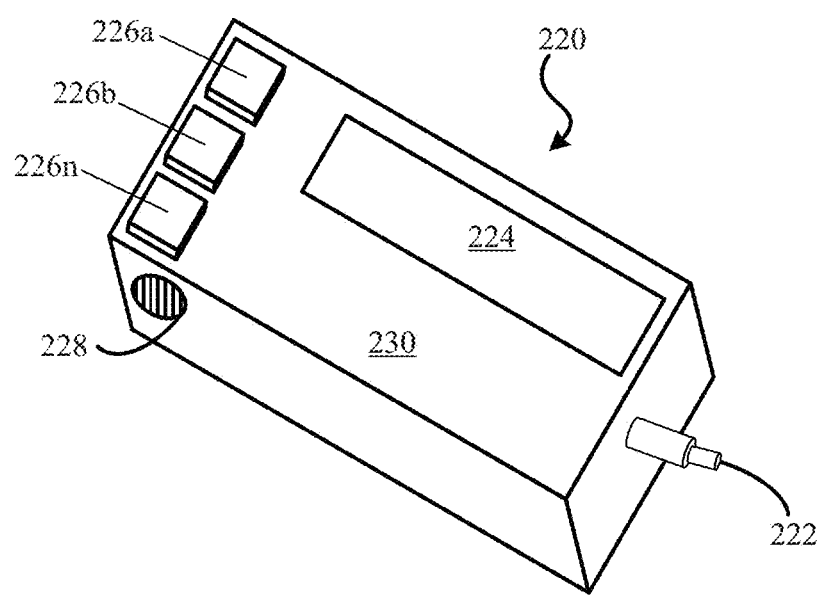

FIG. 2B illustrates another example intermediary trusted gaming device. The intermediary trusted gaming device 220 may include a housing 230, display 224, microphone 228, buttons 226a-n, and connector 222. Connector 222, similar to connector 206 illustrated in FIG. 2A, may be configured to connect to a PED. Display 224 positioned on the housing may be used to display any desired information. For example, the display may display a request for a username and/or password, inform the user that the intermediary trusted gaming device 220 is properly connected to the PED, such as PED 112a-n, 118 illustrated in FIG. 1, or any other desired information.

In one embodiment, display 224 may be a projector. For example, if the image on the display of the PED is too small, the player may want to view a larger image to play the game of chance. The display may be configured to project the game of chance in a larger image and allow the player to play the game of chance. The image may be projected on a table, wall, or any other surface or non-surface.

The microphone 228 may be configured to receive audio input, such as, for example, voice input. For example, if the user is unable to input his password on the PED, for any reason, the user may speak his password into the microphone. In another example, the microphone 228 may be used to receive the user's voice to authenticate the user. Instead of the microphone 228, other biometric sensors such as a camera or a fingerprint sensor may also be used for authenticating the user of the PED.

Buttons 226a-n may be used for any desired purpose or reason. For example, buttons 226a-n may be used to turn the intermediary trusted gaming device 220 on or off. In another example, button 226a-n may be used to signal a gaming establishment personnel that the player would like to order a drink. In another embodiment, buttons 226a-n may be a numeric keypad, or an alphanumeric keypad, or a directional keypad, and the like.

Figure 2C:
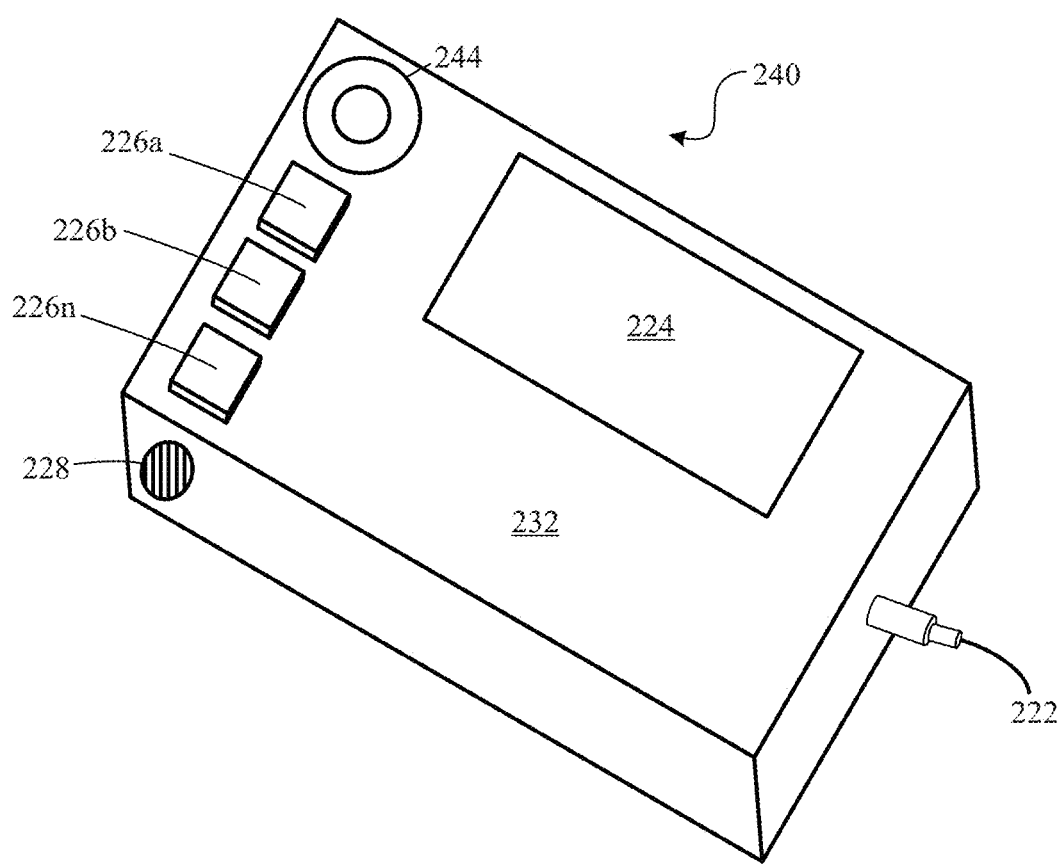

FIG. 2C illustrates still another example of an intermediary trusted gaming device. Intermediary trusted gaming device 240 is similar to intermediary trusted gaming device 220 illustrated in FIG. 2B, except that intermediary trusted gaming device 240 includes a camera 244. Camera 244 may be used for any desired purpose or reason. For example, camera 244 may be used to authenticate the player (e.g. facial recognition, compare a picture of the player stored in the player tracking database to a picture taken by the intermediary trusted gaming device 240, and the like). In another example, camera 244 may be used to allow a player to take a picture for upload to the player's player tracking account. In still another example, camera 244 may be configured to recognize player gestures to allow the player to play the games of chance as opposed to using the PED to input data.

Although intermediary trusted gaming device 200, 220, 240 is illustrated as having a rectangular shape, this is for illustrating purposes and is not intended to be limiting. Intermediary trusted gaming device 200, 220, 240 may be formed of any desired shape such as a circle, triangle, star, shape of the gaming establishment's logo, and the like. Additionally, indicia may be printed anywhere on the housing of intermediary trusted gaming device 200, 220, 240. For example, the intermediary trusted gaming device 200, 220, 240 may be personalized for the player. In another example, the intermediary trusted gaming device 200, 220, 240 may include indicia of any sponsor, the gaming establishment, or any other desired indicia.

Figure 3A:
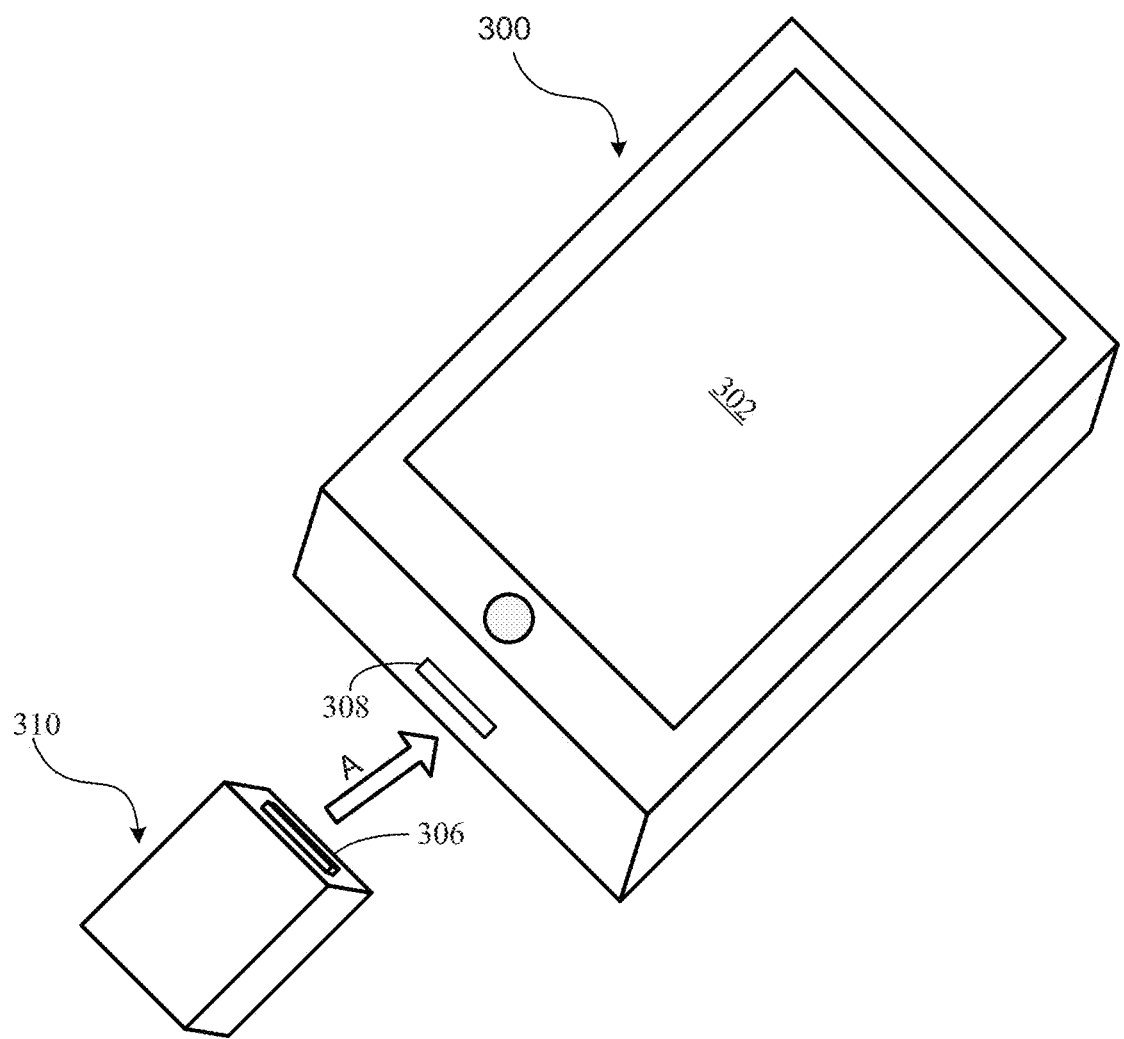
FIGS. 3A and 3B illustrate example uses of the intermediary trusted gaming device.
Figure 3B:
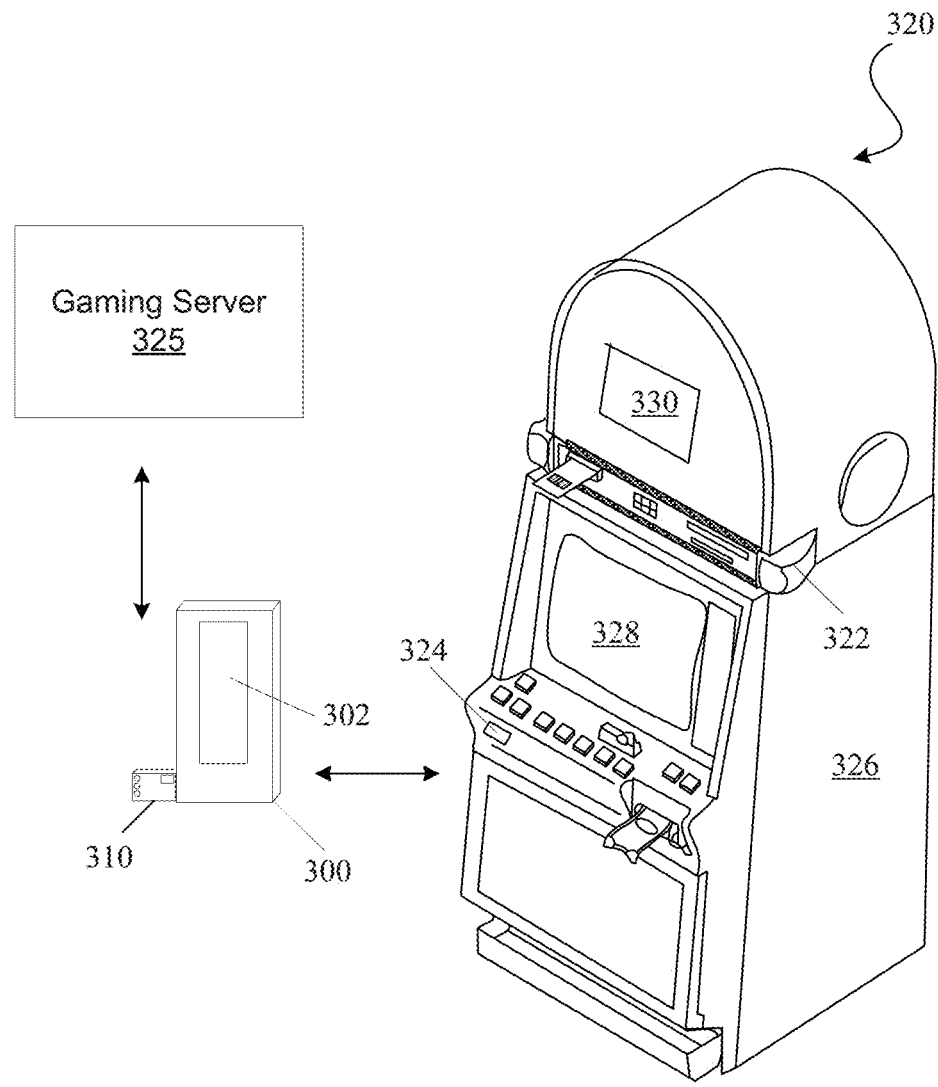

FIGS. 3A and 3B illustrate example uses of the intermediary trusted gaming device. Referring to FIG. 3A, the intermediary trusted gaming device 310 may have a connector 306 configured to connect into any input/output (I/O) port 308 of the PED 300 via arrow A. When connected properly, PED 300 may have a display 302 to display gaming data received from the intermediary trusted gaming device 310. Although illustrated with the use of a connector 306, this is for illustrative purposes only and not meant to be limiting as the intermediary trusted gaming device 310 may also be configured to communicate with the PED 300 via any known wireless methods. In other words, intermediary trusted gaming device 310 need not be physically connected to the PED 300 to communicate with the PED 300.

Referring now to FIG. 3B, intermediary trusted gaming device 310 may connect to a gaming machine 320. In one embodiment, intermediary trusted gaming device 310 may be coupled to a PED 300 and be configured to communicate with the gaming device 310 wirelessly. For example, the player may want to play the game of chance at the sports bar while watching a basketball game. However, after the basketball game ends, the player may then want to sit and continue to play the game of chance on gaming machine 320.

In another embodiment, intermediary trusted gaming device 310 may be coupled to the gaming machine 320 itself at I/O port 324. For example, the PED 300 may be low on batteries but the player would like to continue to play his game of chance. Thus, the intermediary trusted gaming device 310 may be coupled to the gaming machine 320 at I/O port 324. Although the I/O port is illustrated on housing 326 of gaming machine 320, this is for illustrative purposes only and not meant to be limiting. For example, I/O port 324 may also be positioned on a player tracking device 322 or in any other position on housing 326.

Whether connected to the PED 300 or gaming machine 320, intermediary trusted gaming device 310 may transmit or receive gaming data to or from gaming server 325 via any known wireless methods. If the intermediary trusted gaming device 310 is connected to the PED 300, the gaming data may be displayed on display 302 of the PED 300. If the intermediary trusted gaming device 310 is connected to the gaming machine 320, the gaming data may be displayed on display 328 or secondary display 330.

Figure 4:
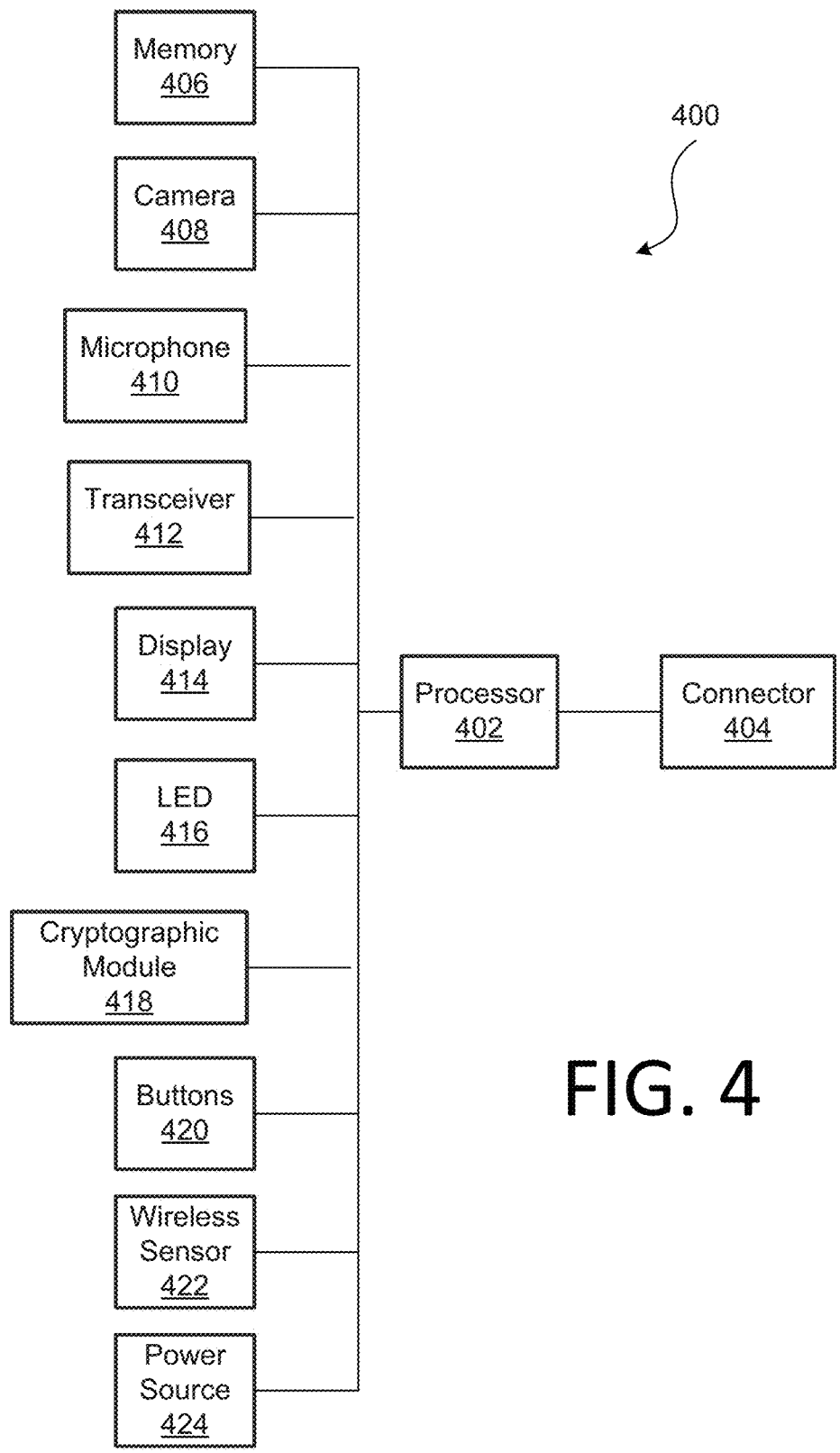
FIG. 4 illustrates an example block diagram of an intermediary trusted gaming device.

FIG. 4 illustrates an example block diagram of an intermediary trusted gaming device. The intermediary trusted gaming device 400 may have a processor 402 configured to communicate with connector 404. Processor 402 may be configured to receive and transmit gaming information via connector 404 from and to the PED. Processor 402 may also be configured to communicate with a camera 408, microphone 410, LED 416, display 414, and buttons or switches 420. As stated above with reference to FIG. 2B, camera 408 may be used to authenticate or verify the user. Once a picture of the player is taken using camera 408, processor 402 may process the picture to authenticate or verify the player. Additionally, processor 402 may process the input associated with selected buttons 420 or display the desired message or indicia on display 414. As stated above with reference to FIG. 2C, microphone 410 may also be used to authenticate or verify the user. Once the player's voice is captured by the intermediary trusted gaming device 400 via microphone 410, processor 402 may process the player's voice to authenticate or verify the player. Additionally, processor 402 may be configured to control LED 416 as described above with reference to FIG. 2A.

Intermediary trusted gaming device 400 may also have at least one transceiver 412. In one embodiment, the intermediary trusted gaming device 400 may have a long-range transceiver, short-range transceiver, or both. The transceiver 412 may be designed to locate the position of the intermediary trusted gaming device 400 through use of any known positioning methods as discussed in detail above. As stated above, intermediary trusted gaming device 400 may communicate wirelessly and therefore may have a wireless sensor 422.

Intermediary trusted gaming device 400 may have at least one memory 406. The memory 406 may be any type of memory configured to store gaming applications, game logic, game session data, authentication software, and the like. For example, the memory may be a non-volatile random access memory (NVRAM), flash memory, dynamic random access memory ("DRAM")), and the like.

The intermediary trusted gaming device 400 may have a power source 424. The power source 424 may be any known power source such as a battery and may be powered through any known means. For example, the power source 424 may be powered when physically connected to a PED or plugged into a power outlet. When the power source 424 is an internal battery, it may be recharged when connected to an external power source such as a power outlet. Having an internal battery onboard the intermediary trusted device 400 may maintain communication to another device in the network such as a location server or a game server even when the PED is not powered on. In one embodiment, the intermediary trusted device 400's connection to the location server persists so that its location can be accounted for at all time.

In one embodiment, intermediary trusted gaming device 400 may also have a cryptographic module 418 to decrypt communication received from a gaming server and/or PED and to encrypt communication transmitted to the PED and/or gaming server.

Figure 5A:
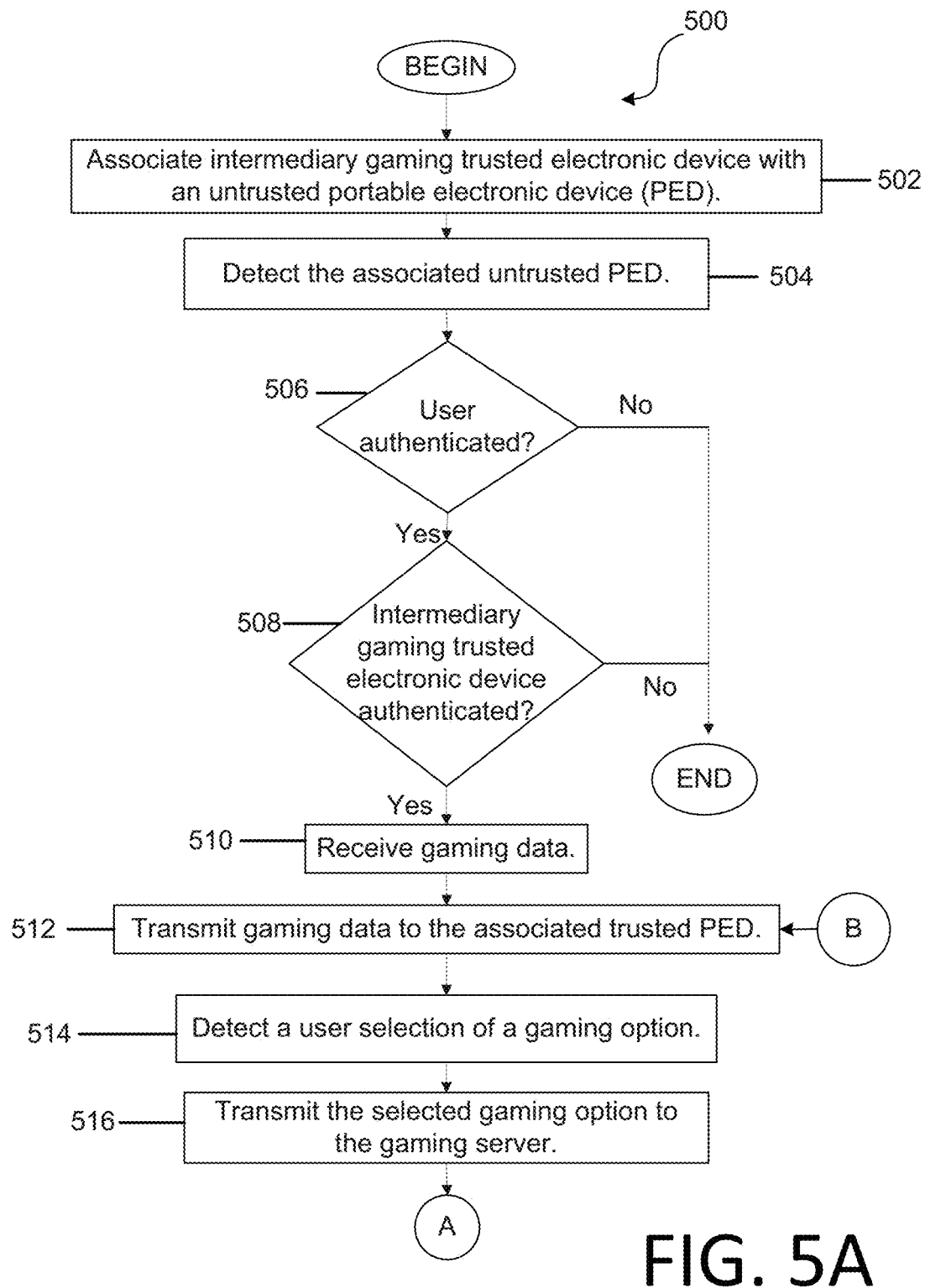
FIGS. 5A and 5B illustrate example methods for playing games of chance using an intermediary gaming trusted device.
Figure 5B:
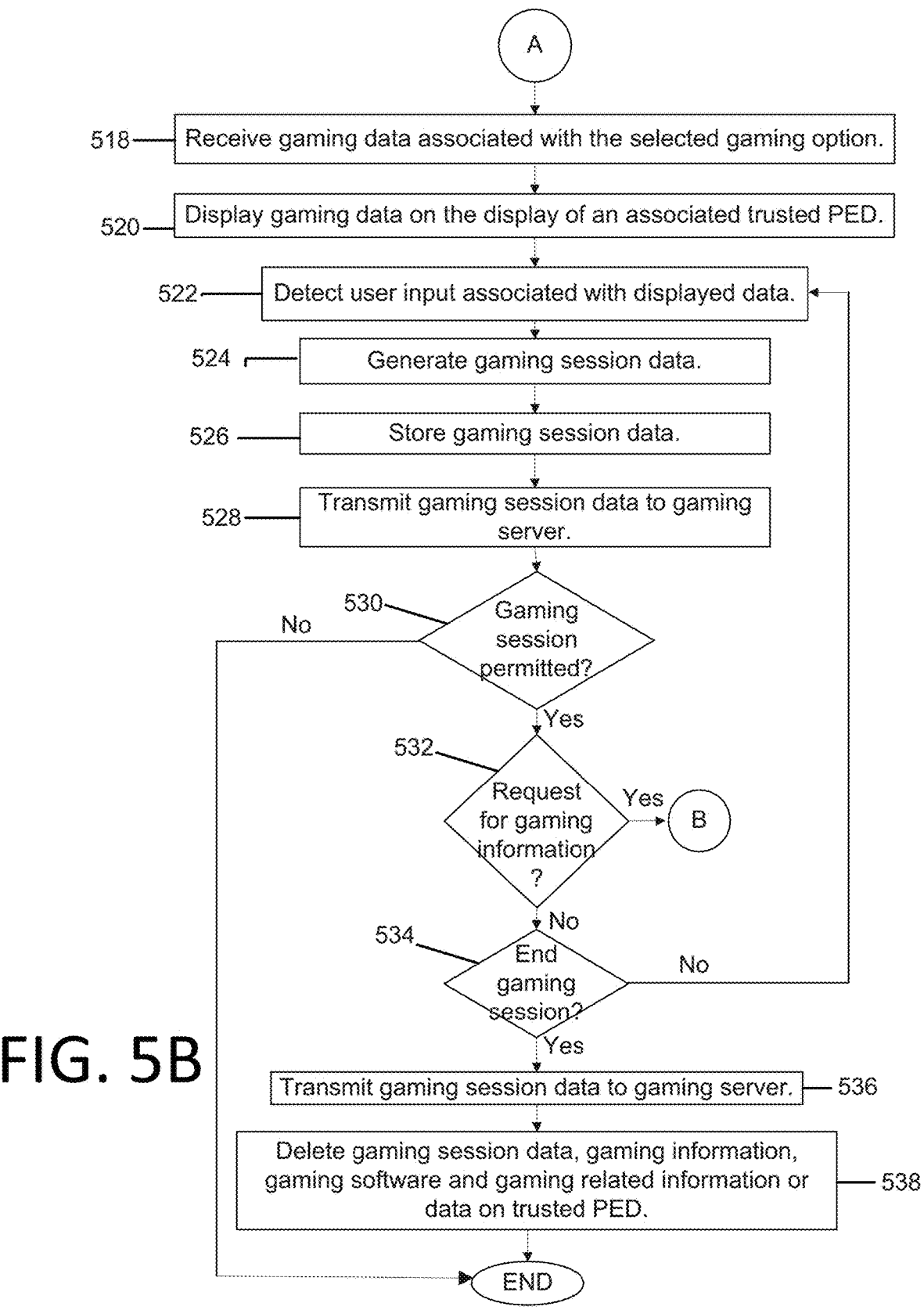

FIGS. 5A and 5B illustrate example methods for playing games of chance using an intermediary gaming trusted device. Referring to FIG. 5A, the method 500 initially begins with associating an intermediary gaming trusted device with an untrusted PED at 502. The association may occur through any known association methods. For example, the gaming establishment personnel may manually associate the intermediary gaming trusted device with the untrusted PED. In another example, the intermediary gaming trusted device may be physically coupled to the untrusted PED.

The associated untrusted PED may be detected at 504 by the intermediary gaming trusted device. If physically coupled to the untrusted PED, detection of the untrusted PED may occur when the intermediary gaming trusted device is coupled to the PED via the connector of the intermediary gaming trusted device. If communication of the untrusted PED is wireless, detection may occur when the intermediary gaming trusted device connects wirelessly with the untrusted PED.

A determination of whether the user of the untrusted PED is authenticated is made at 506. If the user is not authenticated, the method 500 may end. Authentication and/or verification of the user may be through any known authentication and verification methods such as, for example, biometric verification (i.e. voice recognition, retinal scan, fingerprint verification, and the like), username, password, account number, and the like. Authentication of the user may also include authentication via a web-application associated with the gaming establishment and/or uploading authentication software from the intermediary gaming trusted device to the untrusted PED. In another embodiment, the user of the untrusted PED may also obtain the intermediary gaming trusted device from a gaming establishment personnel. The gaming establishment personnel may then authenticate and/or verify the user as well as associate the intermediary gaming trusted device to the untrusted PED.

If the user of the untrusted PED is authenticated, the intermediary gaming trusted device may be authenticated at 508. If the intermediary gaming trusted device is not authenticated, the method 500 may end. Authentication of the intermediary gaming trusted device may be made by any known means. For example, a unique identifier of the intermediary gaming trusted device may be compared to identifiers stored at a gaming server. In one embodiment, the intermediary gaming trusted device may automatically connect to the gaming server and authenticate itself when turned on or powered up.

If the intermediary gaming trusted device is authenticated at 508, the intermediary gaming trusted device may receive gaming data at 510 from a gaming server. The gaming data may include a plurality of options. The gaming data may include gaming information or gaming establishment information. Gaming information may include, for example, player tracking information, gaming options, data to play a game of chance, funding information or options in order to play the games of chance, pay tables, and the like. The gaming establishment information may include, for example, advertisements (e.g. buffet coupons, movie trailers, and the like), tournament information, room booking information, entertainment information, and the like.

The untrusted PED becomes or is otherwise transformed into a trusted PED and the gaming data may then be transmitted to the associated trusted PED. As stated above, the gaming data may include a plurality of gaming options, such as, for example, a list of games of chance the user may select to play. The games of chance may be any game of chance such as blackjack, poker, roulette, craps, bingo, keno, video slot machines, and the like. Each list may also include a logo or any other indicia with each option, a summary of what the option is, a number of times the player has played each game of chance, the last time the selection was made by the player, or any other desired information.

A selection of one of the gaming options may be detected at 514. For example, the player may want and select to play a game of black jack. In one embodiment, selection of one of the gaming options may be executed by the user on the trusted PED. In another embodiment, selection of one of the gaming options may be selected on the intermediary gaming trusted device. Once a selection has been made, the intermediary gaming trusted device may transmit the selected gaming option to the gaming server at 516.

Referring now to FIG. 5B, gaming data associated with the selected gaming option may be received at 518 by the intermediary gaming trusted device. For example, gaming data to play black jack may be received if the black jack option was selected. The gaming data may then be transmitted to the associated trusted PED for display on a display of the associated trusted PED at 520. Once displayed, any input associated with the displayed data may be detected at 522. For example, if the data displayed was to play a game of chance, inputs associated with playing the game of chance may be detected such as a wagering amount, spin, hold, and the like. In another example, if the data displayed was a poker tournament, the input may be to register for the tournament. In still another example, if the displayed data was a coupon to the buffet, the input may be to add the coupon to the player tracking account, print the coupon, or a cancel the coupon. The user input may be detected from the PED or the intermediary gaming trusted device.

If the displayed data was to play a game of chance, the gaming session data may be generated at 524. In one embodiment, the intermediary gaming trusted device may generate the gaming session data at 524. For instance, the number of games played, by whom, where and when, and the aggregate amount of wager since the start of the game session may be calculated and recorded by the intermediary gaming trusted device. In still another embodiment, the gaming session data may be generated from the gaming server and transmitted to the intermediary gaming trusted device. For instance, a random bonus amount and the associated triggering event may be generated by the gaming server and sent to the intermediary gaming trusted device. In yet another embodiment, the gaming session data may be generated from the user's inputs at the PED during the gaming session. Gaming session data may include any information the user inputs while playing a game, number of wins or losses, amount of funds remaining or added, clicking on advertisements, and any other gaming information generated during the game session. The gaming session data may be stored at 526. The gaming session data may be stored on the intermediary gaming trusted device periodically or dynamically in real-time. For example, the gaming session data may be stored or saved at predefined intervals such as every minute, every hour, every ten (10) seconds, and the like. In another example, the gaming session data may be stored dynamically as the gaming session data is generated.

The gaming session data may be transmitted to the gaming server at 528. The gaming session data may be transmitted to the gaming server periodically or dynamically in real-time. For example, the gaming session data may be buffered and transmitted at predefined intervals such as every minute, every hour, every ten (10) seconds, and the like. In another example, the gaming session data may be transmitted dynamically in real-time as the gaming session data is generated.

A determination of whether the gaming session is still permitted is made at 530. Gaming sessions may be permitted based on various factors such as location of the intermediary gaming trusted device, duration of play, time of day, user information, gaming regulations, amount played, and the like. For example, if the intermediary gaming trusted device is determined to be in the parking lot where playing games of chance are not permitted, the gaming session will end and the intermediary gaming trusted device may cease to perform any gaming activities. In another example, if gaming regulations prohibit game play after the loss of $500 within a 24-hr period, the gaming session will end and the intermediary gaming trusted device may cease to perform any gaming activities.

If the gaming session is permitted at 530, a determination of whether gaming information is requested is made at 532. If a request for gaming information is detected at 532, the intermediary gaming trusted device may transmit the request to the gaming server and the method 500 may continue at step 512 of FIG. 5A. If a request for gaming information is not detected or not permitted at 532, a determination of whether the gaming session ends is made at 534. For example, if a cash-out input was detected, the gaming session may end. In another example, if the PED has been determined to have been moved out of the allowed area, the gaming session may also end. In yet another example, if there are no credits to play the game of chance, the gaming session may end. If the gaming session did not end at 534, the method may continue at step 522.

If the gaming session is determined to end at 534, the gaming session data may be transmitted to the gaming server at 536. Once the gaming session data is transmitted to the gaming server at 536, all gaming session data, gaming data, gaming software, and any other gaming related information and data are deleted from the associated trusted PED at 538. All gaming related information and data are deleted from the associated trusted PED to prevent fraud, hacking, and the like.

Figure 6:
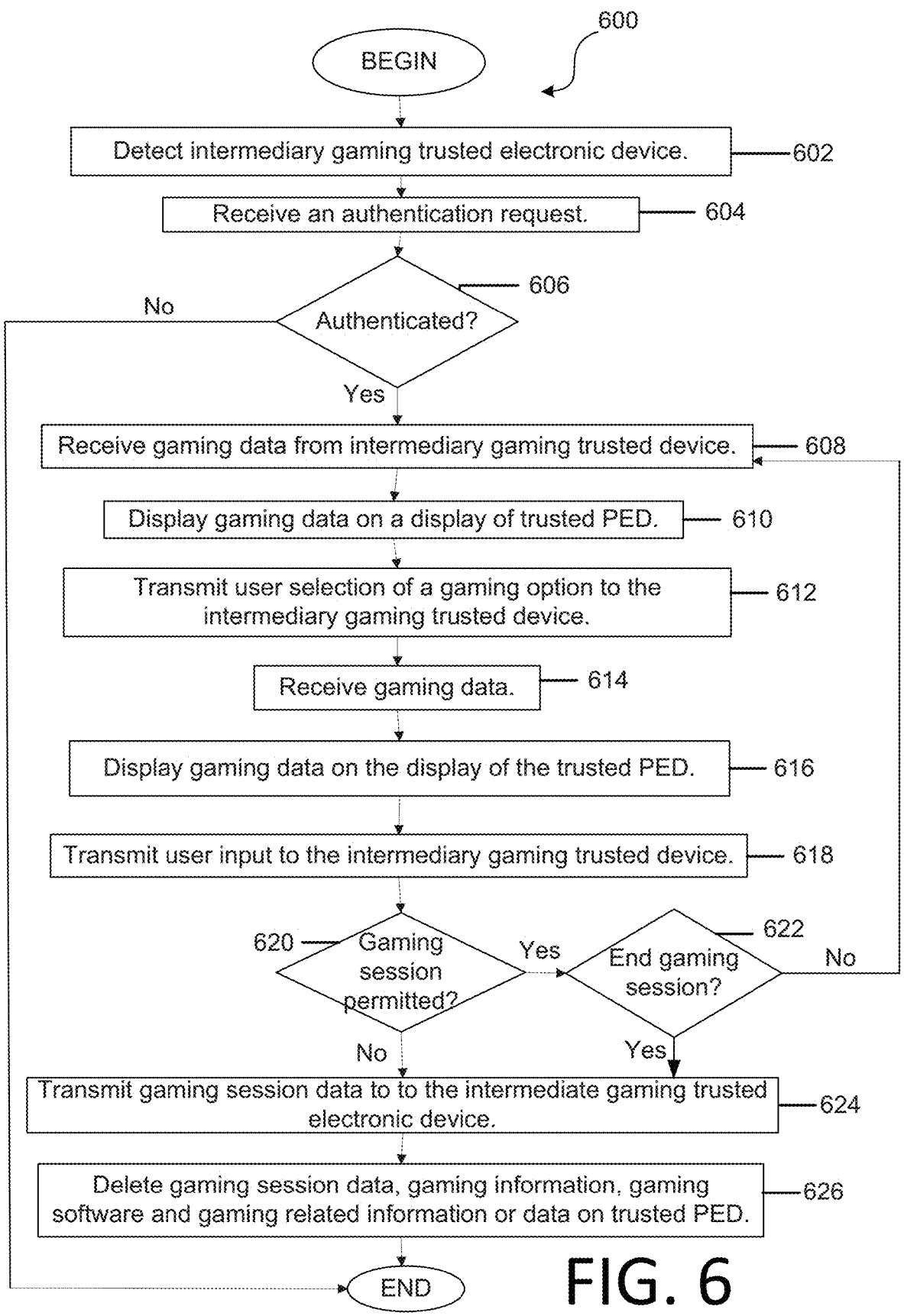
FIG. 6 illustrates an example method for playing a game of chance on a portable electronic device.

FIG. 6 illustrates an example method for playing a game of chance on a portable electronic device. The PED may be connected to an intermediary gaming trusted device to convert or otherwise transform an untrusted PED to a trusted PED to play games of chance and/or receive gaming related information. The method 600 initially begins with detection of the intermediary gaming trusted electronic device at 602. If physically coupled to the untrusted PED, detection of the intermediary gaming trusted device occurs when it is coupled to the PED via a connector, wire, or any other means. If communication with the intermediary gaming trusted device is wireless, detection may occur when the untrusted PED connects wirelessly with the intermediary gaming trusted device.

An authentication and/or verification request may be received at 604. The untrusted PED may receive the authentication request from detected intermediary gaming trusted electronic device. Authentication and/or verification of the user may be through any known authentication and verification methods such as, for example, biometric verification (i.e. voice recognition, retinal scan, fingerprint verification, and the like), username, password, account number, and the like. Authentication of the user may also include authentication via a web-application associated with the gaming establishment and/or uploading authentication software from the intermediary gaming trusted device to the untrusted PED. In another embodiment, the user of the untrusted PED may also obtain the intermediary gaming trusted device from a gaming establishment personnel. The gaming establishment personnel may then authenticate and/or verify the user as well as associate the intermediary gaming trusted device to the untrusted PED. In still another embodiment, the authentication request may require the untrusted PED to download software or an authentication application. The software may request the user of the untrusted PED to input authentication and/or verification information to authenticate and/or verify the user.

If the untrusted PED is not authenticated at 606, the intermediary gaming trusted device will cease to perform any tasks and the method 600 may end. If the untrusted PED is authenticated at 606, the untrusted PED then becomes or is otherwise converted to a trusted PED. The trusted PED may then receive gaming data from the intermediary gaming trusted electronic device at 608. The gaming data may have a plurality of gaming options. The gaming data may include gaming information or gaming establishment information. Gaming information may include, for example, player tracking information, gaming options, data to play a game of chance, funding information or options in order to play the games of chance, pay tables, and the like. The gaming establishment information may include, for example, advertisements (e.g. buffet coupons, movie trailers, and the like), tournament information, room booking information, entertainment information, and the like. The gaming options may include a list of games of chance the player may like to play such as, blackjack, poker, video slot machines, video games, keno, and the like. Each list may also include a logo or any other indicia with each option, a summary of what the option is, a number of times the player has played each game of chance, the last time the selection was made by the player, or any other desired information.

The gaming data may then be displayed on a display of the trusted PED at 610. The user of the trusted PED may select an option associated with the displayed gaming data which is then transmitted to the intermediary gaming trusted device at 612. The selection may be made using the trusted PED and/or the intermediary gaming trusted device. For example, if the gaming data was a list of games of chance the play may play, the list may be displayed on the display of the trusted PED and the use may select one of the games of chance to play. The selected game of chance may be transmitted to the intermediary gaming trusted device. In another example, if the gaming data was a coupon for the buffet, the option may be to accept or decline the coupon which the user may select. The selection may then be transmitted to the intermediary gaming trusted device.

If the user selected a game of chance to play using the trusted PED, gaming data may be received at 614 to start a gaming session for the player. The gaming data may be associated with the selected game of chance. For example, gaming data to play black jack may be received if the black jack option was selected. The gaming data may then be transmitted to the associated trusted PED for display on a display of the associated trusted PED at 616. Once displayed, any input associated with the displayed gaming data may be detected and transmitted to the intermediary gaming trusted device at 618. For example, if the data displayed was to play a game of chance, inputs associated with playing the game of chance may be detected such as a wagering amount, spin, hold, and the like. In another example, if the data displayed was a poker tournament, the input may be to register for the tournament. In still another example, if the displayed data was a coupon to the buffet, the input may be to add the coupon to the player tracking account, print the coupon, or a cancel the coupon. The user input may be detected from the PED or the intermediary gaming trusted device.

A determination of whether the gaming session is permitted is made at 620. Gaming sessions may be permitted based on various factors such as location of the intermediary gaming trusted device, duration of play, time of day, user information, gaming regulations, amount played, and the like. For example, if the intermediary gaming trusted device is determined to be in the parking lot where playing games of chance are not permitted, the gaming session will end and the intermediary gaming trusted device may cease to perform any gaming activities. In another example, if gaming regulations prohibit game play after the loss of $500 within a 24-hr period, the gaming session will end and the intermediary gaming trusted device may cease to perform any gaming activities.

If the gaming session is permitted at 620, a determination of whether the gaming session should end is made at 622. For example, if a cash-out input was detected, the gaming session may end. In another example, if the PED has been determined to have been moved out of the allowed area, the gaming session may also end. In yet another example, if there are no credits to play the game of chance, the gaming session may end. If the gaming session did not end at 622, the method may continue at step 608.

If the gaming session is determined to end at 622, the gaming session data may be transmitted to the intermediary gaming trusted device at 624. Once the gaming session data is transmitted to the intermediary gaming trusted device at 624, all gaming session data, gaming data, gaming software, and any other gaming related information and data are deleted from the associated trusted PED at 626. All gaming related information and data are deleted from the associated trusted PED to prevent fraud, hacking, and the like.

Figure 7:
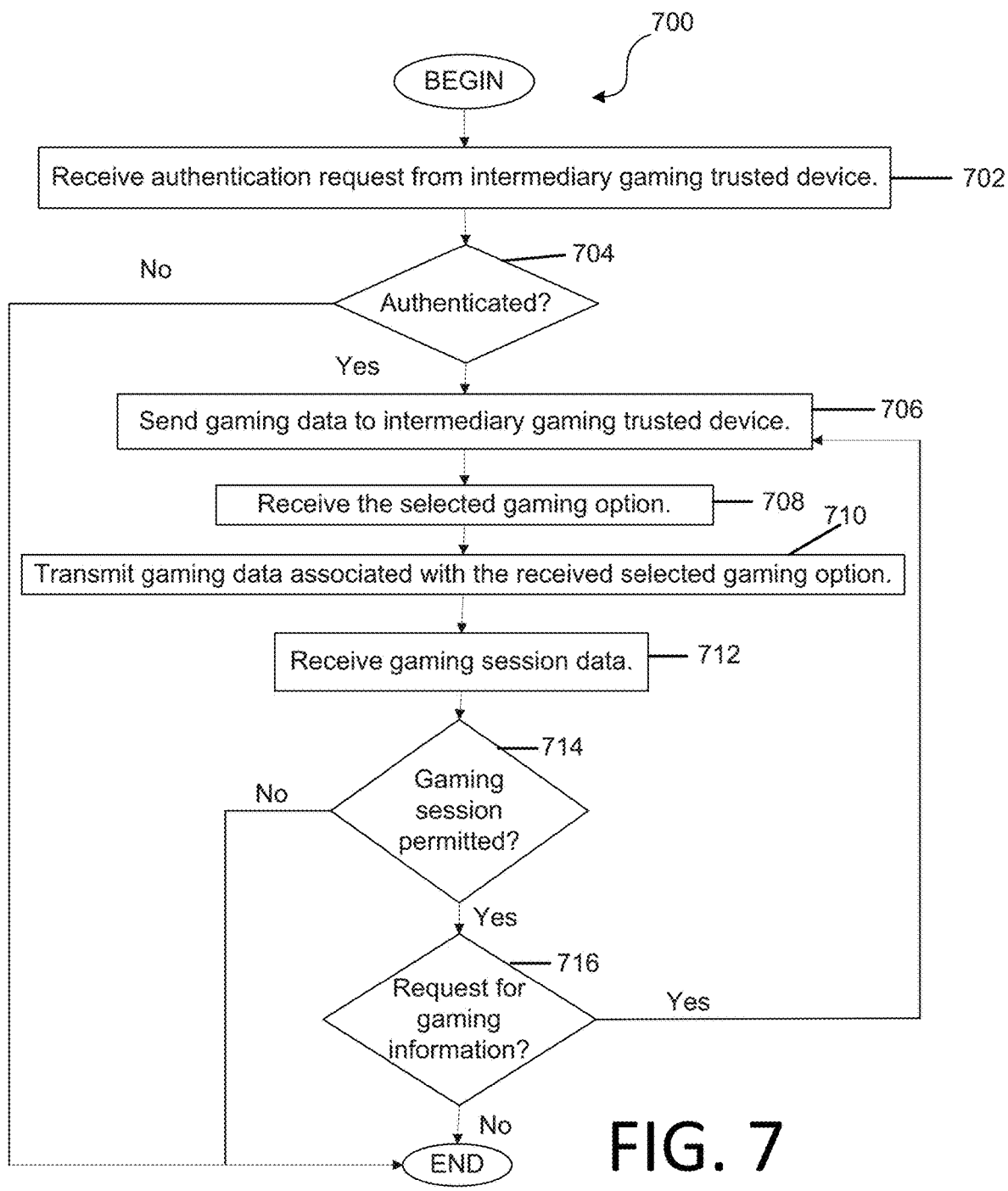
FIG. 7 illustrates an example method for playing a game of chance on a portable electronic device.

FIG. 7 illustrates an example method for playing a game of chance on a portable electronic device. The PED may be configured to communicate with an intermediary gaming trusted device which is configured to communicate with a server. Use of the intermediary gaming trusted device converts an unknown and untrusted PED to a trusted PED to create a controlled and secure environment where a player may play games of chance or obtain gaming data. The method 700 initially begins when a gaming server receives an authentication request from the intermediary gaming trusted device at 702. The request may be to authenticate the unknown and untrusted PED and/or authenticate the intermediary gaming trusted device. If neither the untrusted PED and/or intermediary gaming trusted device are authenticated at 704, the method 700 may end.

Authentication and/or verification of the untrusted PED may be through any known authentication and verification methods such as, for example, biometric verification (i.e. voice recognition, retinal scan, fingerprint verification, and the like) of the user, username, password, account number, device identifier, digital signature of the operating system and/or the software application, and the like. Authentication of the untrusted PED may also include authentication via a web-application associated with the gaming establishment and/or uploading authentication software from the intermediary gaming trusted device to the untrusted PED. The information received by the gaming server may be authenticated with information stored in a database, such as, for example, a player tracking base 110 illustrated in FIG. 1. Similarly, the intermediary gaming trusted device may have a unique identifier that may be compared to identifiers stored at the gaming server.

Once authenticated at 704, gaming data may be sent to the intermediary gaming trusted device at 706. The gaming data may include gaming information or gaming establishment information. Gaming information may include, for example, player tracking information, gaming options, data to play a game of chance, funding information or options in order to play the games of chance, pay tables, and the like. The gaming establishment information may include, for example, advertisements (e.g. buffet coupons, movie trailers, and the like), tournament information, room booking information, entertainment information, and the like. The gaming data may include a plurality of gaming options, such as, for example, a list of games of chance the user may select to play. The games of chance may be any game of chance such as blackjack, poker, roulette, craps, sicbo, bingo, keno, video slot machines, and the like. Each list may also include a logo or any other indicia with each option, a summary of what the option is, a number of times the player has played each game of chance, the last time the selection was made by the player, or any other desired information.

A selected gaming option may be received at 708 from the intermediary gaming trusted device. Gaming data associated with the received selected gaming option may be transmitted at 710 to the intermediary gaming trusted device. For example, if the received selected gaming option is to play black jack, the transmitted gaming data may be associated with black jack. In another example, if the selected gaming option is to obtain movie tickets, the gaming data may be a list of movies playing at the theater.

The gaming server may periodically or dynamically receive gaming session data at 712 from the intermediary gaming trusted device. Gaming session data may be any session data resulting from playing a game of chance such as number of wins or losses, amount of funds remaining or added, clicking on advertisements, and any other gaming information generated during the game session. The gaming session data may be received periodically or dynamically in real-time. For example, the gaming session data may be received at predefined intervals such as every minute, every hour, every ten (10) seconds, and the like. In another example, the gaming session data may be received dynamically in real-time as the gaming session data is generated.

A determination of whether the gaming session is permitted is made at 714. Gaming sessions may be permitted based on various factors such as location of the intermediary gaming trusted device, duration of play, time of day, user information, gaming regulations, amount played, and the like. For example, if the intermediary gaming trusted device is determined to be in the parking lot where playing games of chance are not permitted, the gaming session will end and the intermediary gaming trusted device may cease to perform any gaming activities. In another example, if gaming regulations prohibit game play after the loss of $500 within a 24-hr period, the gaming session will end and the intermediary gaming trusted device may cease to perform any gaming activities.

In no gaming session is permitted at 714, the method 700 may end. If the gaming session is permitted at 714, a determination of whether gaming information is requested is made at 716. If a request for gaming information is detected at 716, the method may return to step 706. If a request for gaming information is not detected at 716, the method 700 may end.

Other embodiments are described below are in the context of a gaming device docking station. The following detailed description is illustrative only and is not intended to be in any way limiting. Other embodiments will readily suggest themselves to such skilled persons having the benefit of this disclosure. Reference will now be made in detail to implementations as illustrated in the accompanying drawings.

Figure 8:
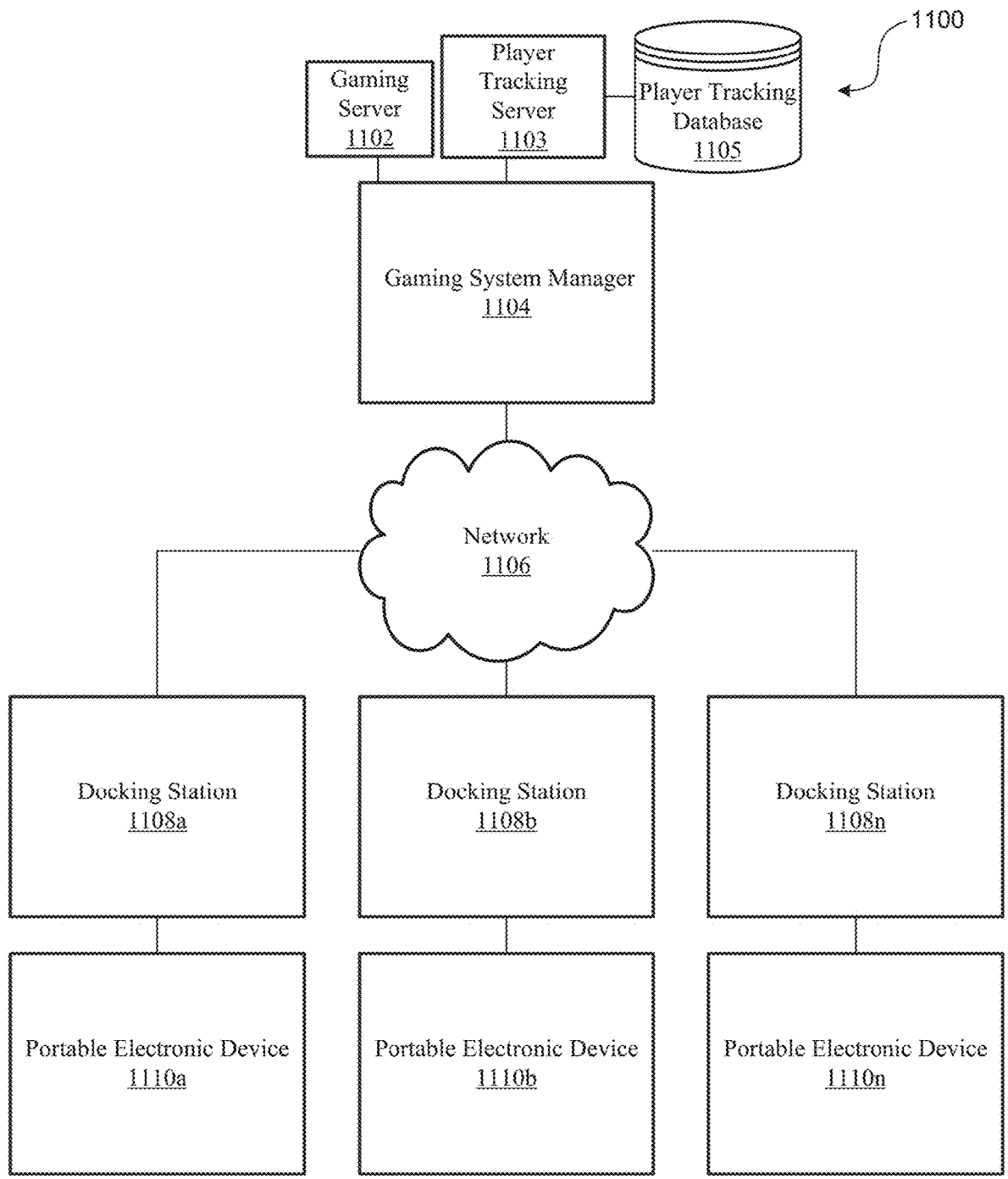
FIG. 8 illustrates a block diagram of an example system to authorize a portable electronic device to play games of chance.

FIG. 8 illustrates a block diagram of an example system to authorize a portable electronic device to play games of chance. The system 1100 may have a gaming server 1102, a gaming system manager 1104, a network 1106, a plurality of docking stations 1108*a-n* (where n is an integer), and a plurality of mobile or portable electronic devices 1110*a-n*.

Mobile electronic devices 1110*a-n* may be any portable electronic device such as mobile telephones, tablet computers, laptop computers, handheld gaming devices, media players, or any other mobile electronic device having the capability to play a game of chance.

The docking station 1108*a-n* may be configured to receive and/or detect whether the mobile electronic device 1110*a-n* is connected to the docking station 1108*a-n*. In one embodiment, the docking station 1108*a-n* may have a receiver configured to physically receive the mobile electronic device 1110*a-n*. In another embodiment, the mobile electronic device may be detected by the docking station via any wired or wireless means. For example, an external connector or dongle may be used to connect or couple the docking stations 1108*a-n* and the mobile electronic device 1110*a-n*. In another example, the mobile electronic device 1110*a-n* may be detected by the docking station 1108*a-n* via any known wireless methods or device such as a 3G wireless technology, 4G wireless technology, Bluetooth, Wireless USB, Near-field magnetic, Fire Wire, WiMax, IEEE 802.11x technology, radio frequency, and the like. Detection of the mobile electronic device 1110*a-n* may be initiated by a graphical user interface on the docking station 108*a-n* or the mobile electronic device 1110*a-n*.

Once the mobile electronic device 1110*a-n* is detected by the docking station 1108*a-n*, mobile device information may be transmitted from the mobile electronic device 1110*a-n* to the docking station 1108*a-n*. Mobile device information may be any information necessary to determine whether the mobile device has the capability to play games of chance, authenticate the mobile electronic device 1110*a-n*, validate or authenticate the user of the mobile electronic device 1110*a-n*, or any other desired information may be transmitted to the docking station 1108*a-n*. For example, mobile device information may include the mobile electronic device 1110*a-n* capabilities such as power capacity, display resolution, memory capacity, processor capacity, disk space, software versions, and the like. Mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment. In another example, the user may show an interest in gourmet food. The gaming establishment may transmit, to the mobile electronic device, a coupon for 50% off at their steak house.

The docking station 1108*a-n* may be configured to determine whether games of chance can be played on the mobile electronic device 1110*a-n* based on the received mobile device information. For example, the docking station 108*a-n* may determine whether the mobile electronic device 1110*a-n* is compatible with software residing of the docking station 1108*a-n*, the gaming system manager 1104, or the gaming server 1102 in order to play the game of chance. The docking station 1108*a-n* may also be configured to determine whether the mobile electronic device 1110*a-n* has enough memory to play the games of chance.

In one embodiment, if the mobile electronic device 1110*a-n* is physically connected to docking station 1108*a-n* either wired, by a connector, or received by the receiver of the docking station 1108*a-n*, docking station 1108*a-n* may be configured to provide a charge to the mobile electronic device 1110*a-n*. In another embodiment, if the mobile electronic device 1110*a-n* is physically connected to docking station 1108*a-n* wirelessly, the charge to the mobile electronic device 1110*a-n* may be transmitted via electromagnetic induction or any other similar methods used to provide charges wirelessly.

Docking station 1108*a-n* may be configured to authenticate the mobile electronic device 1110*a-n* to play games of chance based upon the received mobile device information. In one embodiment, using a user interface either on the docking station 1108*a-n* and/or on the mobile electronic device 1110*a-n*, the user may be requested to enter a username, password, account number, player tracking information, facial recognition information, voice recognition information, or any other desired user information. In another embodiment, the desired user information necessary to authenticate the mobile electronic device 1110*a-n* and/or user may be embedded in the mobile electronic device 1110*a-n* such that authentication may be completed automatically without any user interaction.

To authenticate the mobile electronic device and the user, the received mobile device information may be compared to information stored on the gaming system manager 1104. The docking station 1108*a-n* may be configured to communicate with the gaming system manager 1104 by any known means such as wired or wirelessly. The gaming system manager 1104 may have a player tracking server 1103 having a player database 1105 configured to store all user information, player tracking information, and any other desired player information. If the received mobile electronic information matches the information stored in the player tracking server 1103, the docking station 1108*a-n* may authenticate the mobile electronic device 1110*a-n* such that the mobile electronic device 1110*a-n* then becomes a trusted gaming electronic device.

In one embodiment, the comparison of the received mobile device information and the information stored on the player tracking server 1103 may be conducted at the docking station 1108*a-n*. In this embodiment, the docking station 1108*a-n* may be configured to receive the player tracking information from the gaming system manager 1104. In another embodiment, the comparison of the received mobile device information and the information stored on the player tracking server 1103 may be conducted by the gaming system manager 1104. In this embodiment, the docking station 1108*a-n* may be configured to transmit the received mobile device information to the gaming system manager 1104 for comparison. If the information match, the gaming system manager 1104 may transmit an authentication signal to the docking station 1108*a-n*. If the information does not match, the gaming system manager 1104 may transmit a rejection signal to the docking station 1108*a-n*.

Once authenticated, the docking station 1108*a-n* may receive a request to play a game of chance from the mobile electronic device 1110*a-n*. If the docking station 1108*a-n* determined that the mobile electronic device 1110*a-n* is capable of playing games of chance, in one embodiment, the docking station 1108*a-n* may transmit the request for the game of chance to the gaming system manager 1104. The requested game of chance data may be obtained from the gaming server 1102 and transmitted to the mobile electronic device 1110*a-n*. In another embodiment, the docking station 1108*a-n* may determine whether the requested game of chance is stored on the docking station 1108*a-n*. If the docking station 1108*a-n* determined that the requested game of chance is stored on the docking station 1108*a-n*, the docking station 1108*a-n* may transmit the requested game of chance data to the mobile electronic device 1110*a-n*.

The game of chance data may be downloaded and stored on the mobile electronic device 1110*a-n*. In another embodiment, the game of chance data may be streamed to the mobile electronic device 1110*a-n*, either from the docking station 1108*a-n* or the gaming system manager 1104. In this embodiment, user input used to play the game of chance may be transmitted to the docking station 1108*a-n* or the gaming system manager 1104. User input may be received from the mobile electronic device 1110*a-n* and/or the docking station 1108*a-n*.

As the game of chance is played, game session data may be periodically transmitted to the docking station 1108*a-n*. Game session data may be transmitted at any desired time. For example, game session data may be transmitted every thirty seconds, every minute, every fifteen minutes, every hour, or at designated time intervals such as between 1 pm-3 pm, and the like. In one embodiment, game session data may be stored at the docking station 1108*a-n*. In another embodiment, the game session data may be received by the docking station 1108*a-n* and transmitted to the gaming system manager 1104. In still another embodiment, the game session data may be directly received by the gaming system manager 1104 from the mobile electronic device 1110*a-n*. Game session data may include any data produced during the game play such as game state data, game history data, account data, coins in and out, credits obtained or used, bonuses received, and any other game data. Game session data may be used in case of a power failure by the docking station or mobile electronic device, malfunction of the docking station or mobile electronic device, or any other reasons. The game session data may be used recreate the gaming sessions to determine if the player won or lost, the amount of credits remaining, if the player was cheating, or any other game session information.

Since a player may want to move about the gaming establishment (e.g., to see a show, eat dinner, watch their friends play at a table game or other gaming machine, etc.) the mobile electronic device 1110*a-n* may be automatically authenticated or received at another docking station 1108*a-n* located near the player. For example, if the player was originally authenticated by a docking station 1108*a-n* located at the bar and is now eating dinner at the buffet, the mobile electronic device 1110*a-n* may be automatically authenticated by a docking station located nearest the buffet. Thus, once a mobile electronic device 1110*a-n* has been authenticated by one docking station 1108*a-n*, the mobile electronic device 1110*a-n* is now deemed a trusted gaming device and may be automatically authenticated when connecting to another docking station 1108*a-n* within the gaming establishment.

The mobile electronic device 1110*a-n* may be configured to communicate with the second docking station 1108*a-n* similar to how it was configured to communicate with the original docking station 1108*a-n* (i.e. wirelessly, wired, physically received in a receiver, and/or use of an external connector). The second docking station 1108*a-n* may also be configured to receive mobile device information from the mobile electronic device 1110*a-n*, transmit the received mobile device information to the gaming system manager 1104, transmit and receive gaming session data, and any other desired operations. The second docking station 1108*a-n* and/or gaming system manager 1104 may determine whether the mobile electronic device 1110*a-n* was previously connected to another portable docking station 1108*a-n* within the gaming establishment based upon the received mobile device information.

Figure 9:
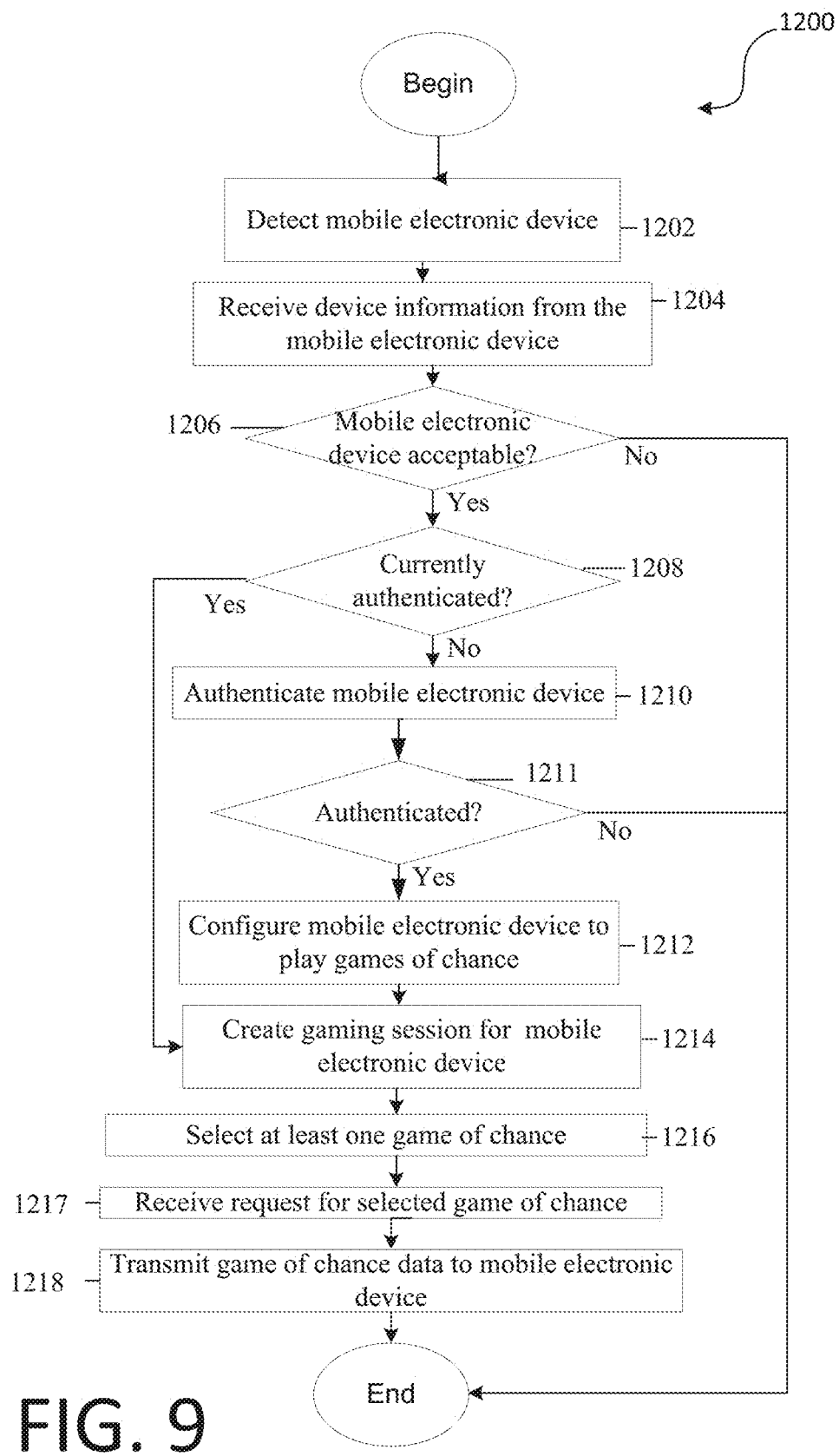
FIG. 9 illustrates a flowchart of an example method for authorizing a mobile electronic device to play games of chance using a docking station.

FIG. 9 illustrates a flowchart of an example method for authorizing a mobile electronic device to play games of chance using a docking station. A mobile electronic device must be authorized, authenticated, and/or validated by a docking station prior to becoming a trusted device that may be used to play games of chance. Mobile electronic devices may be any portable electronic device such as mobile telephones, tablet computers, laptop computers, handheld gaming devices, media players, or any other mobile electronic device having the capability to play a game of chance.

Method 1200 starts with detecting a mobile electronic device at 1202. The docking station (e.g., docking station 1108*a-n* illustrated in FIG. 8) may be configured to receive and/or detect whether the mobile electronic device is connected to the docking station. In one embodiment, the docking station may have a receiver configured to physically receive the mobile electronic device. In another embodiment, the mobile electronic device may be detected by the docking station via any wired or wireless means. For example, an external connector or dongle may be used to connect or couple the docking stations and the mobile electronic device. In another example, the mobile electronic device may be detected by the docking station via any known wireless methods or device such as a 3G wireless technology, 4G wireless technology, Bluetooth, Wireless USB, Near-field magnetic, Fire Wire, WiMax, IEEE 802.11x technology, radio frequency, and the like. Detection of the mobile electronic device may be initiated by a graphical user interface on the docking station or the mobile electronic device.

Device information may be obtained from the mobile electronic device at 1204. Mobile device information may be any information necessary to determine whether the mobile device has the capability to play games of chance, authenticate the mobile electronic device, validate or authenticate the user of the mobile electronic device, or any other desired information may be transmitted to the docking station. For example, mobile device information may include the mobile electronic device capabilities such as power capacity, display resolution, memory capacity, processor capacity, disk space, software versions, and the like. Mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment. In another example, the user may show an interest in gourmet food. The gaming establishment may transmit, to the mobile electronic device, a coupon for 50% off at their steak house.

A determination of whether the mobile electronic device is acceptable may be made at 1206. In other words, a determination of whether games of chance can be played on the mobile electronic device based on the received mobile device information. The docking station can determine whether the mobile electronic device is acceptable in terms of its technical specifications to play games of chance based on the mobile device information provided by the mobile electronic device. For example, the docking station and/or gaming system manager (e.g., gaming system manager 1104 illustrated in FIG. 8) may determine whether the mobile electronic device is compatible with software residing of the docking station, the gaming system manager, or the gaming server (e.g., gaming server 1102 illustrated in FIG. 8) in order to play the game of chance. The docking station may also be configured to determine whether the mobile electronic device has enough memory to play the games of chance. In another example, a game of chance may require that a mobile electronic device run a Macintosh operating system, have at least two gigabytes of memory, and have at least four hundred seventy kilobytes of drive space free. If the mobile electronic device cannot satisfy those requirements, the mobile electronic device may not be allowed to play games of chance and thus, not be an acceptable mobile electronic device.

If the mobile electronic device is determined to be an acceptable device at 1206 a determination of whether the mobile electronic device is currently authenticated may be made at 1208. The mobile electronic device may have been previously authenticated by another docking station within the gaming establishment. Since a player may want to move about the gaming establishment (e.g., to see a show, eat dinner, watch their friends play at a table game or other gaming machine, etc.) the mobile electronic device may be automatically authenticated or received at a second docking station located near the player. For example, if the player was originally authenticated by a docking station located at the bar and is now eating dinner at the buffet, the mobile electronic device may be automatically authenticated by a docking station located nearest the buffet. Thus, once a mobile electronic device has been authenticated by one docking station, the mobile electronic device is now deemed a trusted gaming device and may be automatically authenticated when connecting to another docking station within the gaming establishment.

The mobile electronic device may be configured to communicate with the second docking station similar to how it was configured to communicate with the original docking station (i.e. wirelessly, wired, physically received in a receiver, and/or use of an external connector). The second docking station may also be configured to receive mobile device information from the mobile electronic device, transmit the received mobile device information to the gaming system manager, transmit and receive gaming session data, and any other desired operations. The second docking station and/or gaming system manager may determine whether the mobile electronic device was previously connected to another portable docking station within the gaming establishment based upon the received mobile device information.

If the mobile electronic device is determined to be currently authenticated at 1208, a gaming session may be created for the mobile electronic device at 1214 at the second docking station. If the mobile electronic device is determined to not be currently authenticated at 1208, the mobile electronic device may be authenticated at 1210.

Docking station may be configured to authenticate the mobile electronic device to play games of chance based upon the received mobile device information. In one embodiment, using a user interface either on the docking station and/or on the mobile electronic device, the user may be requested to enter a username, password, account number, player tracking information, facial recognition information, voice recognition information, or any other desired user information. In another embodiment, the desired user information necessary to authenticate the mobile electronic device and/or user may be embedded in the mobile electronic device such that authentication may be completed automatically without any user interaction.

To authenticate the mobile electronic device and the user, the received mobile device information may be compared to information stored on the gaming system manager. The docking station may be configured to communicate with the gaming system manager by any known means such as wired or wirelessly. The gaming system manager may have a player tracking server (e.g., player tracking server 1103 illustrated in FIG. 8) having a player database configured to store all user information, player tracking information, and any other desired player information. A determination of whether the mobile electronic device is authenticated may be made at 1211. If the received mobile electronic information matches the information stored in the player tracking server, the docking station may authenticate the mobile electronic device at 1211 such that the mobile electronic device then becomes a trusted gaming electronic device that may be used to play games of chance. If the received mobile electronic information does not match the information stored in the player tracking server, the docking station may not authenticate the mobile electronic device at 1211 and the method 1200 may end.

In one embodiment, the comparison of the received mobile device information and the information stored on the player tracking server may be conducted at the docking station. In this embodiment, the docking station may be configured to receive the player tracking information from the gaming system manager. In another embodiment, the comparison of the received mobile device information and the information stored on the player tracking server may be conducted by the gaming system manager. In this embodiment, the docking station may be configured to transmit the received mobile device information to the gaming system manager for comparison. A determination of whether the mobile electronic device is authenticated may be made at 1211. If the information matches, the gaming system manager may transmit an authentication signal to the docking station and the mobile electronic device may be authenticated at 1211. If the information does not match, the gaming system manager may transmit a rejection signal to the docking station and the mobile electronic device may not be authenticated at 1211 and the method 1200 may end.

If the mobile electronic device is authenticated at 1211, docking station may configure the mobile electronic device to play the games of chance at 1212. In one example, space in the memory of the mobile electronic device may be dedicated for use to play the game of chance. In another example, secure software to prevent cheating, hacking, and/or to comply with any gaming regulations or laws may be required to be downloaded to the mobile electronic device.

A gaming session may then be created for the mobile electronic device at 1214. For example, creating a gaming session may include creating a player tracking account, if no player traction account was created for the user. In another example, creating a gaming session may include creating an account for the mobile electronic device to save and store game session data. The game session data stored in the gaming database may include game state data, game history data, account data, and the like. Game state data may show a position in a game, game progress, a current account balance, active bets placed, pending game outcomes, and the like. The game history data may include games of chance played, wagers made, past account balances, game progress, outcomes of games of chance, and the like. Game session data may be used in case of a power failure by the docking station or mobile electronic device, malfunction of the docking station or mobile electronic device, or any other reasons. The game session data may be used recreate the gaming sessions to determine if the player won or lost, the amount of credits remaining, if the player was cheating, or any other game session information.

In still another example, creating the gaming session may include transmitting a list of the games of chance, establishing a link to a player tracking account, and any other desired actions to create a gaming session. The list of games of chance may be customized based upon the user interests, randomly provided, include a summary of each game of chance, and any other information about each of the games of chance. The list of the games of chance may be presented on either the mobile electronic device or the docking station.

Creating the gaming session may also allow the user to easily access and transfer funds to play the game of chance and/or cash out the remaining funds in the gaming session. For example, the gaming session may store the amount of funds received and remaining for the gaming session.

In one embodiment, the funds stored in the gaming session may be used to play the games of chance. In another embodiment, the funds stored in the gaming session may be used for non-gaming purposes, such as paying for a hotel stay, watch a movie, eat at the buffet, play bowling, and any other purchases.

At least one game of chance may be selected at 1216. Using the mobile electronic device and/or the docking station, the player may select a game of chance to play. If selected using the mobile electronic device, a request for the selected game of chance may be received by the docking station at 1217. If selected using the docking station, a request for the selected game of chance may be received by to the gaming system manager at 1217.

The requested game of chance may be transmitted to the mobile electronic device at 1218. The requested game of chance data may be obtained from the gaming server and transmitted to the mobile electronic device. In another embodiment, the docking station may determine whether the requested game of chance is stored on the docking station. If the docking station determines that the requested game of chance is stored on the docking station, the docking station may transmit the requested game of chance data to the mobile electronic device.

The game of chance data may be downloaded and stored on the mobile electronic device. In another embodiment, the game of chance data may be streamed to the mobile electronic device, either from the docking station or the gaming system manager. In this embodiment, user input used to play the game of chance may be transmitted to the docking station or the gaming system manager. User input may be received from the mobile electronic device and/or the docking station.

Figure 10A:
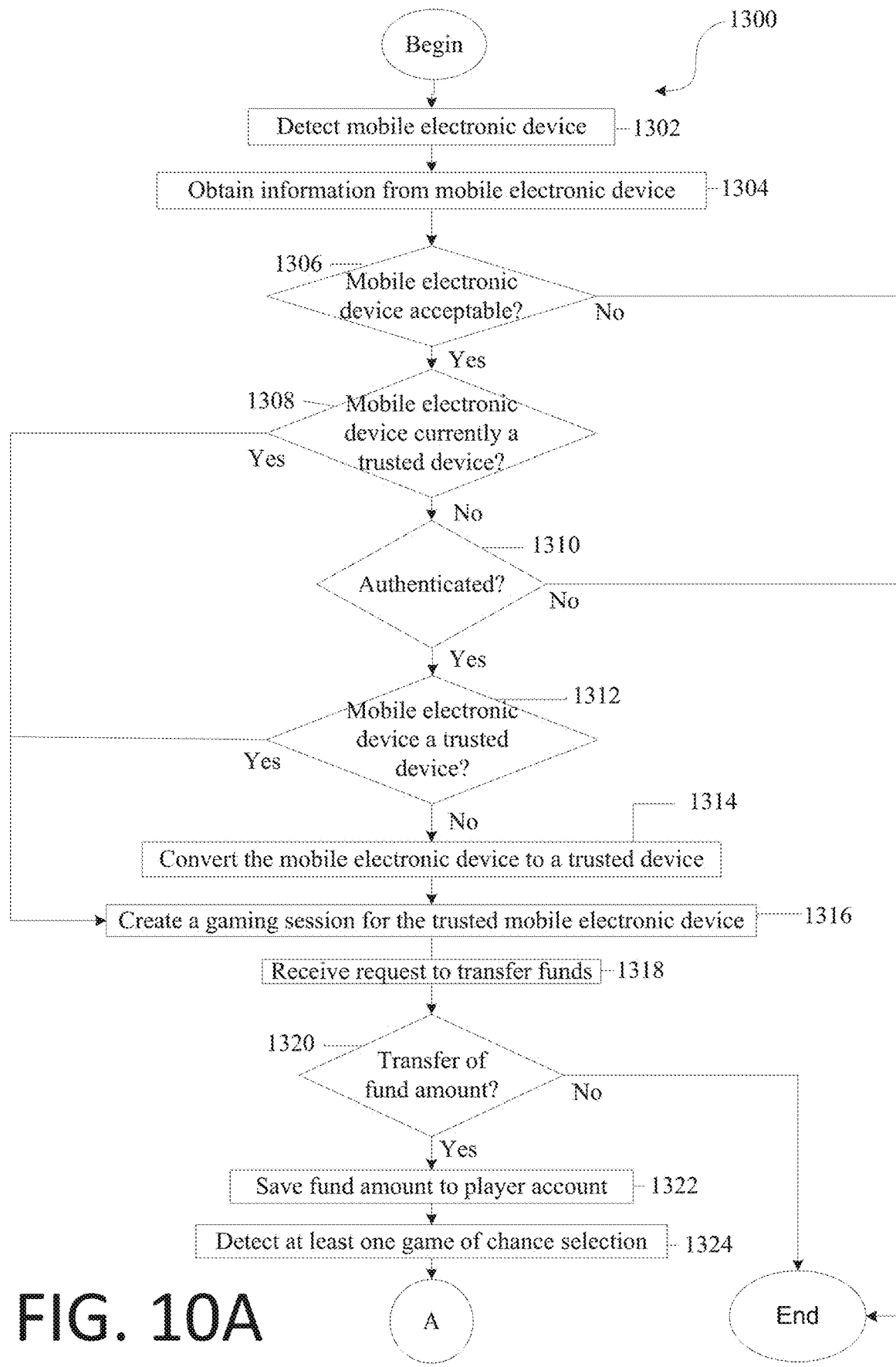
FIGS. 10A-10B illustrate flowcharts of an example method for converting a mobile electronic device to a trusted mobile electronic device using a docking station.
Figure 10B:
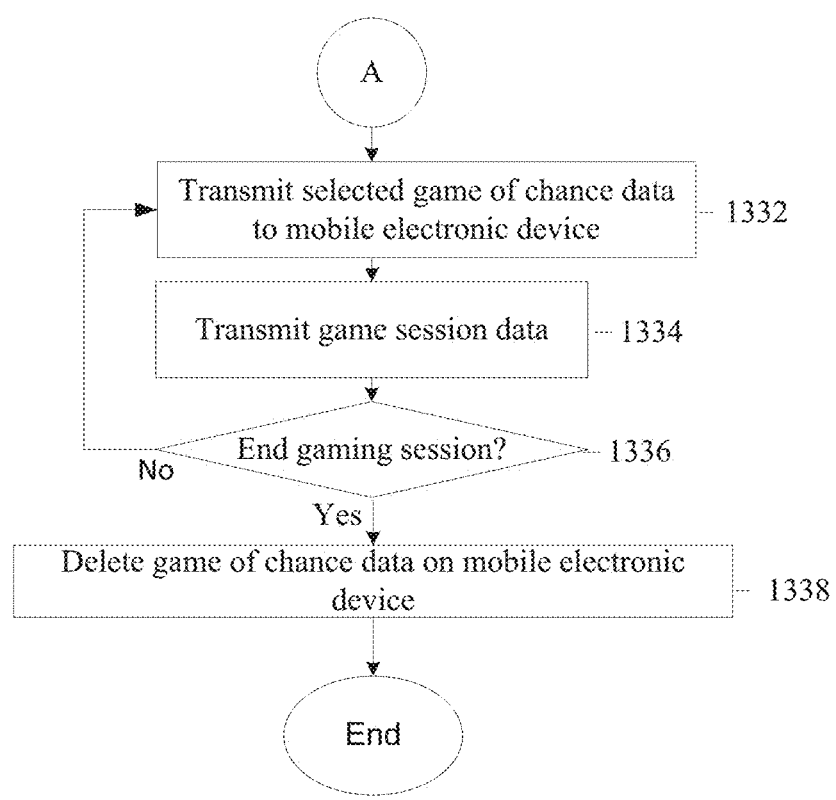

FIGS. 10A-10B illustrate flowcharts of an example method for converting a mobile electronic device to a trusted mobile electronic device using a docking station. As illustrated in FIG. 10A, the method 1300 may start with detecting a mobile electronic device at 1302. A mobile electronic device must be authorized, authenticated, and/or validated by a docking station in order to become a trusted device capable of being used to play games of chance. Mobile electronic devices may be any portable electronic device such as mobile telephones, tablet computers, laptop computers, handheld gaming devices, media players, or any other mobile electronic device having the capability to play a game of chance.

Method 1300 starts with detecting a mobile electronic device at 1302. The docking station (e.g., docking station 1108*a-n* illustrated in FIG. 8) may be configured to receive and/or detect whether the mobile electronic device is connected to the docking station. In one embodiment, the docking station may have a receiver configured to physically receive the mobile electronic device. In another embodiment, the mobile electronic device may be detected by the docking station via any wired or wireless means. For example, an external connector or dongle may be used to connect or couple the docking stations and the mobile electronic device. In another example, the mobile electronic device may be detected by the docking station via any known wireless methods or device such as a 3G wireless technology, 4G wireless technology, Bluetooth, Wireless USB, Near-field magnetic, Fire Wire, WiMax, IEEE 802.11x technology, radio frequency, and the like. Detection of the mobile electronic device may be initiated by a graphical user interface on the docking station or the mobile electronic device.

Mobile device information may be obtained from the mobile electronic device at 1304. Mobile device information may be any information necessary to determine whether the mobile device has the capability to play games of chance, authenticate the mobile electronic device, validate or authenticate the user of the mobile electronic device, or any other desired information may be transmitted to the docking station. For example, mobile device information may include the mobile electronic device capabilities such as power capacity, display resolution, memory capacity, processor capacity, disk space, software versions, and the like. Mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment. In another example, the user may show an interest in gourmet food. The gaming establishment may transmit, to the mobile electronic device, a coupon for 50% off at their steak house.

A determination of whether the mobile electronic device is acceptable may be made at 1306. In other words, a determination of whether games of chance can be played on the mobile electronic device based on the received mobile device information. The docking station can determine whether the mobile electronic device is acceptable in terms of its technical specifications to play games of chance based on the mobile device information provided by the mobile electronic device. For example, the docking station and/or gaming system manager (e.g., gaming system manager 1104 illustrated in FIG. 8) may determine whether the mobile electronic device is compatible with software residing of the docking station, the gaming system manager, or the gaming server (e.g., gaming server 1102 illustrated in FIG. 8) in order to play the game of chance. The docking station may also be configured to determine whether the mobile electronic device has enough memory to play the games of chance. In another example, a game of chance may require that a mobile electronic device run a Macintosh operating system, have at least two gigabytes of memory, and have at least four hundred seventy kilobytes of drive space free. If the mobile electronic device cannot satisfy those requirements, the mobile electronic device may not be allowed to play games of chance and thus, not be an acceptable mobile electronic device.

If the mobile electronic device is determined to be an acceptable device at 1306 a determination of whether the mobile electronic device is currently authenticated may be made at 1308. The mobile electronic device may have been previously authenticated by another docking station within the gaming establishment. Since a player may want to move about the gaming establishment (e.g., to see a show, eat dinner, watch their friends play at a table game or other gaming machine, etc.) the mobile electronic device may be automatically authenticated or received at a second docking station located near the player. For example, if the player was originally authenticated by a docking station located at the bar and is now eating dinner at the buffet, the mobile electronic device may be automatically authenticated by a docking station located nearest the buffet. Thus, once a mobile electronic device has been authenticated by one docking station, the mobile electronic device is now deemed a trusted gaming device and may be automatically authenticated when connecting to another docking station within the gaming establishment.

The mobile electronic device may be configured to communicate with the second docking station similar to how it was configured to communicate with the original docking station (i.e. wirelessly, wired, physically received in a receiver, and/or use of an external connector). The second docking station may also be configured to receive mobile device information from the mobile electronic device, transmit the received mobile device information to the gaming system manager, transmit and receive gaming session data, and any other desired operations. The second docking station and/or gaming system manager may determine whether the mobile electronic device was previously connected to another portable docking station within the gaming establishment based upon the received mobile device information.

A determination of whether the mobile electronic device is authenticated may be made at 1310. Docking station may be configured to authenticate the mobile electronic device to play games of chance based upon the received mobile device information. In one embodiment, using a user interface either on the docking station and/or on the mobile electronic device, the user may be requested to enter a username, password, account number, player tracking information, facial recognition information, voice recognition information, or any other desired user information. In another embodiment, the desired user information necessary to authenticate the mobile electronic device and/or user may be embedded in the mobile electronic device such that authentication may be completed automatically without any user interaction.

To authenticate the mobile electronic device and the user, the received mobile device information may be compared to information stored on the gaming system manager. The docking station may be configured to communicate with the gaming system manager by any known means such as wired or wirelessly. The gaming system manager may have a player tracking server (e.g., player tracking server 1103 illustrated in FIG. 8) having a player database configured to store all user information, player tracking information, and any other desired player information. If the received mobile electronic information matches the information stored in the player tracking server, the docking station may determine that the mobile electronic device is authenticated at 1310. If the received mobile electronic information does not match the information stored in the player tracking server, the mobile electronic device is not authenticated at 1310 and the method 1300 may end.

In one embodiment, the comparison of the received mobile device information and the information stored on the player tracking server may be conducted at the docking station. In this embodiment, the docking station may be configured to receive the player tracking information from the gaming system manager. In another embodiment, the comparison of the received mobile device information and the information stored on the player tracking server may be conducted by the gaming system manager. In this embodiment, the docking station may be configured to transmit the received mobile device information to the gaming system manager for comparison. If the information matches, the gaming system manager may transmit an authentication signal to the docking station and a determination of whether the mobile electronic device is a trusted device may be made at 1312. If the information does not match, the gaming system manager may transmit a rejection signal to the docking station and the method 1300 may end.

In order to become a trusted device, the mobile electronic device must be authenticated and secured. Thus, if the mobile electronic device is determined to be authenticated at 1310, a determination of whether the mobile electronic device is trusted may be made at 1312. To be configured to play games of chance, the mobile electronic device must provide for security features to prevent cheating, hacking, and/or to comply with any gaming regulations or laws. In one embodiment, the security features may deny access to all programs or applications on the mobile electronic device except the programs or applications necessary to play the game of chance. If the mobile electronic device contains the desired security features, the mobile electronic device may be considered a trusted device at 1312.

If the desired security features are not located on the mobile electronic device, the device is deemed to not be a trusted device at 1312. If not a trusted device at 1312, the mobile electronic device may be converted to a trusted mobile electronic device at 1314. The docking station and/or the gaming system manager may determine what secure software and/or applications are necessary for the mobile electronic device to have to become a trusted device. The secure software may then be downloaded to the mobile electronic device. Once the secured software and/or applications are downloaded and saved to the mobile electronic device, the mobile electronic device may be converted to a trusted device at 1314.

If the mobile electronic device is already trusted, the docking station may create a gaming session for the trusted mobile electronic device at 1316. For example, creating a gaming session may include creating a player tracking account, if the player did not have an existing player tracking account. In another example, creating a gaming session may include creating an account for the mobile electronic device to save and store game session data. The game session data stored in the gaming database may include game state data, game history data, account data, and the like. Game session data may be used in case of a power failure by the docking station or mobile electronic device, malfunction of the docking station or mobile electronic device, or any other reasons. The game session data may be used recreate the gaming sessions to determine if the player won or lost, the amount of credits remaining, if the player was cheating, or any other game session information.

Game state data may show a position in a game, game progress, a current account balance, active bets placed, pending game outcomes, and the like. The game history data may include games of chance played, wagers made, past account balances, game progress, outcomes of games of chance, and the like. In still another example, creating the gaming session may include transmitting a list of the games of chance that may be played on the mobile electronic device, establishing a link to a player tracking account, and any other desired actions to create a gaming session. The list of games of chance may be customized based upon the user interests, randomly provided, include a summary of each game of chance, and any other information about each of the games of chance. The list of the games of chance may be presented on either the mobile electronic device or the docking station.

A request for a fund transfer may be received at 1318 by the docking station. The fund transfer amount may include a fund amount, the amount requested to be transferred and used to play the game of chance, and a fund account. The fund account may be a bank, the gaming establishment where the player has a player tracking account, or any other fund account or source from where the fund amount may be obtained. The fund amount may also be used for non-gaming purposes, such as purchasing drinks, paying for a hotel stay, and the like. The fund amount may be monetary or non-monetary, such as credits, player tracking points, and the like.

In one embodiment, the docking station may transmit the fund transfer request to the fund account. In another embodiment, the docking station may transmit the fund transfer request to the gaming management server. The gaming management server may then transmit the fund transfer request to the fund account.

A determination of whether funds were transferred may be made at 1320. If the docking station receives the fund amount, the fund amount may be saved to a player account at 1322. The player account may be the player's tracking account, the gaming session account, or any other player account. If no fund amount was received at the docking station, the method 1300 may end. The docking station may not receive the fund amount for various reasons such as an insufficient account balance, the player leaves the gaming establishment prior to the transfer of funds, the mobile electronic device is no longer a trusted device, the player using the mobile electronic device is underage, the mobile electronic device is incapable of playing games of chance, the request fund amount is prohibited by law, the player has already requested the maximum amount allowed by law, the mobile electronic device has a low battery charge, or any other reasons.

Having created the gaming session at 1316, the user may easily access and transfer funds to play the game of chance and/or cash out the remaining funds in the gaming session. For example, the gaming session may store the amount of funds received and remaining for the gaming session.

At least one game of chance selection may be detected at 1324. A player may select a game of chance to play on the mobile electronic device using controls on the mobile electronic device and/or the docking station. If selected using the mobile electronic device, a request for the selected game of chance may be transmitted at 1217 to the docking station. If selected using the docking station, a request for the selected game of chance may be transmitted at 1217 to the gaming system manager.

Referring now to FIG. 10B, the requested game of chance may be transmitted to the mobile electronic device at 1332. The requested game of chance data may be obtained from the gaming server and transmitted to the mobile electronic device. In another embodiment, the docking station may determine whether the requested game of chance is stored on the docking station. If the docking station determines that the requested game of chance is stored on the docking station, the docking station may transmit the requested game of chance data to the mobile electronic device.

The game of chance data may be downloaded and stored on the mobile electronic device. In another embodiment, the game of chance data may be streamed to the mobile electronic device, either from the docking station or the gaming system manager. In this embodiment, user input used to play the game of chance may be transmitted to the docking station or the gaming system manager. User input may be received from the mobile electronic device and/or the docking station.

Game session data may be transmitted at 1334. Game session data may include any data produced during the game play such as game state data, game history data, account data, coins in and out, credits obtained or used, bonuses received, and any other game data. Game session data may be used in case of a power failure by the docking station or mobile electronic device, malfunction of the docking station or mobile electronic device, or any other reasons. The game session data may be used recreate the gaming sessions to determine if the player won or lost, the amount of credits remaining, if the player was cheating, or any other game session information. Game state data may show a position in a game, game progress, a current account balance, active bets placed, pending game outcomes, and the like. The game history data may include games of chance played, wagers made, past account balances, game progress, outcomes of games of chance, and the like. As the game of chance is played, game session data may periodically transmitted to the docking station. Game session data may be transmitted at any desired time. For example, game session data may be transmitted every thirty seconds, every minute, every fifteen minutes, every hour, or at designated time intervals such as between 1 pm-3 pm, and the like. In one embodiment, game session data may be stored at the docking station. In another embodiment, the game session data may be received by the docking station and transmitted to the gaming system manager. In still another embodiment, the game session data may be directly received by the gaming system manager from the mobile electronic device.

A determination of whether the gaming session should end may be made at 1336. The gaming session may end for a variety of reasons such as no more credits to play the game of chance, insufficient account balance, the player leaves the vicinity in which the mobile electronic device is trusted, the mobile electronic device is no longer capable of playing the game of chance, the mobile electronic device is in an area where playing games of chance is prohibited, the battery charge of the mobile electronic device is low, or for any legal reasons.

If it is determined that the gaming session should end at 1336, any game of chance data stored on the mobile electronic device may be deleted at 1338. Any game session data as well as security software downloaded on the mobile electronic device may also be deleted. If it is determined that the gaming session should not end at 1336, game of chance data may continue to be provided to the mobile electronic device at 1332.

Figure 11:
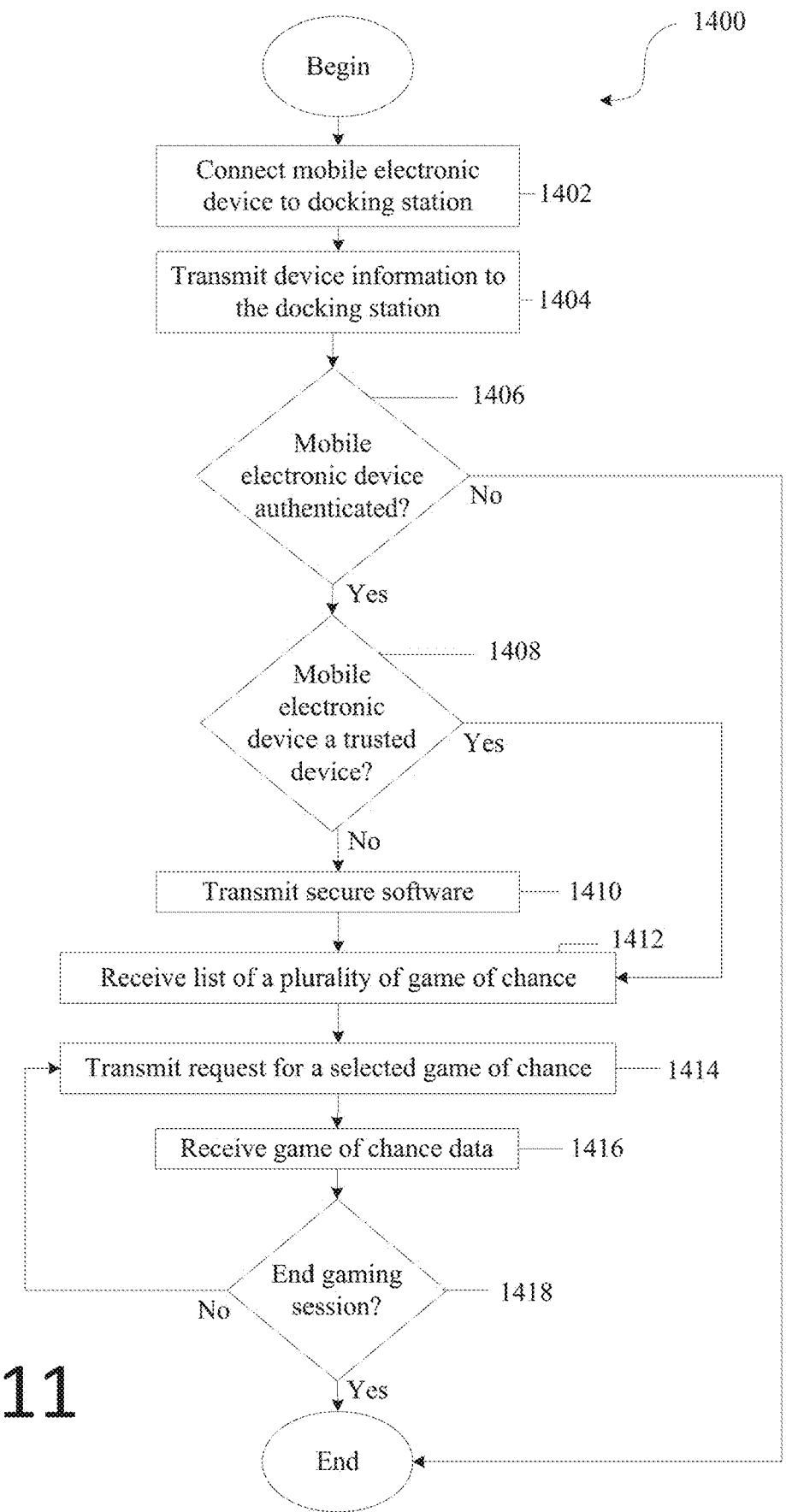
FIG. 11 illustrates a flowchart of an example method for authorizing a mobile electronic device using a docking station.

FIG. 11 illustrates a flowchart of an example method for authorizing a mobile electronic device using a docking station. The method 1400 may begin by connecting a mobile electronic device to a docking station at 1402. The mobile electronic device may be any device such as mobile telephones, tablet computers, laptop computers, handheld gaming devices, media players, and the like. The connection to the docking station may be via a wired, wireless, or a physical connection to the docking station. In one embodiment, a connector on a receiver of the docking station may be used to connect the mobile electronic device to the docking station. The connector may be designed to receive the mobile electronic device and configured to detect whether the mobile electronic device is physically connected to the docking station. The connector may be designed or configured to allow the mobile electronic device to communicate with the docking station.

In another embodiment, an intermediary connector (e.g., intermediary connector described in detail with reference to FIG. 12) may be used to connect the mobile electronic device to the receiver. The intermediary connector may be a universal connector to allow all types of mobile electronic devices to communicate with the docking station. The intermediary connector may have a plurality of inputs configured to receive the mobile electronic device or a wire connection to the mobile electronic device. Each of the plurality of inputs may have a different configuration to receive different mobile electronic devices. The intermediary connector may also have an external wire configured to be received by a mobile electronic device. This allows connection to the docking station 1500 to be a wired connection.

Figure 13:
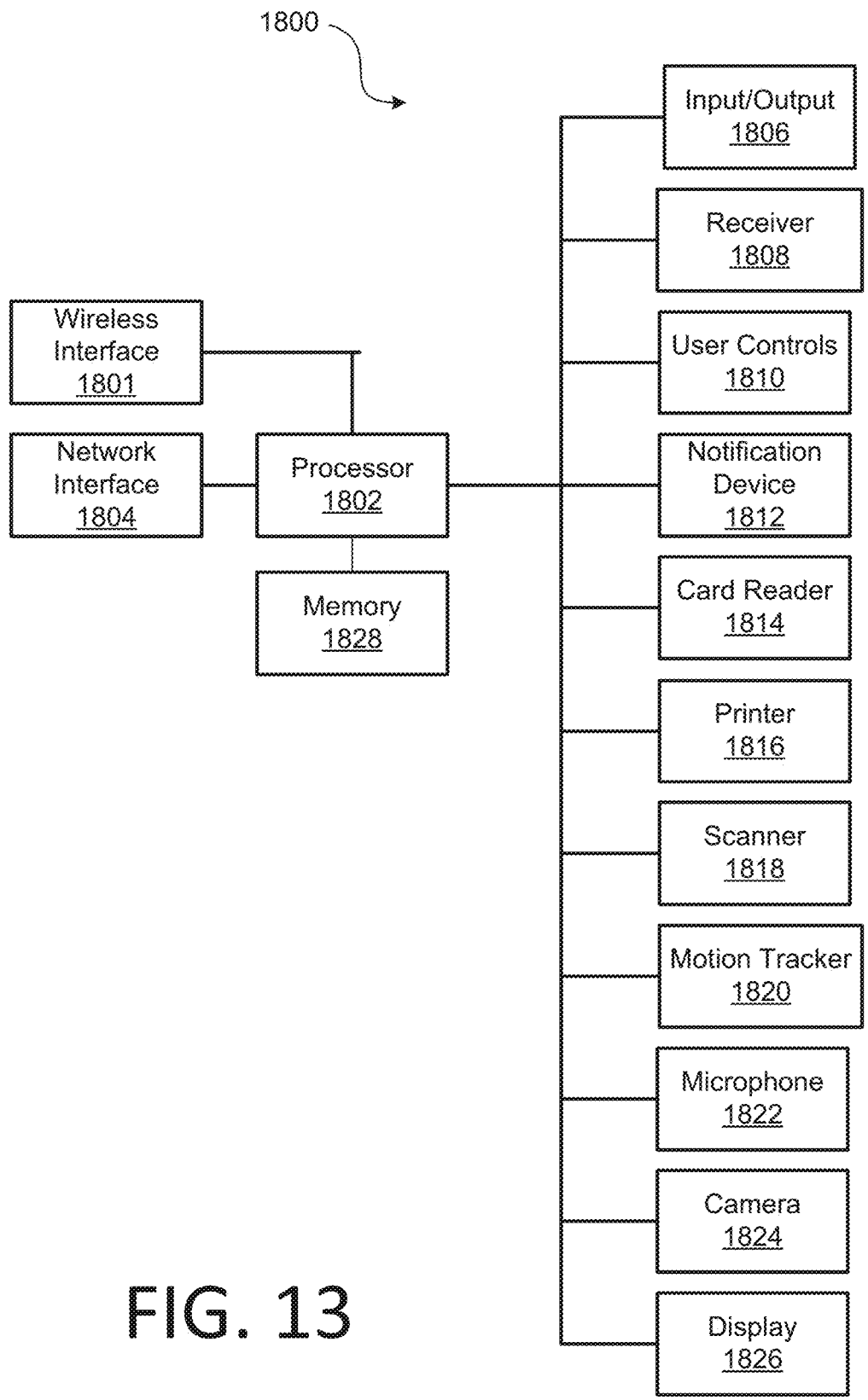
FIG. 13 illustrates a block diagram of an example docking station.

In another embodiment, the docking station may have a wireless receiver (as illustrated in FIG. 13) to connect the mobile electronic device to the docking station wirelessly. Any known wireless methods may be used such as a 3G wireless technology, 4G wireless technology, Bluetooth, Wireless USB, Near-field magnetic, Fire Wire, WiMax, IEEE 802.11x technology, radio frequency, and the like.

Device information may be transmitted to the docking station at 1404. Mobile device information may be any information necessary to determine whether the mobile device has the capability to play games of chance, authenticate the mobile electronic device, validate or authenticate the user of the mobile electronic device, or any other desired information may be transmitted to the docking station. For example, mobile device information may include the mobile electronic device capabilities such as power capacity, display resolution, memory capacity, processor capacity, disk space, software versions, and the like. Mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment. In another example, the user may show an interest in gourmet food. The gaming establishment may transmit, to the mobile electronic device, a coupon for 50% off at their steak house.

A determination of whether the mobile electronic device is authenticated may be made at 1406 based on the transmitted mobile device information. Docking station may be configured to authenticate the mobile electronic device to play games of chance based upon the received mobile device information. In one embodiment, using a user interface either on the docking station and/or on the mobile electronic device, the user may be requested to enter a username, password, account number, player tracking information, facial recognition information, voice recognition information, or any other desired user information. In another embodiment, the desired user information necessary to authenticate the mobile electronic device and/or user may be embedded in the mobile electronic device such that authentication may be completed automatically without any user interaction.

To authenticate the mobile electronic device and the user, the received mobile device information may be compared to information stored on the gaming system manager. The docking station may be configured to communicate with the gaming system manager by any known means such as wired or wirelessly. The gaming system manager may have a player tracking server (e.g., player tracking server 1103 illustrated in FIG. 8) having a player database configured to store all user information, player tracking information, and any other desired player information. If the received mobile electronic information matches the information stored in the player tracking server, the docking station may determine that the mobile electronic device is authenticated at 1406. If the received mobile electronic information does not match the information stored in the player tracking server, the mobile electronic device is not authenticated at 1406 and the method 1400 may end.

In one embodiment, the comparison of the received mobile device information and the information stored on the player tracking server may be conducted at the docking station. In this embodiment, the docking station may be configured to receive the player tracking information from the gaming system manager. In another embodiment, the comparison of the received mobile device information and the information stored on the player tracking server may be conducted by the gaming system manager. In this embodiment, the docking station may be configured to transmit the received mobile device information to the gaming system manager for comparison. If the information matches, the gaming system manager may transmit an authentication signal to the docking station and a determination of whether the mobile electronic device is a trusted device may be made at 1408. If the information does not match, the gaming system manager may transmit a rejection signal to the docking station and the method 1400 may end.

In order to become a trusted device, the mobile electronic device must be authenticated and secured. Thus, if the mobile electronic device is determined to be authenticated at 1406, a determination of whether the mobile electronic device is trusted may be made at 1408 based on the transmitted mobile device information. To be configured to play games of chance, the mobile electronic device must provide for security features to prevent cheating, hacking, and/or to comply with any gaming regulations or laws. In one embodiment, the security features may deny access to all programs or applications on the mobile electronic device except the programs or applications necessary to play the game of chance. If the mobile electronic device contains the desired security features, based on the received mobile device information, the mobile electronic device may be considered a trusted device at 1408.

If the desired security features are not located on the mobile electronic device, the device is deemed to not be a trusted device at 1408, the required security software or applications may be received by the mobile electronic device at 1410. The mobile electronic device may then be converted to a trusted mobile electronic device. The docking station and/or the gaming system manager may determine what secure software and/or applications are necessary for the mobile electronic device to have to become a trusted device. The secure software may then be downloaded to the mobile electronic device. Once the secured software and/or applications are downloaded and saved to the mobile electronic device, the mobile electronic device may be converted to a trusted device and a list of a plurality of games of chance may be received at the mobile gaming device at 1412.

Once selected by the user, a request for a selected game of chance may be transmitted at 1414 to the docking station and/or gaming system manager. The game of chance data for the selected game of chance may be received at 1416. The requested game of chance data may be obtained from the gaming server and transmitted to the mobile electronic device. In another embodiment, the docking station may determine whether the requested game of chance is stored on the docking station. If the docking station determines that the requested game of chance is stored on the docking station, the docking station may transmit the requested game of chance data to the mobile electronic device.

The game of chance data may be downloaded and stored on the mobile electronic device. In another embodiment, the game of chance data may be streamed to the mobile electronic device, either from the docking station or the gaming system manager. In this embodiment, user input used to play the game of chance may be transmitted to the docking station or the gaming system manager. User input may be received from the mobile electronic device and/or the docking station.

A determination of whether the gaming session should end may be made at 1418. The gaming session may end for a variety of reasons such as no more credits to play the game of chance, insufficient account balance, the player leaves the vicinity in which the mobile electronic device is trusted, the mobile electronic device is no longer capable of playing the game of chance, the mobile electronic device is in an area where playing games of chance is prohibited, the battery charge of the mobile electronic device is low, or for any legal reasons.

If it is determined that the gaming session should end at 1418, any game of chance data stored on the mobile electronic device may be deleted. Any game session data as well as security software downloaded on the mobile electronic device may also be deleted. If it is determined that the gaming session should not end at 1418, game of chance data may continue to be received at 1416.

Figure 12:
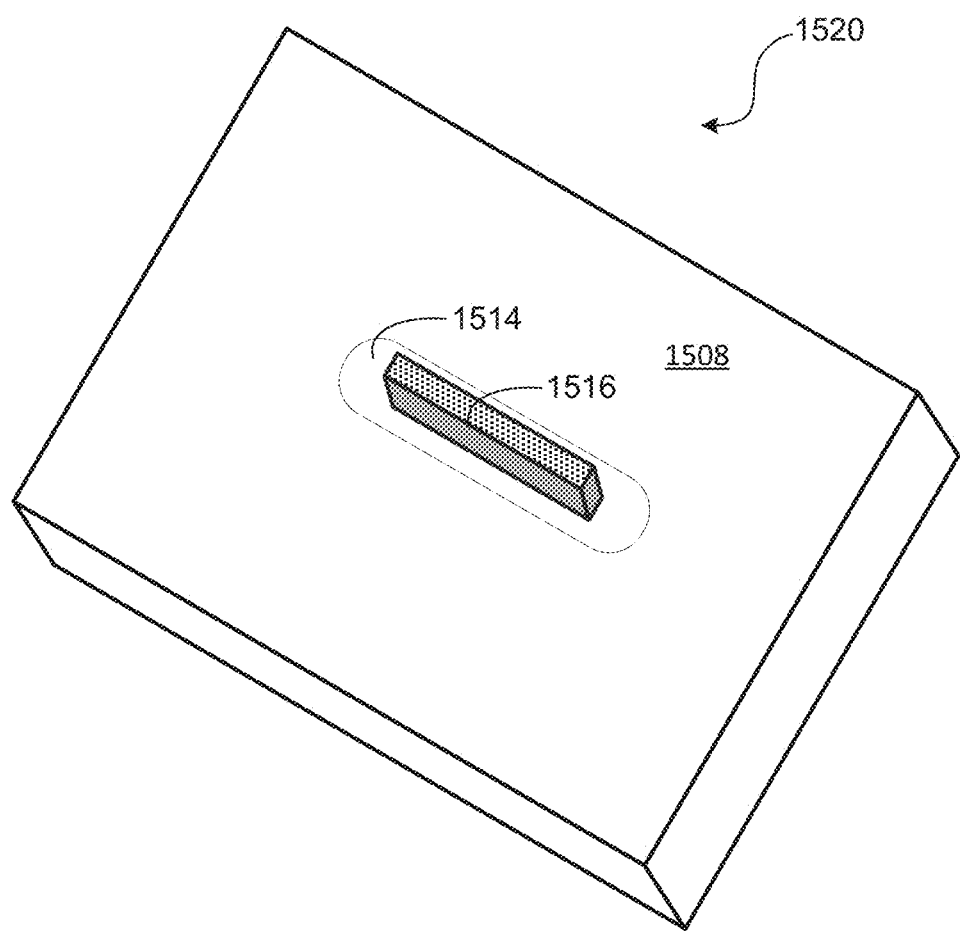
FIG. 12 illustrates an example docking station.

FIG. 12 illustrates an example docking station. The docking station 1520 may have a housing 1508, a receiver 1514, and a connector 1516. The housing 1508 may be made from any material, such as metal, plastic, and any other desired material. The housing, although illustrated as a rectangular shape, may be formed as any desired shape such as a circular, cube, square, cube, triangle, prism, and the like. The housing 1508 may be formed from any known process such as being molded or any other known methods.

The receiver 1514 may be designed to receive any mobile electronic device. The receiver 1514 may be designed to be set into or recessed into the housing 1508. In another embodiment, the receiver may extend outwardly from the housing. In still another embodiment, the receiver 1514 may be flush with the housing 1508 of the docking station 1520.

Receiver 1514 may include a connector 1516 positioned in the center of the receiver 1514 and extending outwardly from the receiver 1514. The connector 1516 may be designed to receive a mobile electronic device and configured to detect whether the mobile electronic device is physically connected to the docking station 1520. The connector 1516 may be designed or configured to allow the mobile electronic device to communicate with the docking station 1520. As illustrated, connector 1516 may have different shapes and be different types of connectors to receive different types of mobile electronic devices. Although depicted as a physical connection, the connector 1516 may be a wireless connection between the docking station and the mobile electronic device. A wireless connection is convenient to allow connection between the docking station and the mobile electronic device without having to find a matching physical connector-pair. Wireless communication technology such as WiFi (802.11x), BlueTooth, Near Field Communication, Zigbee, and the like are known in the art and can be implemented. Additionally, the charging function may also be implemented without a physical connection using a wireless charging technology. For example, wireless charging via electromagnetic induction utilizes two induction coils, one in the charging station and one in the portable electronic device, to transfer energy via alternating electromagnetic field.

In one embodiment, the detection may occur when the mobile electronic device is physically connected or coupled to the receiver 1514. In another embodiment, detection may occur when an intermediary connector (not shown) may be used to connect the mobile electronic device to the receiver 1514. The intermediary connector 1502 may be a universal connector to allow all types of mobile electronic devices to communicate with the docking station, such as, for example, the portable intermediary trusted device discussed in U.S. application Ser. No. 13/833,116, filed Mar. 15, 2013, which is incorporated by reference. The mobile electronic device may be any device such as mobile telephones, tablet computers, laptop computers, handheld gaming devices, media players, and the like.

The intermediary connector may have a plurality of inputs configured to receive the mobile electronic device or a wire connection to the mobile electronic device. Each of the plurality of inputs may have a different configuration to receive different mobile electronic devices. The intermediary connector may also have an external wire configured to be received by a mobile electronic device. This allows connection to the docking station 1520 to be a wired connection. Although depicted as a physical connection, the intermediary connector may be replaced with a wireless connection between the docking station and the mobile electronic device. A wireless connection is convenient to allow connection between the docking station and the mobile electronic device without having to find a matching physical connector-pair. Wireless communication technology such as WiFi (802.11x), BlueTooth, Near Field Communication, Zigbee, and the like are known in the art and can be implemented.

In one embodiment, when the mobile electronic device is connected to the docking station 1520, the docking station may be configured to provide an electronic charge to the mobile electronic device thereby charging the battery of the mobile electronic device. Charging may be implemented as a wired connection. Additionally, the charging function may also be implemented without a physical connection using a wireless charging technology. For example, wireless charging via electromagnetic induction utilizes two induction coils, one in the charging station and one in the portable electronic device, to transfer energy via alternating electromagnetic field.

Once connected to or in communication with the docking station, any data may be transferred from the mobile electronic device to the docking station and vice versa using connector 1516. In one example, the docking station 1520 may detect whether the mobile electronic device is received by receiver 1514 upon the initial transfer of information from the mobile electronic device to the docking station. Mobile device information may be any information necessary to determine whether the mobile device has the capability to play games of chance, authenticate the mobile electronic device, validate or authenticate the user of the mobile electronic device, or any other desired information may be transmitted to the docking station. For example, mobile device information may include the mobile electronic device capabilities such as power capacity, display resolution, memory capacity, processor capacity, disk space, software versions, and the like. Mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment. In another example, the user may show an interest in gourmet food. The gaming establishment may transmit, to the mobile electronic device, a coupon for 50% off at their steak house.

In another example, game session data may be periodically transferred from the mobile electronic device to the docking station and game of chance data may be transmitted from the docking station to the mobile electronic device as the player plays the game of chance. Game session data may be used in case of a power failure by the docking station or mobile electronic device, malfunction of the docking station or mobile electronic device, or any other reasons. The game session data may be used recreate the gaming sessions to determine if the player won or lost, the amount of credits remaining, if the player was cheating, or any other game session information. Game session data and/or game of chance data may be transmitted at any desired time. For example, game session data and/or game of chance data may be transmitted every thirty seconds, every minute, every fifteen minutes, every hour, or at designated time intervals such as between 1 pm-3 pm, and the like. Game session data may include any data produced during the game play such as game state data, game history data, account data, coins in and out, credits obtained or used, bonuses received, and any other game data. Game state data may show a position in a game, game progress, a current account balance, active bets placed, pending game outcomes, and the like. The game history data may include games of chance played, wagers made, past account balances, game progress, outcomes of games of chance, and the like. In one embodiment, game session data may be stored at the docking station. In another embodiment, the game session data may be received by the docking station and transmitted to the gaming system manager. In still another embodiment, the game session data may be directly received by the gaming system manager from the mobile electronic device.

Also feasible is a wireless connection for communication as well as for charging. Docking station may also have a variety of inputs, outputs, controls, peripherals, and other external devices. For example, docking station may have a plurality of user controls speaker, camera, printer, microphone, card reader, and display.

The plurality of user controls 1610 may be used to transmit an input and/or output to the mobile electronic device and/or to the docking station. The plurality of user controls may be any type of user controls such as a keypad, keyboard, button panel, buttons, joystick, and any other user controls able to provide input and/or output. For example, the user controls may be used to input username, account number, request for drinks, request restaurant reservation, request a fund transfer, and any other requests and/or data. The user controls 1610 may also be used to play the game of chance.

The speaker may be used to provide audio such as music, audio instructions, and any other audio sounds such as bells, whistles, and the like. For example, if the player wins a bonus play, the speaker may output a distinctive sound that alerts the player a bonus game is about to begin.

Microphone 1618 may be configured to receive audio sounds from the user. For example, in lieu of using the plurality of user controls, the user may use the microphone to verbally input requests and data, such as username, account number, request for drinks, request restaurant reservation, request a fund transfer, and any other requests and/or data. In another example, microphone may be configured to recognize the voice of the player using voice recognition information previously provided by the player.

Camera may be used to detect images, such as the user's image to authenticate the user. For example, camera may be configured to conduct facial recognition to authenticate the player in order to convert the mobile electronic device to a trusted device. In another example, camera may also be used by the gaming establishment to communicate with the user and/or allow the user to play the games of chance. In another example, camera may be configured to recognize gestures. For example, if the player is playing blackjack, the player may use gestures to "Hit" or "Stand". In another example, the player may use gestures to request a fund amount. Thus, camera may be used for any gaming or non-gaming purposes.

Printer may be configured to print any information or data. For example, printer may be used to print vouchers, coupons, receipts, documents, and the like. As stated above with reference to FIG. 8, mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment by printing out a flyer notifying the player of the poker tournament. In another example, the user may show an interest in gourmet food. The gaming establishment may transmit, to the docking station, a coupon for 50% off at their steak house that may be printed using printer 616.

Card reader may be configured to read data from a storage medium, such as a credit card, player tracking card, and the like. Card reader may be used to access to a player tracking account, transfer funds from a credit card or banking card, transfer user information, or any other desired requests, uses, and the like. In another example, card reader may be used to read data from a card to authenticate and/or validate the mobile electronic device.

Display may be any type of known display such as a liquid crystal display, touch screen, and the like. Display may be used for any known purposes such as displaying or presenting gaming establishment information (e.g., list of games of chance that may be played on the mobile electronic device, tournament information, movie times, and the like) to the player, display funds in the player tracking account, display remaining credits to play the game of chance. In another example, display may be used as a touch screen to input user information, such as username, password, play games of chance, and any other information. Display may be used to present or display any other gaming or non-gaming information.

In use, a player may select to play a game of chance using a variety of methods. For example, the player may select a game of chance using the touch-screen display, one of the plurality of user inputs, both the display and at least one of the plurality of user inputs, verbally requesting the game of chance using the microphone, gesture recognition using the camera.

As discussed in detail above, the game of chance may be downloaded or streamed to the mobile electronic device. Either way, the user may play the game of chance using a variety of devices or peripherals on the docking station0. For example, the user may play the game of chance using controls on the mobile electronic device. In another example, the user may play the game of chance using the plurality of user controls, display, microphone, gesture recognition on camera, a combination of peripherals, or any other method.

After playing the game of chance, the user may want to cash out any remaining credits. The user may transmit a request to cash out using the user controls, display, microphone, camera, card reader, a combination of peripherals, or any other input methods to transmit the request to cash out. In one example, when the docking station receives the request to cash out, a credit voucher may be printed using printer. In another example, the player may verbally request to cash out using microphone and that the remaining balance be transferred to a credit card using card reader. In yet another example, user may request to cash out using display.

FIG. 13 illustrates a block diagram of an example docking station. Docking station 1800 may have a processor 1802, memory 1828, and a plurality of peripherals. Although only a few of the peripherals will be discussed herein, it will now be known that the docking station may have and use a variety of peripherals as described herein or desired by the user. For example, processor 1802 may be configured to determine whether the games of chance can be played on the mobile electronic device based on received device information. In another example, processor 1802 may be configured to transmit game session data, accounting data, mobile device information, and the like to the gaming system manager and/or the mobile electronic device. In yet another example, processor may be configured to delete all gaming session data, game of chance data, and any other desired data, application, and information from the mobile electronic device. Processor 1802 may be configured to communicate with the docking station 1800 peripherals, mobile electronic device, gaming server, and other servers in order to carry out the necessary desired functions. For example, processor 1802 may receive a game of chance request from the mobile electronic device. In turn, processor 1802, may transmit the game of chance request to the gaming system manager (e.g., gaming system manager 1104 illustrated in FIG. 8) via the network interface 1804.

Docking station 1800 may detect a mobile electronic device. In one embodiment, the docking station 1800 may detect the mobile electronic device when physically connected to the receiver 1808 of the docking station 1800. Receiver 1808 may be designed to receive any mobile electronic device and may have a connector (e.g., connector 1516 illustrated in FIG. 12) designed to receive a mobile electronic device and configured to detect whether the mobile electronic device is physically connected to the docking station 1800.

In another embodiment, the mobile electronic device may be detected when an intermediary connector (e.g., a portable intermediary trusted device) is connected to receiver 1808. In still another embodiment, mobile electronic device may communicate wireless with docking station 1800 via wireless interface 1801 using any known wireless technology such as such as a 3G wireless technology, 4G wireless technology, Bluetooth, Wireless USB, Near-field magnetic, Fire Wire, WiMax, IEEE 802.11x technology, radio frequency, and the like.

Once detected, mobile device information may be obtained from the mobile electronic device. Mobile device information may be any information necessary to determine whether the mobile device has the capability to play games of chance, authenticate the mobile electronic device, validate or authenticate the user of the mobile electronic device, or any other desired information may be transmitted to the docking station. For example, mobile device information may include the mobile electronic device capabilities such as power capacity, display resolution, memory capacity, processor capacity, disk space, software versions, and the like. Mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment. In another example, the user may show an interest in gourmet food. The gaming establishment may transmit, to the mobile electronic device, a coupon for 50% off at their steak house.

Mobile device information may be stored in memory 1828. Memory 1828 may be configured to store any type of data such as, game of chance data, secure software, applications, game session data, and any other desired data or information. Memory 1828 may be any type of memory including random access memory (RAM), read only memory (ROM), non-volatile random access memory (NVRAM), disk memory, magnetic tapes, paper tapes, laser storage and the like. Independently, random access memory requires power in order to maintain stored data. Battery backed RAM may store variable if the power goes down. ROM cannot be adjusted once written but does not require power in order to store information. NVRAM does not require power in order to maintain variables and can be written to. Disk memory and tape memory may be a bit slower but can store variables without power. ROM may be useful for storing games of chance on the docking station. RAM and NVRAM may also be useful for storing games on the docking station, especially if the docking station only temporarily stores games during a particular gaming session.

Docking station 1800 may have a variety of peripherals such as user controls 1810, card reader 1814, microphone 1822, camera 1824, and display 1826. User controls 1810 may be used to transmit an input and/or output to the mobile electronic device and/or to the docking station. User controls 1810 may be any type of user controls such as a keypad, keyboard, button panel, buttons, joystick, and any other user controls able to provide input and/or output. For example, user controls 1801 may be used to input username, account number, request for drinks, request restaurant reservation, request a fund transfer, and any other requests and/or data. The user controls 1810 may also be used to play the game of chance.

Microphone 1822 may be configured to receive audio sounds from the user. For example, in lieu of using user controls 1801, the user may use the microphone 1822 to verbally input requests and data, such as username, account number, request for drinks, request restaurant reservation, request a fund transfer, and any other requests and/or data. In another example, microphone 1822 may be configured to recognize the voice of the player using voice recognition information previously provided by the player.

Camera 1824 may be used to detect images, such as the user's image to authenticate the user. For example, camera 1824 may be configured to conduct facial recognition to authenticate the player in order to convert the mobile electronic device to a trusted device. In another example, camera 1824 may also be used by the gaming establishment to communicate with the user and/or allow the user to play the games of chance. In another example, camera 1824 may be configured to recognize gestures. For example, if the player is playing blackjack, the player may use gestures to "Hit" or "Stand". In another example, the player may use gestures to request a fund amount. Thus, camera 1824 may be used for any gaming or non-gaming purposes.

Printer 1816 may be configured to print any information or data. For example, printer 1816 may be used to print vouchers, coupons, receipts, documents, and the like. As stated above with reference to FIG. 8, mobile device information may also include identification information such as model information, user information, user preferences, game history, bookmarks for specific games of chance, favorite websites and/or games of chance, favorite meals, shows, buffets, and the like. The mobile device information may allow the gaming establishment to determine the user interests. Knowing the user's interests may allow the gaming establishment to transmit any marketing, promotions, coupons, and the like to the mobile electronic device. For example, if a user's interest is playing poker games on the mobile electronic device, the user may be notified of a poker tournament at the gaming establishment by printing out a flyer notifying the player of the poker tournament. In another example, the user may show an interest in gourmet food. The gaming establishment may transmit, to the docking station, a coupon for 50% off at their steak house that may be printed using printer 816.

Card reader 1814 may be configured to read data from a storage medium, such as a credit card, player tracking card, and the like. Card reader 1814 may be used to access to a player tracking account, transfer funds from a credit card or banking card, transfer user information, or any other desired requests, uses, and the like. In another example, card reader 1814 may be used to read data from a card to authenticate and/or validate the mobile electronic device.

Display 1826 may be any type of known display such as a liquid crystal display, touch screen, and the like. Display 1826 may be used for any known purposes such as displaying or presenting gaming establishment information (e.g., list of games of chance that may be played on the mobile electronic device, tournament information, movie times, and the like) to the player, display funds in the player tracking account, display remaining credits to play the game of chance. In another example, display 1826 may be used as a touch screen to input user information, such as username, password, play games of chance, and any other information. Display 1826 may be used to present or display any other gaming or non-gaming information.

Docking station 1800 may also have a notification device 1812. Notification device 1812 may be a light, light rope, light pipe, candle (e.g., candle 2210 illustrated in FIGS. 17A and 17B), multicolor LED's, a speaker which makes noise, and any other notification device to notify service personnel that a service request is desired by the player. In another example, notification device 1812 may notify service personnel of the gaming establishment that the docking station has a failure or malfunction. In another example, if a player would like to ordered a drink, a yellow light can flash to notify a waitress. In another example, a red light can flash to indicate a malfunction.

Docking station 1800 may also have a scanner 1818. Scanner may be used to scan documents, bar codes, and the like. For example, the scanner may be used by the player to scan a voucher printed from another gaming machine. The credits remaining on the voucher may then be used to play the games of chance. In another example, the player may scan a voucher to participate in a poker tournament without having to be at the exact location of where the poker tournament is being played.

Docking station 1800 may also have a motion tracking device 1820. The motion tracking device 1820 may be used to play the games of chance. The motion tracking device 1820 may be any device configured to determine the orientation, produce motion, and the like on the docking station 1800 and/or the mobile electronic device. For example, the motion tracking device 1820 may be a gyroscope to determine orientation, a laser, haptic transducers, and/or an accelerometer to determine acceleration magnitude and vectors. For example, if playing a car racing simulation game of chance, the docking station 1800 may be tilted to the right in order to turn the car to the right. When the docking station 1800 is turned to the right, the motion tracking device 1820 may determine the orientation and turn the car in the simulation game of chance to the right. If the car crashes, haptic transducers in the docking station 800 may cause the docking station to vibrate in response to the crash.

Figure 14A:
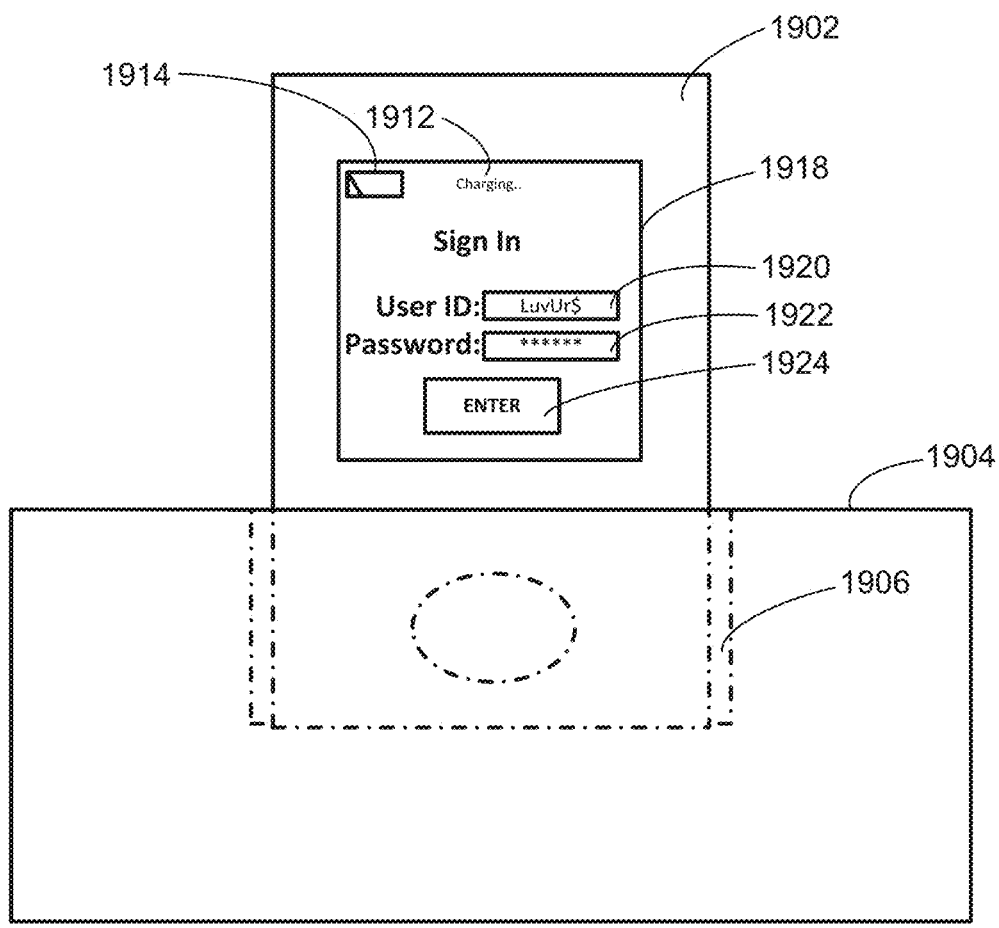
FIGS. 14A-14B illustrate an example authorization of a mobile electronic device to play a game of chance.
Figure 14B:
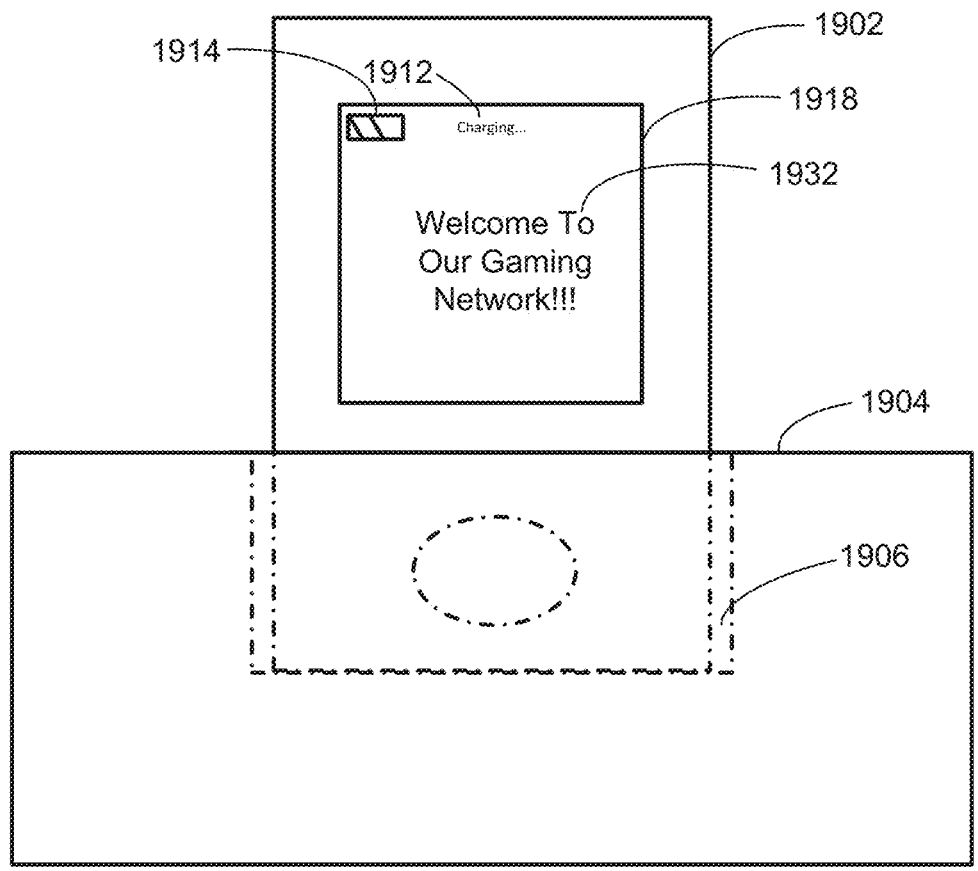

FIGS. 14A-14B illustrate an example authorization of a mobile electronic device to play a game of chance. The mobile electronic device 1902 may be inserted into the receiver 1906 of the docking station 1904. The receiver 1906 may have a connector (e.g., connector 1516 illustrated in FIG. 12) configured to connect the mobile electronic device to the docking station. The connector may be designed to receive the mobile electronic device and configured to detect whether the mobile electronic device is physically connected to the docking station. The connector may be designed or configured to allow the mobile electronic device to communicate with the docking station. As previously discussed in FIGS. 12A-12B, the connection may be implemented as a wired or a wireless connection.

Referring to FIG. 14A, once the mobile electronic device 1902 is physically connected to the docking station 1904, the docking station 1904 may detect the mobile electronic device. The mobile electronic device may have a display 1918 displaying a battery life indicator 1914. As illustrated, the battery life indicator 1914 may indicate that the mobile electronic device 1902 is not fully charged. If not fully charged, the docking station 1904 may transmit a charge to the battery of the mobile electronic device 1902 to recharge the battery of the mobile electronic device. In one embodiment, the mobile electronic device may indicate that it is being charged with a message displayed on display 1918. For example, "Charging" 1912 may be displayed on display 1918.

Docking station may transmit an authentication request to the mobile electronic device to authenticate the mobile electronic device 1902 and/or the user. In one embodiment, a request for a user identification 1920 and password 1922 may be displayed on display 1918. The player may then enter the button 1924 on the display 1902 to gain authorization.

Referring now to FIG. 14B, after a period of time being physically connected to the gaming, the battery life indicator 1914 indicates that the battery is being recharged. If the mobile electronic device is authenticated an authentication notification may be transmitted to the mobile gaming device 1902 and presented on display 1912. For example, FIG. 15B may display a "Welcome To Our Gaming Network!!!" 1932 message on display 1918. This indicates that the mobile gaming device 1902 and/or user is authenticated.

Figure 15A:
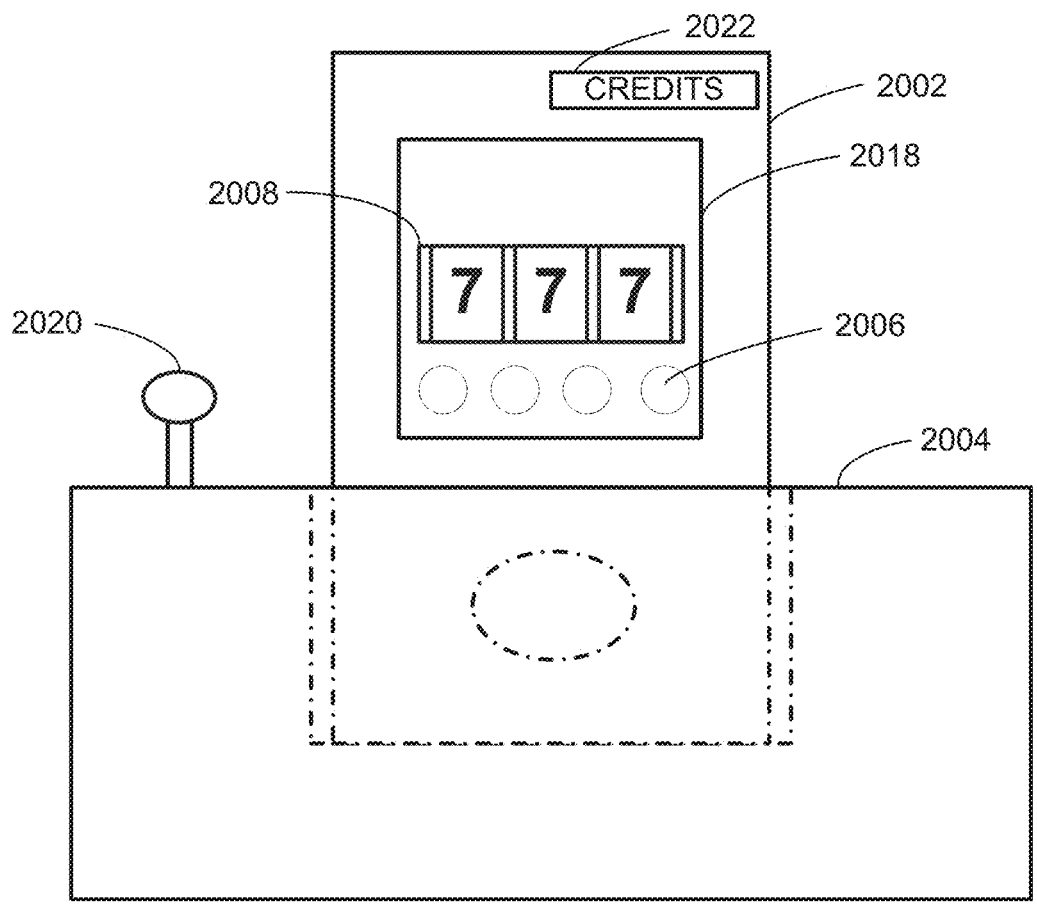
FIGS. 15A-15B illustrate an example use of a docking station.
Figure 15B:
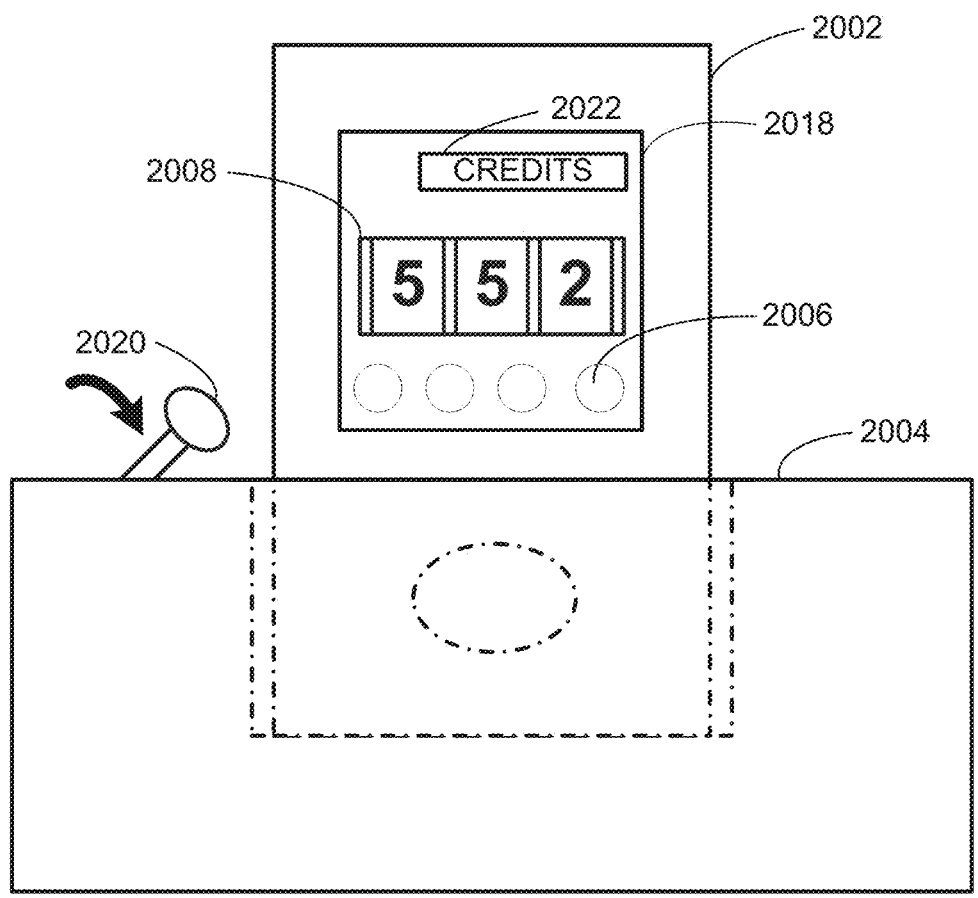

FIGS. 15A-15B illustrate an example use of a docking station. FIG. 15A illustrates the mobile electronic device 2002 docked in the docking station 2004 while playing a game of chance presented on display 2018. The display 2018 may present a plurality of user interface controls 2006. The user interface controls 2006 may be any type of displayed user controls used to play the game of chance such as to select a wager amount, spin, cash out, and the like. The amount of credits remaining 2022 may also be presented on display 2018.

In one embodiment, docking station 2004 may have a joystick 2020. The joystick may also be used to play the game of chance 2009. As illustrated, joystick 2020 may be used to spin the reels 2008 of the game of chance presented on display 2018. The joystick 2020 may be in a first position indicating that no action has been taken. Referring to FIG. 15B, the player may move the joystick 2020 to a second position indicating that the player would like to spin the reel 2008 using the joystick 2020 and not the user interface controls 2006.

Figure 16A:
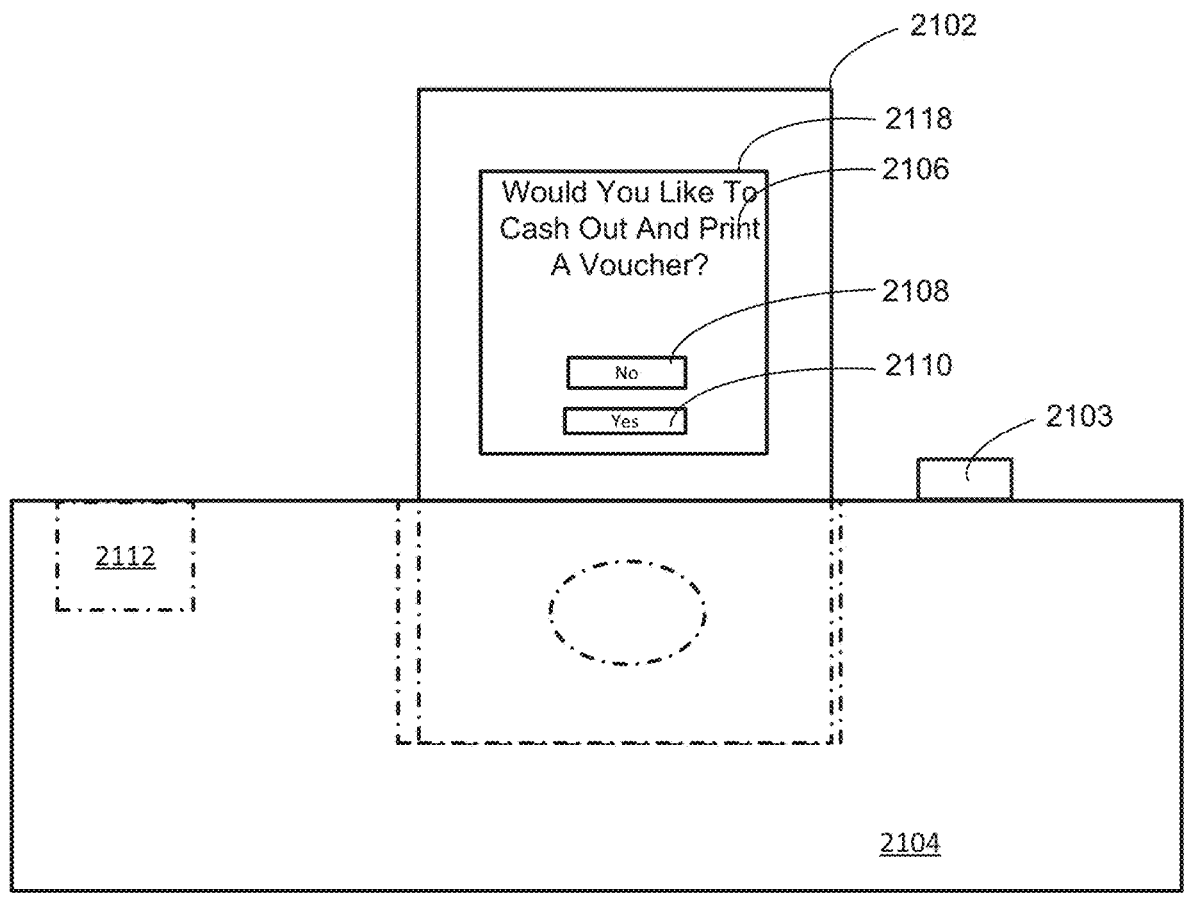
FIGS. 16A-16B illustrate another example use of a document station.
Figure 16B:
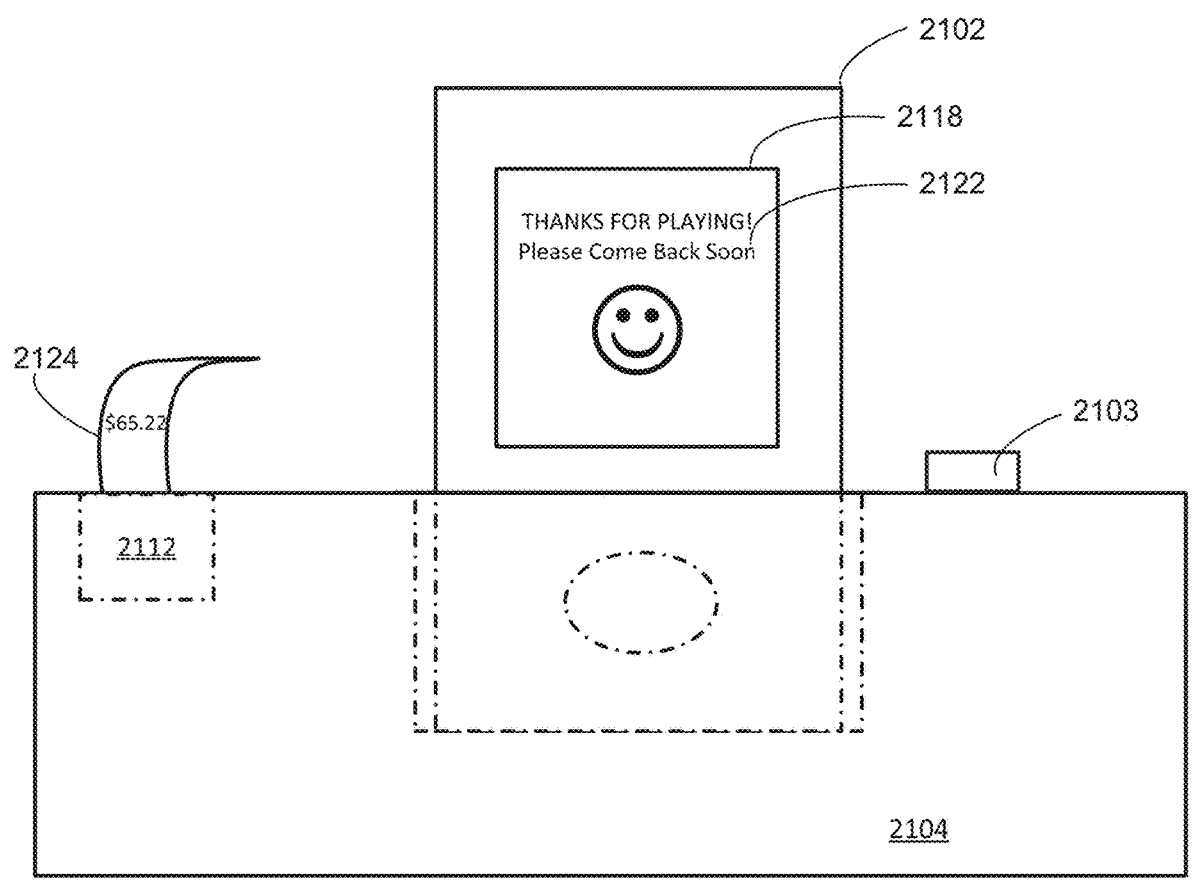

FIGS. 16A-16B illustrate another example use of a document station. If the user would like to end the game session, the user may want to cash out his remaining credits. FIG. 16A illustrates the mobile electronic device 2102 connected to docking station 2104. In one embodiment, the player may use user interface controls (e.g., user interface controls 2006 illustrated in FIGS. 15A and 15B) to cash out. In another embodiment, the player may use user controls 2103 (e.g., user controls 1610 illustrated in FIG. 13) to cash out.

Once a request to cash out is transmitted to the docking station 2104, the player may be questioned to determine whether the player would like to print a voucher for the remaining credit. For example, a message "Would You Like To Cash Out And Print A Voucher?" 2106 may be displayed on display 2118. A "No" indicator 2108 and a "Yes" indicator 2110 may be simultaneously displayed on display 2118. Although the inquiry is illustrated as being presented on the display 2118 of the mobile electronic device 2102, this is not intended to be limiting as the inquiry may also be presented on a display of the docking station 2104 (e.g., display 1622 illustrated in FIG. 13).

Referring now to FIG. 16B, if the player would like a voucher printed out for the remaining credit balance, printer 2112 may print the voucher 2124. Once the voucher is printed, display 2118 may present a completion notification 2122 such as, for example, "THANKS FOR PLAYING! Please Come Back Soon".

Figure 17A:
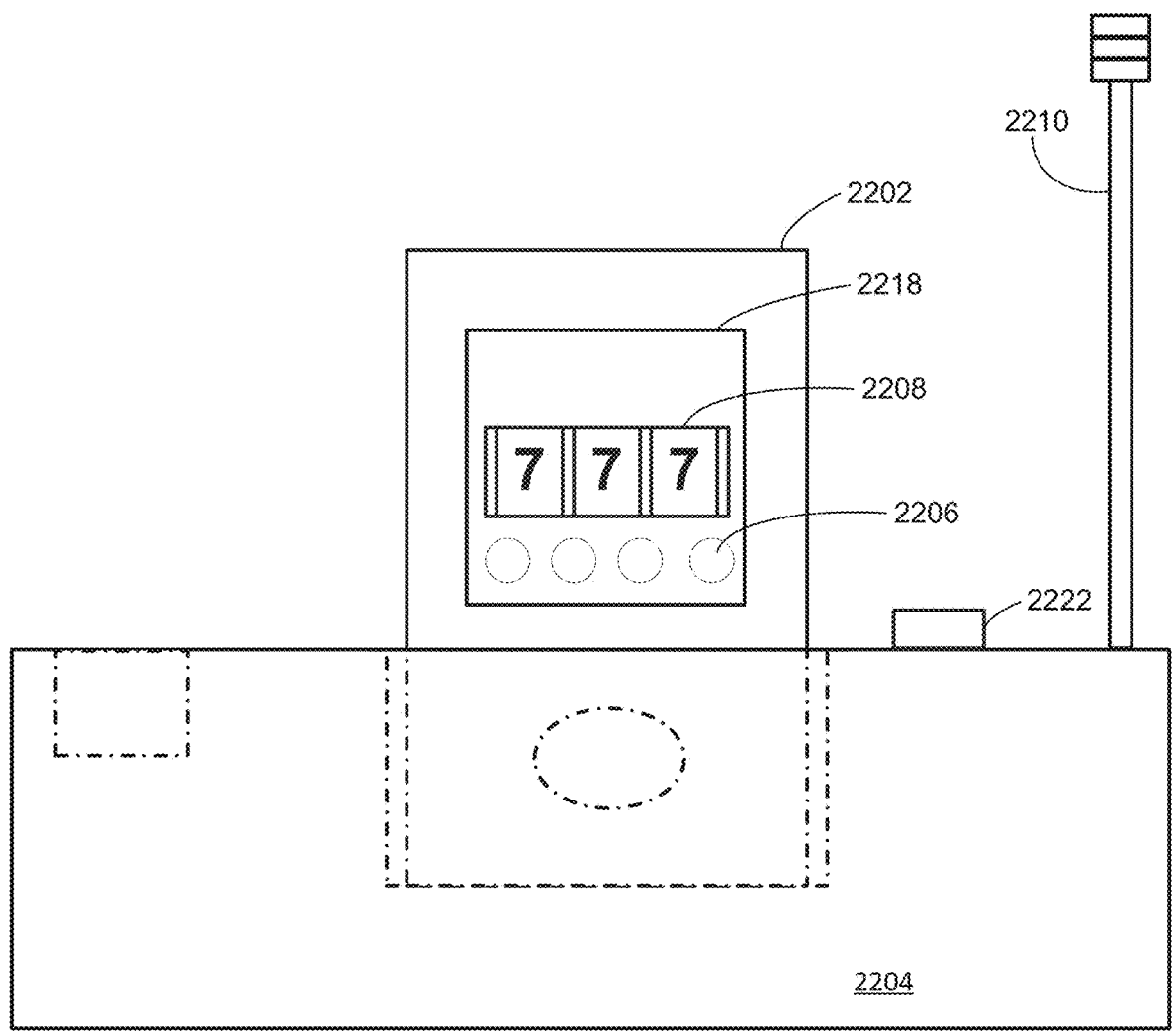
FIGS. 17A-17B illustrate still another example use of a docking station.
Figure 17B:
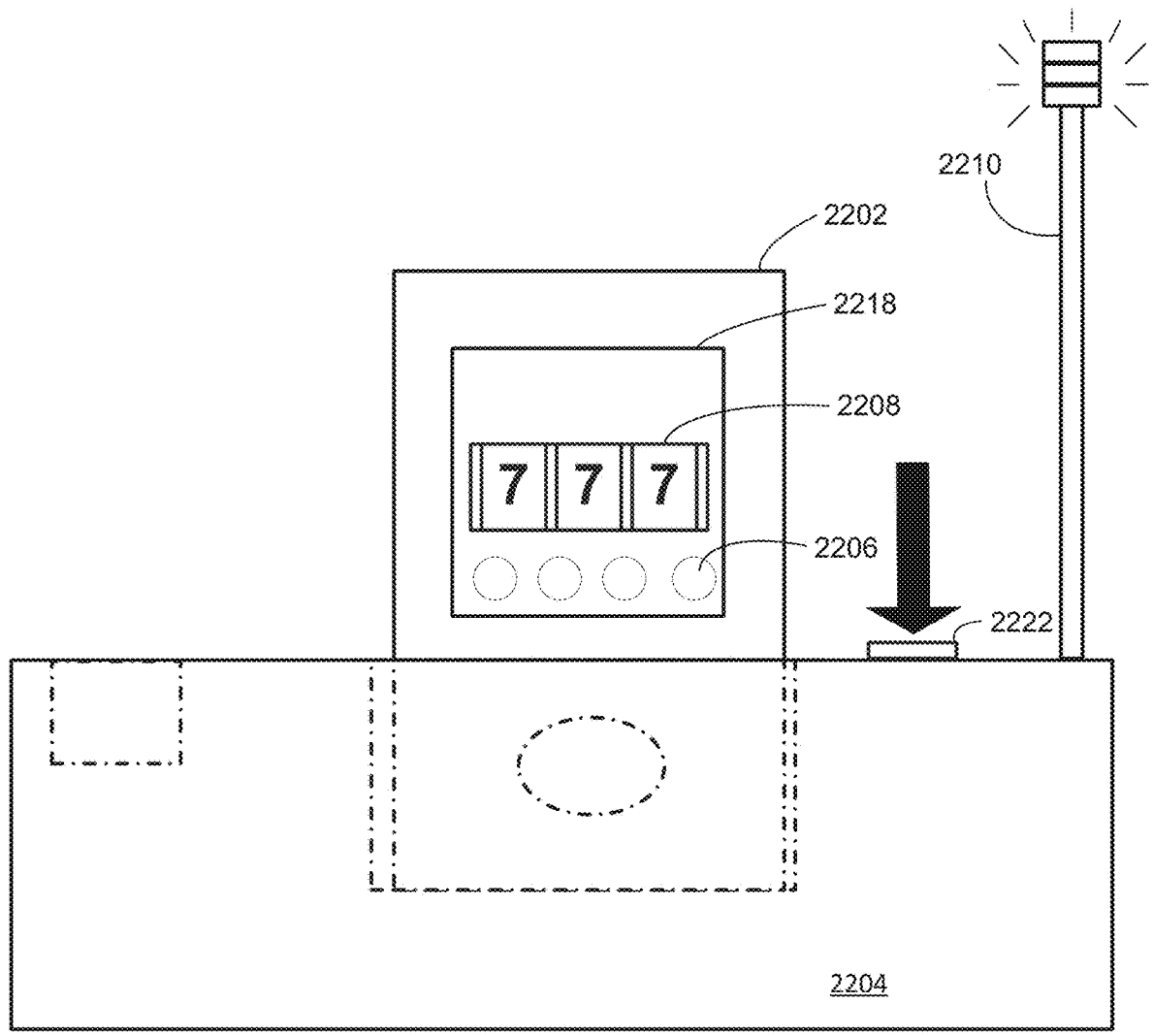

FIGS. 17A-17B illustrate still another example use of a docking station. Referring to FIGS. 17A and 17B, while the player is playing the game of chance 2208, waiting for the mobile electronic device 2202 to charge, or for any other reason, player may want to order a drink, food, or any other type of service. Thus, the docking station 2204 may be used to make service calls. The user may use either the user interface controls 2206 displayed on display 2218 or user controls 2222 on the docking station 2204 to indicate he would like to make a service request. The request for service may be transmitted to the docking station 2204 and a candle 2210 on the docking station may be illuminated (as illustrated in FIG. 17B) to alert the customer service personnel that the player would like to make a service request.

Figure 18A:
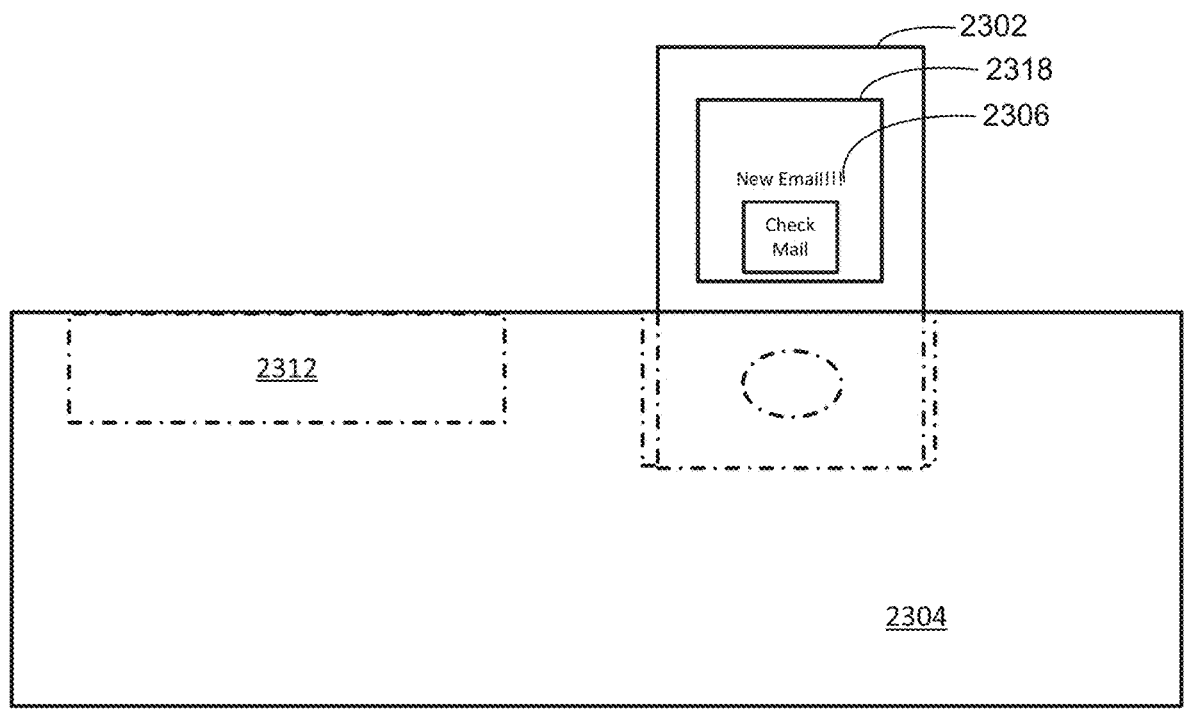
FIGS. 18A-18D illustrate yet another example uses of the docking station.

FIGS. 18A-18D Illustrate yet another example uses of the docking station. Some players may desire to work while playing games of chance for entertainment, such as while on vacation. The docking station may provide the flexibility for business people to work while on vacation (or not on vacation) and may also be used as a work station. As illustrated in FIG. 18A, if the mobile electronic device 2302 is able to receive electronic mail (e-mail), display 2318 may indicate that the player has a new email message 2306.

Figure 18B:
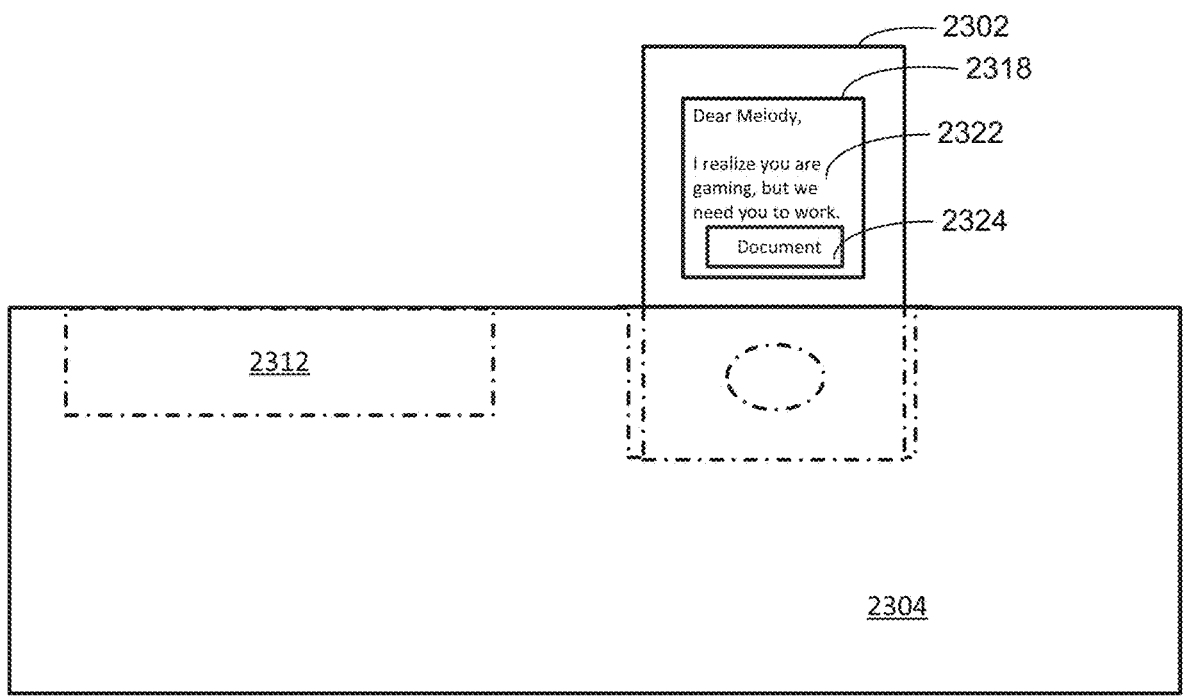
Figure 18C:
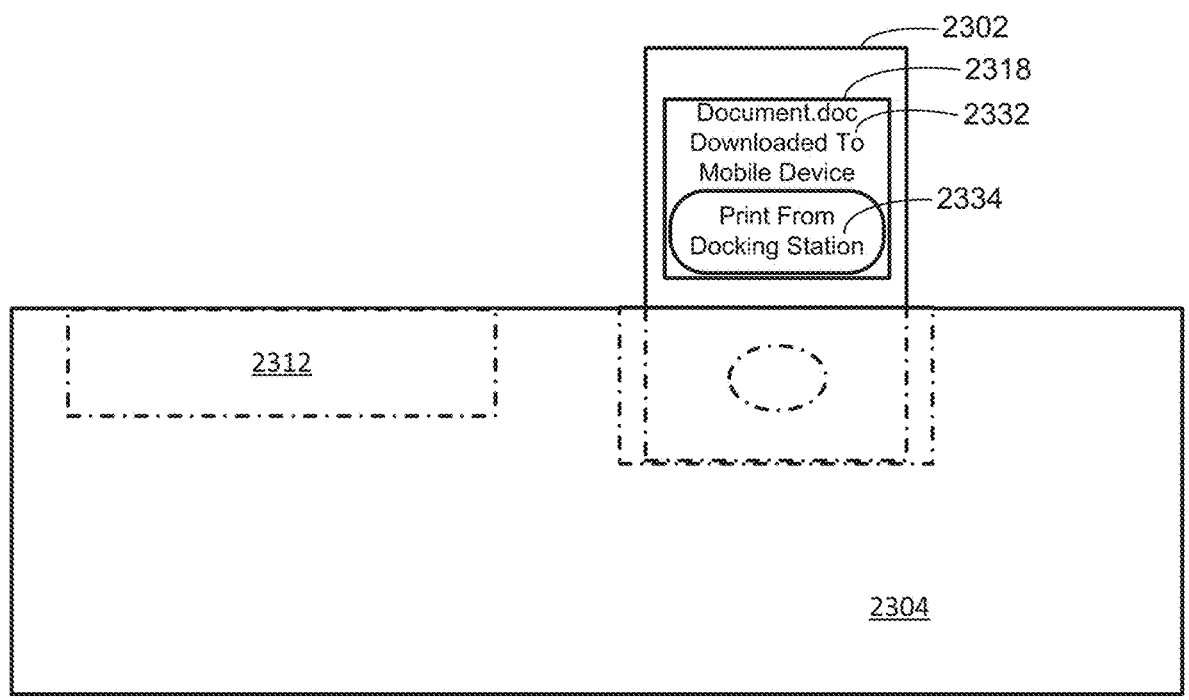
Figure 18D:
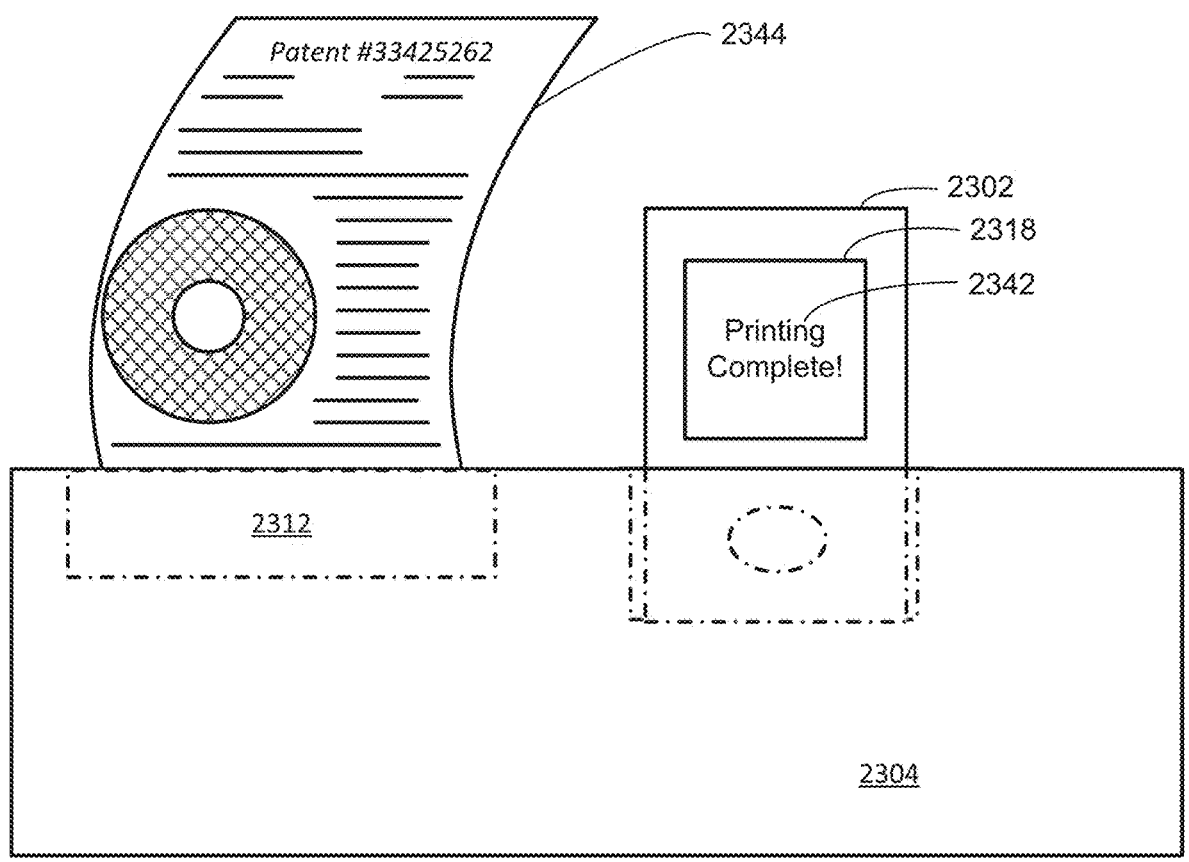

Referring now to FIG. 18B, the e-mail message may be displayed 2322 on display 2318. The email message may contain a document 2324 that the player may need to print out to review. As illustrated in FIG. 18C, the user may be provided the option 2334 to print the document using the docking station 2304. In one embodiment, the user may be charged per page for each page printed out and may use the docking station to pay for the printouts. In another embodiment, the user is not charged for the printout. If the user would like to print the document using the docking station, as illustrated in FIG. 18D, the document 2344 may be printed using printer 2312. Upon completion of the printing, display 2318 may display a completion notification 2342, for example, a "Printing Complete!" message.

While embodiments and applications of this invention have been shown and described, it would be apparent to those skilled in the art having the benefit of this disclosure that many more modifications than mentioned above are possible without departing from the inventive concepts herein.

What is claimed is:

1. A gaming device docking station for use with an associated untrusted portable electronic device, the gaming device docking station comprising:
    a memory configured to store at least gaming transaction data;
    a transceiver; and
    a processor configured to at least:
        securely communicate with a gaming apparatus, the gaming apparatus being able to receive or process a wager to play a game of chance;
        securely communicate with the associated untrusted portable electronic device;
        determine whether a gaming transaction with the gaming apparatus for one or more games of chance is requested; and
        enable the associated untrusted portable electronic device to participate in gaming transactions with the gaming apparatus, the gaming transactions being associated with the game of chance,
        wherein the associated untrusted portable electronic device changes to a trusted device to carry out gaming transactions so long as the gaming device docking station is operatively coupled to the associated untrusted portable electronic device.

2. The gaming device docking station as recited in claim 1, wherein the gaming device docking station further comprises one or more of a display, a card reader, a scanner, a printer, a button, a notification device, a motion tracker, a microphone, a camera, or user input devices.

3. The gaming device docking station as recited in claim 1, wherein the gaming device docking station further comprises:
    a notification light to provide a visual indication of a status of the gaming device docking station.

4. The gaming device docking station as recited in claim 1, wherein the processor is further configured to securely communicate with the gaming apparatus via a physical connection or a short-ranged wireless network.

5. The gaming device docking station as recited in claim 4, wherein the processor is further configured to periodically collect data with respect to the gaming transaction from the gaming apparatus.

6. The gaming device docking station as recited in claim 4, wherein the processor is further configured to subsequently update a player tracking account based on the game of chance.

7. The gaming device docking station as recited in claim 1, wherein the processor is further configured to securely communicate with the associated untrusted portable electronic device automatically.

8. A method of operating a gaming system comprising a gaming apparatus operable to receive or process a wager to play a game of chance, and an untrusted portable electronic device associated with a gaming device docking station having a transceiver, and a controller having a processor and a memory storing gaming transaction data and instructions, which, when executed, cause the processor to communicate with the untrusted portable electronic device and the gaming apparatus, the method comprising:
    determining whether a gaming transaction with the gaming apparatus for the game of chance is requested;
    enabling the untrusted portable electronic device to participate in the gaming transaction associated with the game of chance at the gaming apparatus;
    determining if the gaming device docking station remains coupled to the untrusted portable electronic device; and
    when the gaming device docking station remains being coupled to the untrusted portable electronic device, changing the untrusted portable electronic device to a trusted portable electronic device to continue a second gaming transaction.

9. The method of claim 8, wherein the gaming device docking station further comprises one or more of a display, a card reader, a scanner, a printer, a button, a notification device, a motion tracker, a microphone, a camera, or user input devices.

10. The method of claim 8, wherein the gaming device docking station further comprises a notification light, further comprising providing a visual indication of a status of the gaming device docking station with the notification light.

11. The method of claim 8, wherein the gaming apparatus is coupled to the gaming device docking station via a physical connection or a short-ranged wireless network, further comprising the gaming device docking station securely communicating with the gaming apparatus with the physical connection or the short-ranged wireless network.

12. The method of claim 8, further comprising periodically collecting data with respect to the gaming transaction from the gaming apparatus.

13. The method of claim 12, further comprising subsequently updating a player tracking account based on the game of chance.

14. The method of claim 8, further comprising the gaming device docking station securely communicating with the untrusted portable electronic device automatically.

15. A non-transitory computer-readable medium comprising gaming transaction data and instructions for conducting a game on a gaming system including a server, a gaming apparatus operable to receive or process a wager to play a game of chance and coupled to the server via a network, and an untrusted portable electronic device associated with a gaming device docking station having a transceiver, and a controller having a processor, the instructions, which, when executed, cause the processor to perform the steps of:
  detecting whether a gaming transaction for the game of chance is requested at the gaming apparatus through the server;
  enabling the untrusted portable electronic device to participate in the gaming transaction associated with the game of chance at the gaming apparatus; and
  when the gaming device docking station remains coupled to the untrusted portable electronic device via a physical connection or a short-ranged wireless network, updating the untrusted portable electronic device to a trusted portable electronic device to continue a second gaming transaction.

16. The non-transitory computer-readable medium of claim 15, wherein the gaming device docking station further comprises one or more of a display, a card reader, a scanner, a printer, a button, a notification device, a motion tracker, a microphone, a camera, or user input devices.

17. The non-transitory computer-readable medium of claim 15, wherein the gaming device docking station further comprises a notification light, and wherein the instructions, when executed, further cause the processor to perform the step of providing a visual indication of a status of the gaming device docking station with the notification light.

18. The non-transitory computer-readable medium of claim 15, wherein the instructions, when executed, further cause the processor to perform the step of causing the gaming device docking station to securely communicate with the gaming apparatus with the physical connection or the short-ranged wireless network.

19. The non-transitory computer-readable medium of claim 15, wherein the instructions, when executed, further cause the processor to perform the step of periodically collecting data with respect to the gaming transaction from the gaming apparatus.

20. The non-transitory computer-readable medium of claim 19, wherein the instructions, when executed, further cause the processor to perform the step of subsequently updating a player tracking account based on the game of chance.

* * * * *